US012791836B2

(12) United States Patent
Tseng et al.

(10) Patent No.: US 12,791,836 B2
(45) Date of Patent: Nov. 10, 2026

(54) OPTICAL IMAGING LENS SYSTEM INCLUDING TEN LENSES OF ++−++−+−+−, ++−++−−−+−, ++−+−+−+−−, ++−+++−+−−, −+−+++−+−−, ++−++−−++−, ++−+−−+−+− OR ++−+−−−−+− REFRACTIVE POWERS, IMAGE CAPTURING UNIT AND ELECTRONIC DEVICE

(71) Applicant: LARGAN PRECISION CO., LTD., Taichung City (TW)

(72) Inventors: Yu-Tai Tseng, Taichung City (TW); Hsin-Hsuan Huang, Taichung City (TW); Meng-Kuan Cho, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 198 days.

(21) Appl. No.: 18/800,845

(22) Filed: Aug. 12, 2024

(65) Prior Publication Data

US 2024/0402467 A1 Dec. 5, 2024

Related U.S. Application Data

(63) Continuation of application No. 17/383,222, filed on Jul. 22, 2021, now Pat. No. 12,085,695.

(30) Foreign Application Priority Data

Mar. 5, 2021 (TW) ................................ 110107850

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 2,549,159 A 4/1951 Bertele
4,726,666 A 2/1988 Ota et al.
(Continued)

FOREIGN PATENT DOCUMENTS

CN 111505805 A 8/2020
CN 111679399 A 9/2020
(Continued)

OTHER PUBLICATIONS

Gross, H., "Handbook of Optical Systems, Aberration Theory and Correction of Optical Systems, Chapter 31: Correction of Aberrations", vol. 3, pp. 215-221, 225 (2007).
(Continued)

*Primary Examiner* — Wen Huang
(74) *Attorney, Agent, or Firm* — Maschoff Brennan

(57) ABSTRACT

An optical imaging lens system includes ten lens elements which are, in order from an object side to an image side along an optical path: a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side. The second lens element has positive refractive power. The image-side surface of the tenth lens element is concave in a paraxial region thereof, and the image-side surface of the tenth lens element has at least one inflection point.

15 Claims, 32 Drawing Sheets

(56) References Cited

U.S. PATENT DOCUMENTS

| | | | |
|---|---|---|---|
| 4,759,619 | A | 7/1988 | Nakamura et al. |
| 5,268,793 | A | 12/1993 | Saka et al. |
| 5,543,970 | A | 8/1996 | Hata et al. |
| 5,666,232 | A | 9/1997 | Toyama |
| 5,774,275 | A | 6/1998 | Hamano |
| 6,069,743 | A | 5/2000 | Nagata et al. |
| 10,921,566 | B2 | 2/2021 | Hudyma et al. |
| 11,867,966 | B2 | 1/2024 | Shobayashi |
| 11,927,728 | B2 | 3/2024 | Li et al. |
| 12,000,988 | B2 | 6/2024 | Li et al. |
| 2001/0028511 | A1 | 10/2001 | Sensui |
| 2015/0338605 | A1 | 11/2015 | Nishio et al. |
| 2017/0010441 | A1 | 1/2017 | Kondo et al. |
| 2017/0184823 | A1 | 6/2017 | Jiang et al. |
| 2019/0324251 | A1 | 10/2019 | Yonemaru et al. |
| 2020/0393653 | A1 | 12/2020 | Chen |
| 2021/0096335 | A1 | 4/2021 | Zhao et al. |
| 2021/0096346 | A1 | 4/2021 | Matsumura et al. |
| 2021/0389575 | A1 | 12/2021 | Li et al. |
| 2022/0128799 | A1 | 4/2022 | Chen |
| 2022/0244501 | A1 | 8/2022 | Wang et al. |

FOREIGN PATENT DOCUMENTS

| | | | |
|---|---|---|---|
| CN | 111781711 | A | 10/2020 |
| CN | 112764204 | A | 5/2021 |
| CN | 112859291 | A | 5/2021 |
| CN | 112904542 | A | 6/2021 |
| CN | 114815134 | A | 7/2022 |
| JP | S58-097016 | A | 6/1983 |
| JP | S58-100115 | A | 6/1983 |
| JP | S62-220915 | A | 9/1987 |
| JP | S62-249119 | A | 10/1987 |
| JP | S63-163317 | A | 7/1988 |
| JP | H04-301811 | A | 10/1992 |
| JP | H05-224124 | A | 9/1993 |
| JP | H06-308386 | A | 11/1994 |
| JP | H07-113955 | A | 5/1995 |
| JP | H09-101455 | A | 4/1997 |
| JP | H11-109232 | A | 4/1999 |
| JP | H11-109234 | A | 4/1999 |
| JP | H11-109237 | A | 4/1999 |
| JP | H11-109238 | A | 4/1999 |
| JP | H11-242156 | A | 9/1999 |
| JP | H11-242157 | A | 9/1999 |
| JP | H11-242159 | A | 9/1999 |
| JP | 2000-089113 | A | 3/2000 |
| TW | I693445 | B | 5/2020 |
| TW | M600398 | U | 8/2020 |
| WO | 2020/017200 | A1 | 1/2020 |
| WO | 2020/017201 | A1 | 1/2020 |
| WO | 2020/017258 | A1 | 1/2020 |
| WO | 2021/240551 | A1 | 12/2021 |
| WO | 2021/250704 | A1 | 12/2021 |

OTHER PUBLICATIONS

Gross, H., "Handbook of Optical Systems, Aberration Theory and Correction of Optical Systems," vol. 3, pp. 377-379 (2007).

TW Office Action dated Jun. 30, 2021 as received in Application No. 110107850.

Extended European Search Report dated Jul. 1, 2022 as received in Application No. 21197745.9.

OPTICAL IMAGING LENS SYSTEM INCLUDING TEN LENSES OF ++−++−+−+−, ++−++−−−+−, ++−+−+−+−−, ++−+++−+−−, −+−+++−+−−, ++−++−−++−, ++−+−−+−+− OR ++−+−−−−+− REFRACTIVE POWERS, IMAGE CAPTURING UNIT AND ELECTRONIC DEVICE

RELATED APPLICATIONS

This application is a continuation patent application of U.S. application Ser. No. 17/383,222, filed on Jul. 22, 2021, which claims priority to Taiwan Application 110107850, filed on Mar. 5, 2021, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side.

The second lens element has positive refractive power. The image-side surface of the tenth lens element is concave in a paraxial region thereof, and the image-side surface of the tenth lens element has at least one inflection point.

When a maximum value among refractive indices of all lens elements of the optical imaging lens system is Nmax, an axial distance between the third lens element and the fourth lens element is T34, an axial distance between the fourth lens element and the fifth lens element is T45, and an Abbe number of the second lens element is V2, the following conditions are satisfied:

$$1.50 < N\text{max} < 1.80;$$

$$0 < T34/T45 < 6.0; \text{ and}$$

$$28.0 < V2 < 60.0.$$

According to one aspect of the present disclosure, an optical imaging lens system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side.

The image-side surface of the tenth lens element is concave in a paraxial region thereof, and the image-side surface of the tenth lens element has at least one inflection point.

When a maximum value among refractive indices of all lens elements of the optical imaging lens system is Nmax, an axial distance between the third lens element and the fourth lens element is T34, an axial distance between the fourth lens element and the fifth lens element is T45, a focal length of the first lens element is f1, and a focal length of the second lens element is f2, the following conditions are satisfied:

$$1.50 < N\text{max} < 1.80;$$

$$0 < T34/T45 < 6.0; \text{ and}$$

$$0 < |f2/f1| < 1.10.$$

According to another aspect of the present disclosure, an image capturing unit includes one of the aforementioned optical imaging lens systems and an image sensor, wherein the image sensor is disposed on an image surface of the optical imaging lens system.

According to another aspect of the present disclosure, an electronic device includes at least two image capturing units disposed on the same side of the electronic device. The at least two image capturing units include a first image capturing unit and a second image capturing unit. The first image capturing unit includes one of the aforementioned optical imaging lens systems and an image sensor disposed on an image surface of the optical imaging lens system. The second image capturing unit includes an optical lens assembly and an image sensor disposed on an image surface of the optical lens assembly. A maximum field of view of the first image capturing unit and a maximum field of view of the second image capturing unit differ by at least 30 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side.

The first lens element can have positive refractive power. Therefore, it is favorable for balancing the converging capability of the second lens element so as to correct aberrations. The object-side surface of the first lens element can be convex in a paraxial region thereof. Therefore, it is favorable for reducing the incident angle of light on the lens surface so as to prevent total reflection.

The second lens element can have positive refractive power. Therefore, it is favorable for providing significant light converging capability so as to reduce the size of the optical imaging lens system and thus achieve compactness. The object-side surface of the second lens element can be convex in a paraxial region thereof and the image-side surface of the second lens element can be concave in a paraxial region thereof. Therefore, it is favorable for balancing the light path in both tangential direction and sagittal direction so as to correct astigmatism.

The third lens element can have negative refractive power. Therefore, it is favorable for balancing aberrations generated by the second lens element so as to correct spherical aberration and chromatic aberration. The image-side surface of the third lens element can be concave in a paraxial region thereof. Therefore, it is favorable for correcting aberrations generated by the second lens element so as to improve image quality.

The fourth lens element can have positive refractive power. Therefore, it is favorable for correcting aberrations generated by the third lens element so as to improve image quality.

The image-side surface of the seventh lens element can be concave in a paraxial region thereof and can have at least one convex shape in an off-axis region thereof. Therefore, it is favorable for correcting field curvature so as to maintain proper relative illuminance.

Figure 29:
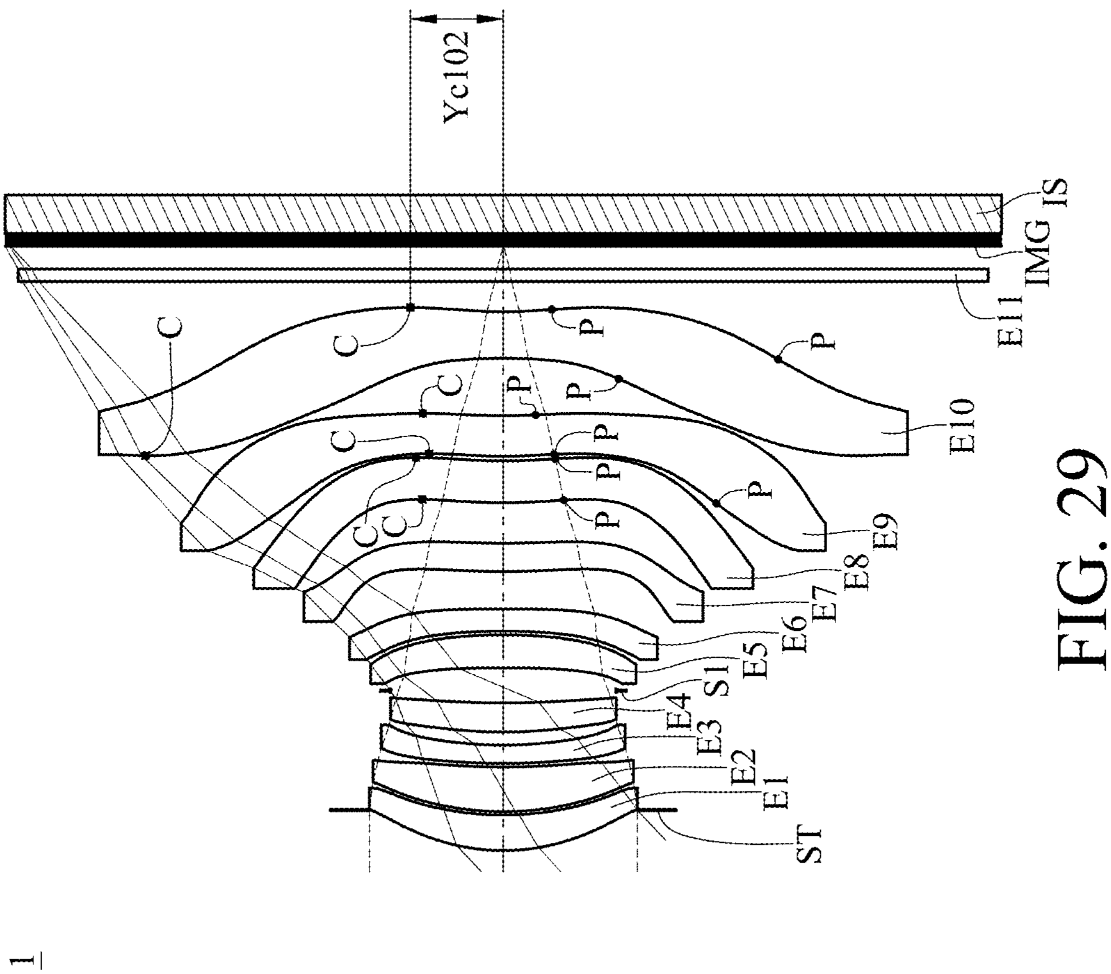
FIG. 29 shows a schematic view of Yc102 and inflection points and critical points of lens elements according to the 1st embodiment of the present disclosure.

The image-side surface of the eighth lens element can be concave in a paraxial region thereof and can have at least one convex shape in an off-axis region thereof. Therefore, it is favorable for enhancing off-axis aberration corrections at the image side of the optical imaging lens system and reducing distortion and field curvature. The image-side surface of the eighth lens element can have at least one critical point in the off-axis region thereof. Therefore, it is favorable for correcting distortion. Please refer to FIG. 29, which shows a schematic view of non-axial critical points C of the eighth lens element E8, the ninth lens element E9 and the tenth lens element E10 according to the 1st embodiment of the present disclosure. The critical points C of the eighth lens element E8, the ninth lens element E9 and the tenth lens element E10 are only exemplary. Each of the lens elements in various embodiments of the present disclosure can have one or more critical points in an off-axis region thereof.

The image-side surface of the ninth lens element can be concave in a paraxial region thereof and can have at least one convex shape in an off-axis region thereof, and the image-side surface of the ninth lens element can have at least one critical point in the off-axis region thereof. Therefore, it is favorable for increasing the effective diameter of the ninth lens element and correcting peripheral light so as to maintain high image quality at various object distances.

The tenth lens element can have negative refractive power. Therefore, it is favorable for the miniaturization of the optical imaging lens system so as to reduce the size of the electronic devices. The image-side surface of the tenth lens element is concave in a paraxial region thereof. Therefore, it is favorable for reducing the back focal length so as to reduce the size of the optical imaging lens system, thereby achieving compactness. The image-side surface of the tenth lens element can have at least one critical point in an off-axis region thereof. Therefore, it is favorable for improving peripheral image quality and reducing the size of the optical imaging lens system.

Each of at least three of the first lens element, the second lens element, the third lens element and the fourth lens element can have the object-side surface being convex in a paraxial region thereof and the image-side surface being concave in a paraxial region thereof. Therefore, it is favorable for correcting astigmatism.

At least one of the object-side surface and the image-side surface of each of at least three lens elements of the optical imaging lens system can have at least one inflection point. Therefore, it is favorable for correcting field curvature, achieving a compact configuration and flattening the Petzval surface of the optical imaging lens system. Moreover, the image-side surface of the tenth lens element has at least one inflection point. Therefore, it is favorable for correcting off-axis aberrations and reducing the size of the optical imaging lens system. Please refer to FIG. 29, which shows a schematic view of inflection points P of the eighth lens element E8, the ninth lens element E9 and the tenth lens element E10 according to the 1st embodiment of the present disclosure. The inflection points P of the eighth lens element E8, the ninth lens element E9 and the tenth lens element E10 are only exemplary. Each of the lens elements in various embodiments of the present disclosure can have one or more inflection points.

When a maximum value among refractive indices of all lens elements of the optical imaging lens system is Nmax, the following condition is satisfied: $1.50<Nmax<1.80$. Therefore, it is favorable for reducing manufacture difficulty of lens elements so as to increase the feasibility of commercialization of the optical imaging lens system. Moreover, the following condition can also be satisfied: $1.60<Nmax<1.75$. Moreover, the following condition can also be satisfied: $1.65<Nmax<1.72$. Moreover, the following condition can also be satisfied: $1.68\leq Nmax<1.70$.

When an axial distance between the third lens element and the fourth lens element is T34, and an axial distance between the fourth lens element and the fifth lens element is T45, the following condition is satisfied: $0<T34/T45<6.0$. Therefore, it is favorable for balancing the arrangement of the third, fourth and fifth lens elements so as to prevent an overly large distance between the third lens element and the fourth lens element to better utilize space in the optical imaging lens system. Moreover, the following condition can also be satisfied: $0<T34/T45<3.50$. Moreover, the following condition can also be satisfied: $0.10<T34/T45<2.50$.

When an Abbe number of the second lens element is V2, the following condition can be satisfied: $22.0<V2<80.0$. Therefore, it is favorable for providing significant light converging capability from the second lens element so as to correct aberrations at object side of the optical imaging lens system. Moreover, the following condition can also be satisfied: $24.0<V2<70.0$. Moreover, the following condition can also be satisfied: $28.0<V2<60.0$. Moreover, the following condition can also be satisfied: $32.0<V2<60.0$.

When a focal length of the first lens element is f1, and a focal length of the second lens element is f2, the following condition can be satisfied: $0<|f2/f1|<1.10$. Therefore, it is favorable for distributing the refractive power between the first lens element and the second lens element so as to better control the light path by the second lens element, thereby increasing the field of view.

When an axial distance between the object-side surface of the first lens element and an image surface is TL, and a maximum image height of the optical imaging lens system (which can be half of a diagonal length of an effective photosensitive area of an image sensor) is ImgH, the following condition can be satisfied: $0.50<TL/ImgH<1.85$. Therefore, it is favorable for reducing the total track length of the optical imaging lens system while ensuring a sufficient light receiving area so as to prevent vignetting in the peripheral region of the image. Moreover, the following condition can also be satisfied: $0.50<TL/ImgH<1.55$. Moreover, the following condition can also be satisfied: $0.90<TL/ImgH<1.35$.

When a minimum value among Abbe numbers of all lens elements of the optical imaging lens system is Vmin, the following condition can be satisfied: $5.0<Vmin<21.0$. Therefore, it is favorable for adjusting the light path and balancing the light convergence of different wavelengths so as to correct chromatic aberration. Moreover, the following condition can also be satisfied: $5.0<Vmin<20.0$.

When an Abbe number of the ninth lens element is V9, and an Abbe number of the tenth lens element is V10, the following condition can be satisfied: $10.0<V9+V10<105.0$. Therefore, it is favorable for correcting chromatic aberration by the ninth and tenth lens elements so as to prevent image shift due to dispersion of light rays in different wavelengths. Moreover, the following condition can also be satisfied: $20.0<V9+V10<78.0$. Moreover, the following condition can also be satisfied: $45.0<V9+V10<78.0$.

When a focal length of the optical imaging lens system is f, and a focal length of the ninth lens element is f9, the following condition can be satisfied: $-1.50<f/f9<0.62$. Therefore, it is favorable for utilizing the ninth lens element as a correction lens so as to prevent lens surfaces from being overly curved and balance between aberrations generated by lens elements at the object side and those at the image side of the optical imaging lens system. Moreover, the following condition can also be satisfied: $-0.60<f/f9<0.58$.

When an axial distance between the seventh lens element and the eighth lens element is T78, an axial distance between the ninth lens element and the tenth lens element is T910, and a central thickness of the tenth lens element is CT10, the following condition can be satisfied: $0.30<(T78+T910)/CT10<3.0$. Therefore, it is favorable for balancing the space arrangement in the optical imaging lens system so as to prevent interference in assembling due to overly small space at the periphery of the tenth lens element, or to prevent difficulty when used in portable devices due to overly large space at the image side of the optical imaging lens system. Moreover, the following condition can also be satisfied: $0.80<(T78+T910)/CT10<2.50$.

When an axial distance between the object-side surface of the first lens element and the image-side surface of the tenth lens element is TD, and an entrance pupil diameter of the optical imaging lens system is EPD, the following condition can be satisfied: $1.50<TD/EPD<3.0$. Therefore, it is favorable for spacing of the ten lens elements so as to obtain a compact size of the barrel and become applicable in portable devices. Moreover, the following condition can also be satisfied: $1.50<TD/EPD<2.50$.

When a central thickness of the second lens element is CT2, and a central thickness of the third lens element is CT3, the following condition can be satisfied: $1.20<CT2/CT3<5.0$. Therefore, it is favorable for the second lens element to control the light path better than the third lens element so as to improve image quality. Moreover, the following condition can also be satisfied: $1.30<CT2/CT3<3.0$.

When the axial distance between the third lens element and the fourth lens element is T34, and an axial distance between the eighth lens element and the ninth lens element is T89, the following condition can be satisfied: $0.20<T89/T34<1.10$. Therefore, it is favorable for increasing the symmetry of the optical imaging lens system so as to improve image quality.

When a vertical distance between a critical point on the image-side surface of the tenth lens element and an optical axis is Yc102, and the focal length of the optical imaging lens system is f, the image-side surface of the tenth lens element can have at least one critical point in the off-axis region thereof satisfying the following condition: $0.005<Yc102/f<1.50$. Therefore, it is favorable for controlling distortion at the image periphery and peripheral image brightness. Moreover, the following condition can also be satisfied: $0.01<Yc102/f<1.0$. Moreover, the following condition can also be satisfied: $0.01<Yc102/f<0.60$. Please refer to FIG. 29, which shows a schematic view of Yc102 and the critical point C of the image-side surface of the tenth lens element E10 according to the 1st embodiment of the present disclosure.

According to the present disclosure, at least four lens elements of the optical imaging lens system can be made of plastic material. Therefore, it is favorable for reducing manufacturing costs and increasing design flexibility of the optical imaging lens system so as to optimize the capability for correcting off-axis aberrations.

When the focal length of the optical imaging lens system is f, and the focal length of the second lens element is f2, the following condition can be satisfied: $0.20<f/f2<0.85$. Therefore, it is favorable for balancing the refractive power of the second lens element so as to ensure sufficient light converging capability at the object side of the optical imaging lens system from the second lens element and prevent excessive aberrations caused by lens surfaces being overly curved. Moreover, the following condition can also be satisfied: $0.50<f/f2<0.85$.

When the focal length of the optical imaging lens system is f, and the entrance pupil diameter of the optical imaging lens system is EPD, the following condition can be satisfied: $0.80<f/EPD\leq 2.0$. Therefore, it is favorable for adjusting the entrance pupil so as to provide sufficient incident light to increase image brightness.

When the axial distance between the object-side surface of the first lens element and the image surface is TL, and the focal length of the optical imaging lens system is f, the following condition can be satisfied: $0.80<TL/f<1.30$. Therefore, it is favorable for balancing the total length and the field of view of the optical imaging lens system, thereby making the optical imaging lens system applicable to various applications.

When an Abbe number of the fifth lens element is V5, and an Abbe number of the sixth lens element is V6, the following condition can be satisfied: $10.0<V5+V6<90.0$. Therefore, it is favorable for the lens elements in the middle part of the optical imaging lens system to better control the light path. Moreover, the following condition can also be satisfied: $10.0<V5+V6<75.0$. Moreover, the following condition can also be satisfied: $15.0<V5+V6<60.0$. Moreover, the following condition can also be satisfied: $20.0<V5+V6<50.0$.

When the entrance pupil diameter of the optical imaging lens system is EPD, and an axial distance between the image-side surface of the tenth lens element and the image surface is BL, the following condition can be satisfied: $2.40<EPD/BL<6.0$. Therefore, it is favorable for controlling the back focal length of the optical imaging lens system so as to obtain compactness and sufficient amount of incident light in the optical imaging lens system.

According to the present disclosure, the optical imaging lens system further includes an aperture stop. When an axial distance between the aperture stop and the image-side surface of the tenth lens element is SD, and the axial distance between the object-side surface of the first lens element and the image-side surface of the tenth lens element is TD, the following condition can be satisfied: $0.60<SD/TD<1.20$. Therefore, it is favorable for balancing the position of the aperture stop so as to control the size of the optical imaging lens system. Moreover, the following condition can also be satisfied: $0.70<SD/TD<1.10$. Moreover, the following condition can also be satisfied: $0.80<SD/TD<1.0$.

When the maximum image height of the optical imaging lens system is ImgH, the following condition can be satisfied: 4.50 [mm]<ImgH<12.0 [mm]. Therefore, it is favorable for providing a proper light receiving area with sufficient image brightness so as to meet product specifications. Moreover, the following condition can also be satisfied: 5.50 [mm]<ImgH<12.0 [mm]. Moreover, the following condition can also be satisfied: 6.0 [mm]<ImgH<10.0 [mm].

When the axial distance between the object-side surface of the first lens element and the image surface is TL, the following condition can be satisfied: 4.0 [mm]<TL<15.0 [mm]. Therefore, it is favorable for controlling the total track length of the optical imaging lens system so as to enable more applications of the optical imaging lens system and satisfy market demands thereof. Moreover, the following condition can also be satisfied: 5.0 [mm]<TL<12.0 [mm]. Moreover, the following condition can also be satisfied: 6.0 [mm]<TL<10.0 [mm].

According to the present disclosure, each of at least four lens elements of the optical imaging lens system can have an Abbe number smaller than 40.0. Therefore, it is favorable for providing proper materials of the lens elements in the optical imaging lens system with sufficient control of the light path so as to balance the focusing positions of light rays with different wavelengths, thereby preventing image overlaps.

When the axial distance between the image-side surface of the tenth lens element and the image surface is BL, and the axial distance between the object-side surface of the first lens element and the image-side surface of the tenth lens element is TD, the following condition can be satisfied: $0<BL/TD<0.25$. Therefore, it is favorable for reducing the back focal length so as to control the total track length of the optical imaging lens system.

When the maximum image height of the optical imaging lens system is ImgH, and the axial distance between the image-side surface of the tenth lens element and the image surface is BL, the following condition can be satisfied: 4.0<ImgH/BL<20.0. Therefore, it is favorable for reducing the back focal length while having a large light receiving range. Moreover, the following condition can also be satisfied: 5.0<ImgH/BL<10.0.

When a sum of central thicknesses of all lens elements of the optical imaging lens system is ECT, and the axial distance between the object-side surface of the first lens element and the image-side surface of the tenth lens element is TD, the following condition can be satisfied: 0.50<ECT/TD<0.90. Therefore, it is favorable for balancing the thicknesses of the lens elements so as to better utilize space in the optical imaging lens system.

When the axial distance between the seventh lens element and the eighth lens element is T78, and the axial distance between the eighth lens element and the ninth lens element is T89, the following condition can be satisfied: 0<T89/T78<1.30. Therefore, it is favorable for balancing the space arrangement at the image side of the optical imaging lens system so as to correct aberrations. Moreover, the following condition can also be satisfied: 0.05<T89/T78<0.60.

According to the present disclosure, the aforementioned features and conditions can be utilized in numerous combinations so as to achieve corresponding effects.

According to the present disclosure, the lens elements of the optical imaging lens system can be made of either glass or plastic material. When the lens elements are made of glass material, the refractive power distribution of the optical imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens system, based on the corresponding image sensor, can be flat or curved, especially a curved surface being concave facing towards the object side of the optical imaging lens system.

According to the present disclosure, an image correction unit, such as a field flattener, can be optionally disposed between the lens element closest to the image side of the optical imaging lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 30:
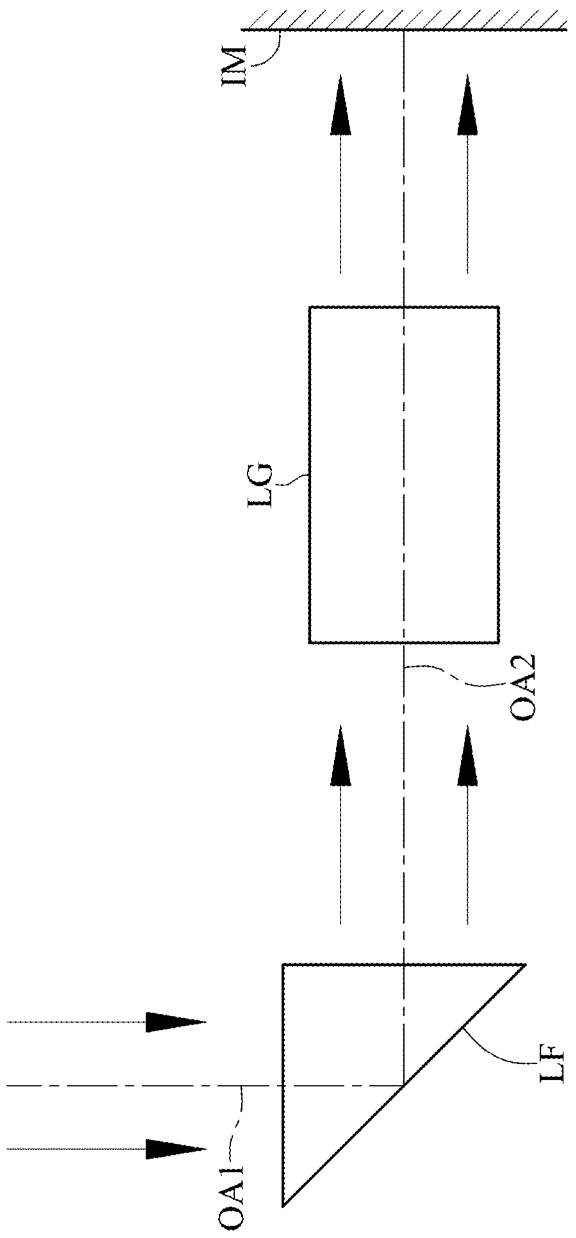
FIG. 30 shows a schematic view of a configuration of a light-folding element in an optical imaging lens system according to one embodiment of the present disclosure.
Figure 31:
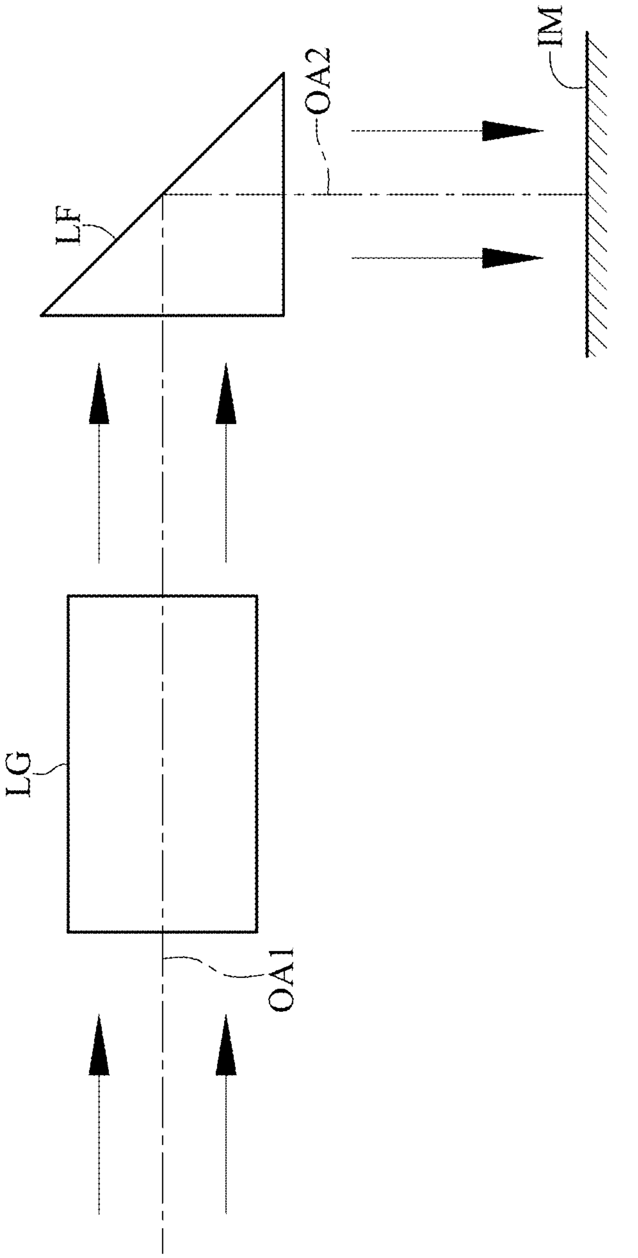
FIG. 31 shows a schematic view of another configuration of a light-folding element in an optical imaging lens system according to one embodiment of the present disclosure.
Figure 32:
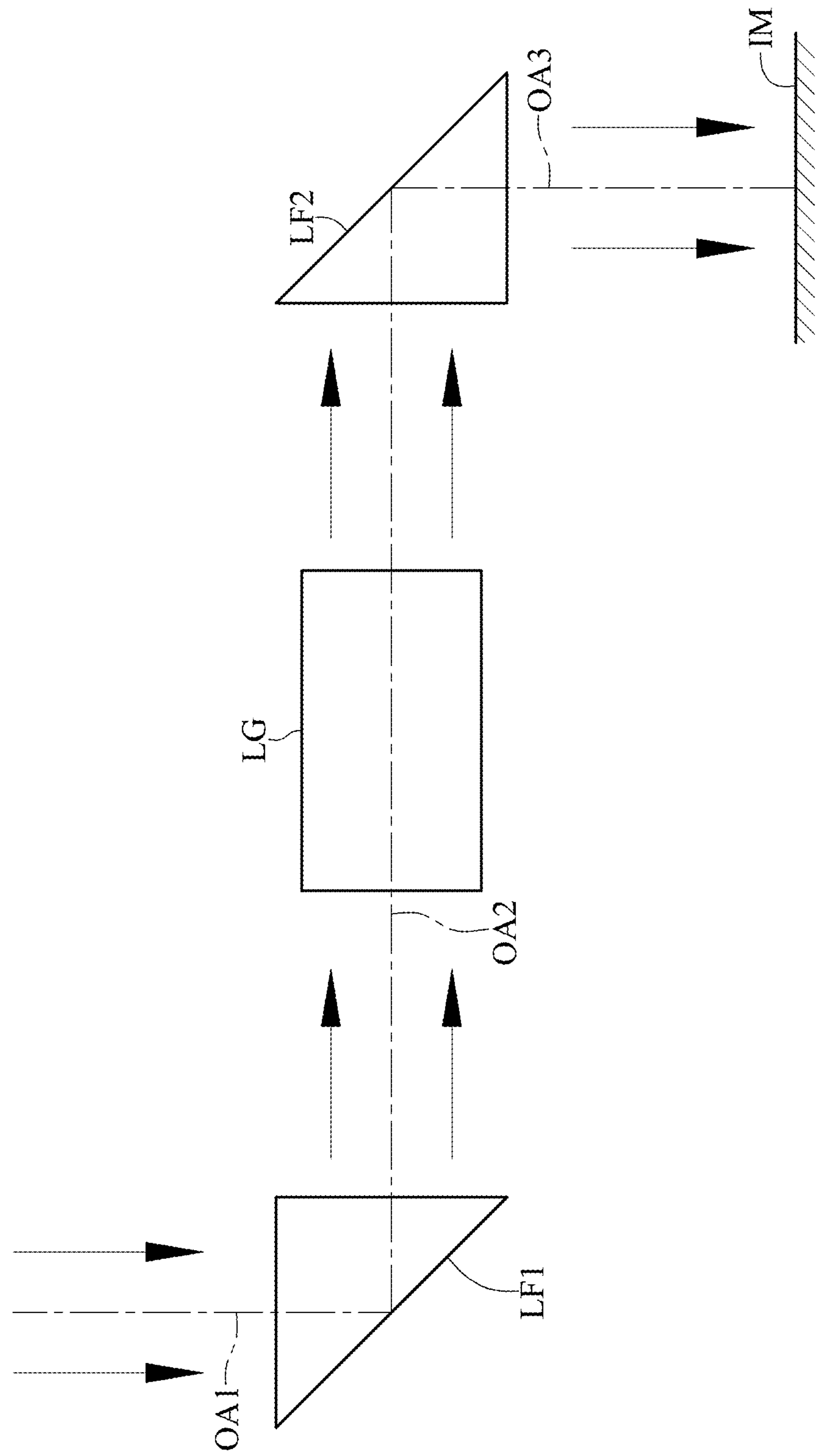
FIG. 32 shows a schematic view of a configuration of two light-folding elements in an optical imaging lens system according to one embodiment of the present disclosure.

According to the present disclosure, at least one light-folding element, such as a prism or a mirror, can be optionally disposed between an imaged object and the image surface on the imaging optical path, such that the optical imaging lens system can be more flexible in space arrangement, and therefore the dimensions of an electronic device is not restricted by the total track length of the optical imaging lens system. Specifically, please refer to FIG. 30 and FIG. 31. FIG. 30 shows a schematic view of a configuration of a light-folding element in an optical imaging lens system according to one embodiment of the present disclosure, and FIG. 31 shows a schematic view of another configuration of a light-folding element in an optical imaging lens system according to one embodiment of the present disclosure. In FIG. 30 and FIG. 31, the optical imaging lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical imaging lens system as shown in FIG. 30 or disposed between a lens group LG of the optical imaging lens system and the image surface IM as shown in FIG. 31. Furthermore, please refer to FIG. 32, which shows a schematic view of a configuration of two light-folding elements in an optical imaging lens system according to one embodiment of the present disclosure. In FIG. 32, the optical imaging lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens system, the second light-folding element LF2 is disposed between the lens group LG of the optical imaging lens system and the image surface IM. The optical imaging lens system can be optionally provided with three or more light-folding elements, and the present disclosure is not limited to the type, amount and position of the light-folding elements of the embodiments disclosed in the aforementioned figures.

According to the present disclosure, the optical imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens system and thereby provides a wider field of view for the same.

According to the present disclosure, the optical imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment.

In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
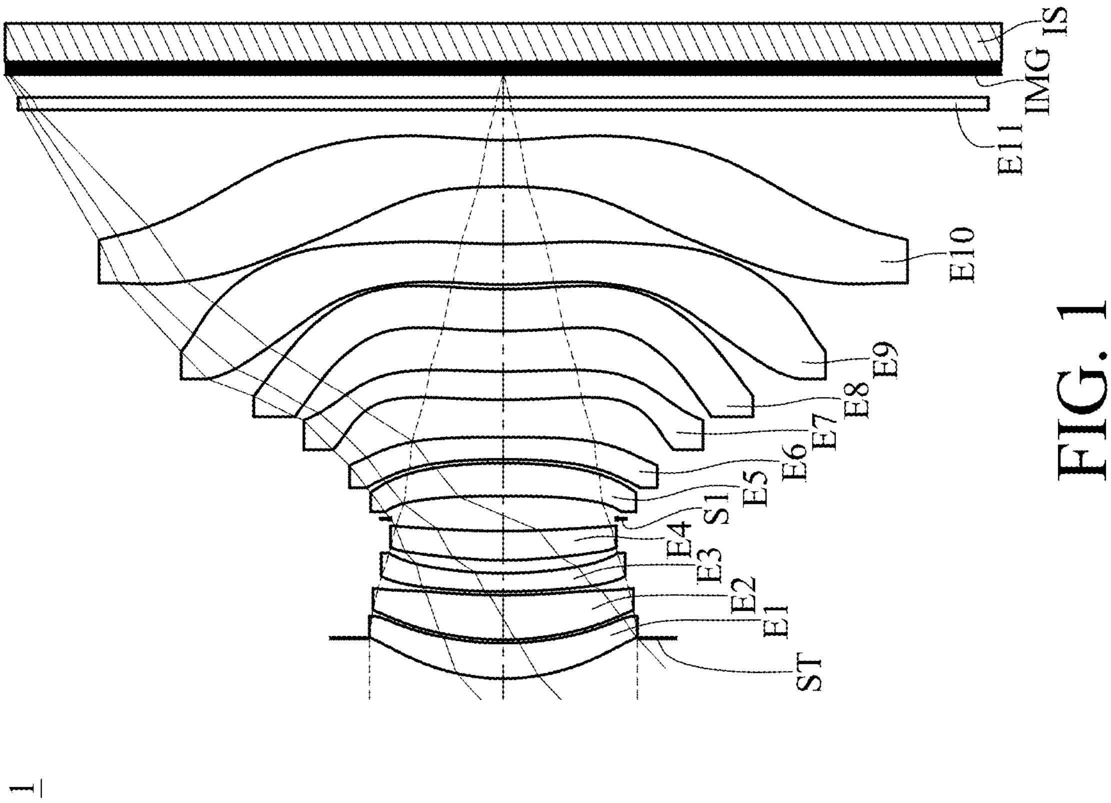
FIG. 1 is a schematic view of an image capturing unit according to the 1st embodiment of the present disclosure.
Figure 2:
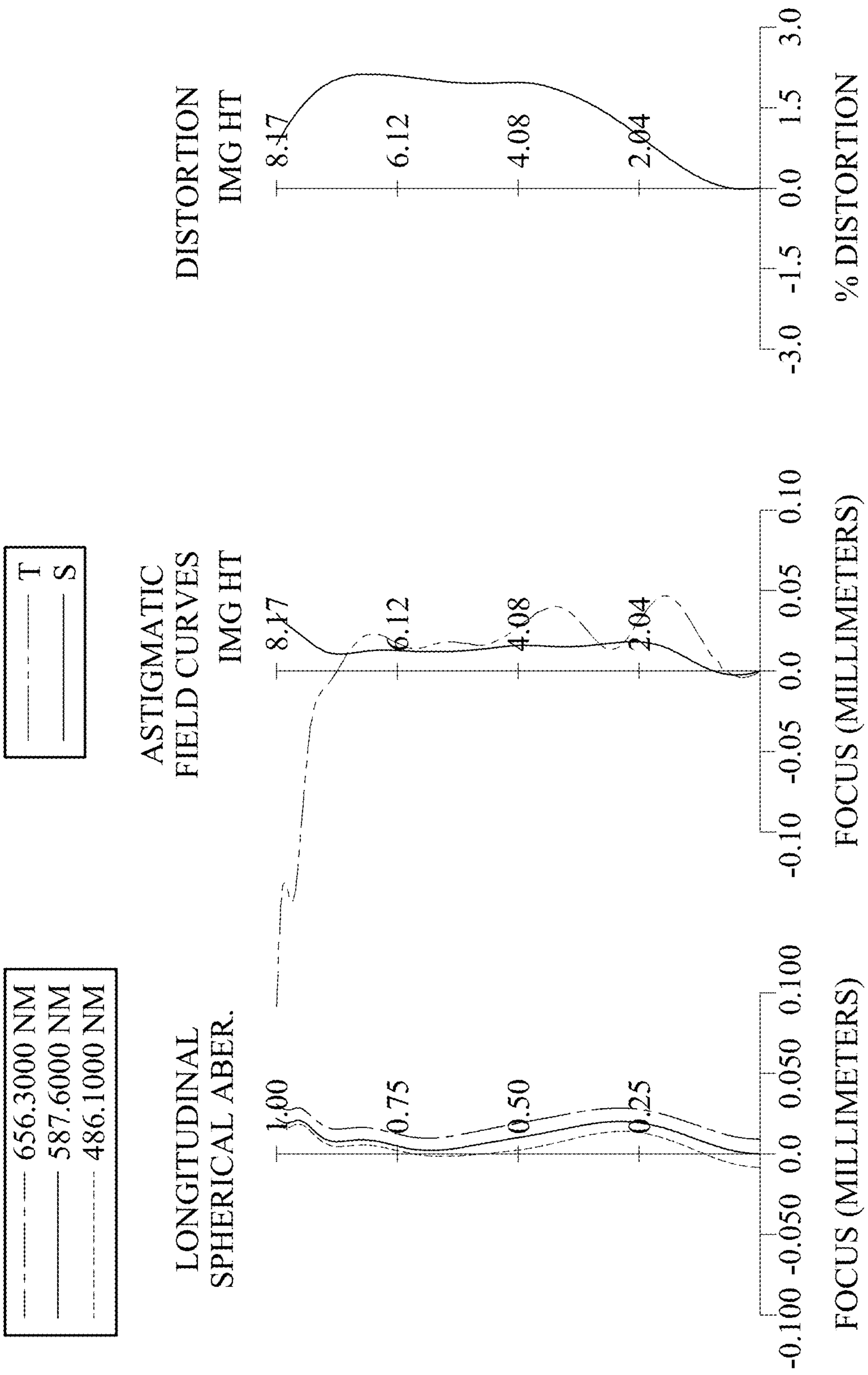
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof.

The ninth lens element E9 with positive refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26 and 28.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=8.64 millimeters (mm), Fno=1.95, HFOV=43.1 degrees (deg.).

When a maximum value among refractive indices of all lens elements of the optical imaging lens system is Nmax, the following condition is satisfied: Nmax=1.686. In this embodiment, refractive indices of the third lens element E3, the sixth lens element E6 and the eighth lens element E8 are the same and larger than refractive indices of the other lens elements of the optical imaging lens system, and Nmax is equal to the refractive indices of the third lens element E3, the sixth lens element E6 and the eighth lens element E8.

When a minimum value among Abbe numbers of all lens elements of the optical imaging lens system is Vmin, the following condition is satisfied: Vmin=18.4. In this embodiment, Abbe numbers of the third lens element E3, the sixth lens element E6 and the eighth lens element E8 are the same and smaller than Abbe numbers of the other lens elements of the optical imaging lens system, and Vmin is equal to the Abbe numbers of the third lens element E3, the sixth lens element E6 and the eighth lens element E8.

When an Abbe number of the second lens element E2 is V2, the following condition is satisfied: V2=56.0.

When an Abbe number of the fifth lens element E5 is V5, and the Abbe number of the sixth lens element E6 is V6, the following condition is satisfied: V5+V6=74.4.

When an Abbe number of the ninth lens element E9 is V9, and an Abbe number of the tenth lens element E10 is V10, the following condition is satisfied: V9+V10=74.8.

When a central thickness of the second lens element E2 is CT2, and a central thickness of the third lens element E3 is CT3, the following condition is satisfied: CT2/CT3=2.44.

When an axial distance between the third lens element E3 and the fourth lens element E4 is T34, and an axial distance between the fourth lens element E4 and the fifth lens element E5 is T45, the following condition is satisfied: T34/T45=0.37. In this embodiment, an axial distance between two adjacent lens elements is a distance in a paraxial region between two adjacent lens surfaces of the two adjacent lens elements.

When the axial distance between the third lens element E3 and the fourth lens element E4 is T34, and an axial distance between the eighth lens element E8 and the ninth lens element E9 is T89, the following condition is satisfied: T89/T34=0.34.

When an axial distance between the seventh lens element E7 and the eighth lens element E8 is T78, and the axial distance between the eighth lens element E8 and the ninth lens element E9 is T89, the following condition is satisfied: T89/T78=0.11.

When the axial distance between the seventh lens element E7 and the eighth lens element E8 is T78, an axial distance between the ninth lens element E9 and the tenth lens element E10 is T910, and a central thickness of the tenth lens element 193 is CT10, the following condition is satisfied: (T78+T910)/CT10=2.10.

When a focal length of the first lens element E1 is f1, and a focal length of the second lens element E2 is f2, the following condition is satisfied: |f2/f1|=0.94.

When the focal length of the optical imaging lens system is f, and the focal length of the second lens element E2 is f2, the following condition is satisfied: f/f2=0.51.

When the focal length of the optical imaging lens system is f, and a focal length of the ninth lens element E9 is f9, the following condition is satisfied: f/f9=0.27.

When the focal length of the optical imaging lens system is f, and an entrance pupil diameter of the optical imaging lens system is EPD, the following condition is satisfied: f/EPD=1.95.

When an axial distance between the image-side surface of the tenth lens element E10 and the image surface IMG is BL, and the entrance pupil diameter of the optical imaging lens system is EPD, the following condition is satisfied: EPD/BL=4.08.

When the axial distance between the image-side surface of the tenth lens element E10 and the image surface IMG is BL, and an axial distance between the object-side surface of the first lens element E1 and the image-side surface of the tenth lens element E10 is TD, the following condition is satisfied: BL/TD=0.12.

When a maximum image height of the optical imaging lens system is ImgH, and the axial distance between the image-side surface of the tenth lens element E10 and the image surface IMG is BL, the following condition is satisfied: ImgH/BL=7.53.

When an axial distance between the aperture stop ST and the image-side surface of the tenth lens element E10 is SD, and the axial distance between the object-side surface of the first lens element E1 and the image-side surface of the tenth lens element E10 is TD, the following condition is satisfied: SD/TD=0.92.

When the axial distance between the object-side surface of the first lens element E1 and the image-side surface of the tenth lens element E10 is TD, and the entrance pupil diameter of the optical imaging lens system is EPD, the following condition is satisfied: TD/EPD=2.01.

When a sum of central thicknesses of all lens elements of the optical imaging lens system is ECT, and the axial distance between the object-side surface of the first lens element E1 and the image-side surface of the tenth lens element E10 is TD, the following condition is satisfied: ECT/TD=0.63. In this embodiment, ECT is the sum of the central thicknesses of the first lens element E1, the second lens element E2, the third lens element E3, the fourth lens element E4, the fifth lens element E5, the sixth lens element E6, the seventh lens element E7, the eighth lens element E8, the ninth lens element E9 and the tenth lens element E10.

When an axial distance between the object-side surface of the first lens element E1 and the image surface IMG is TL, and the focal length of the optical imaging lens system is f, the following condition is satisfied: TL/f=1.16.

When the axial distance between the object-side surface of the first lens element E1 and the image surface IMG is TL, and the maximum image height of the optical imaging lens system is ImgH, the following condition is satisfied: TL/ImgH=1.22.

When the axial distance between the object-side surface of the first lens element E1 and the image surface IMG is TL, the following condition is satisfied: TL=9.99 [mm].

When a vertical distance between a critical point on the image-side surface of the tenth lens element E10 and the optical axis is Yc102, and the focal length of the optical imaging lens system is f, the following condition is satisfied: Yc102/f=0.18.

When the maximum image height of the optical imaging lens system is ImgH, the following condition is satisfied: ImgH=8.17 [mm].

The detailed optical data of the 1st embodiment are shown in Table 1 and the aspheric surface data are shown in Table 2 below.

TABLE 1

| 1st Embodiment f = 8.64 mm, Fno = 1.95, HFOV = 43.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.6700 | | | | |
| 2 | Lens 1 | 3.466002 | (ASP) | 0.5879 | Plastic | 1.545 | 56.1 | 17.97 |
| 3 | | 5.043343 | (ASP) | 0.0559 | | | | |
| 4 | Lens 2 | 5.017566 | (ASP) | 0.7366 | Plastic | 1.544 | 56.0 | 16.89 |
| 5 | | 10.479355 | (ASP) | 0.0600 | | | | |
| 6 | Lens 3 | 10.097068 | (ASP) | 0.3024 | Plastic | 1.686 | 18.4 | −26.68 |
| 7 | | 6.428232 | (ASP) | 0.2150 | | | | |
| 8 | Lens 4 | 7.059028 | (ASP) | 0.4825 | Plastic | 1.544 | 56.0 | 23.88 |
| 9 | | 15.087904 | (ASP) | 0.2018 | | | | |
| 10 | Stop | Plano | | 0.3793 | | | | |
| 11 | Lens 5 | −22.054638 | (ASP) | 0.5446 | Plastic | 1.544 | 56.0 | 27.44 |
| 12 | | −8.979860 | (ASP) | 0.0615 | | | | |
| 13 | Lens 6 | −10.542175 | (ASP) | 0.3675 | Plastic | 1.686 | 18.4 | −25.20 |
| 14 | | −27.399761 | (ASP) | 0.6167 | | | | |
| 15 | Lens 7 | 11.029896 | (ASP) | 0.4670 | Plastic | 1.660 | 20.4 | 874.73 |
| 16 | | 11.055458 | (ASP) | 0.6697 | | | | |
| 17 | Lens 8 | 8.458339 | (ASP) | 0.6919 | Plastic | 1.686 | 18.4 | −210.21 |
| 18 | | 7.723823 | (ASP) | 0.0735 | | | | |
| 19 | Lens 9 | 6.591231 | (ASP) | 0.6732 | Plastic | 1.566 | 37.4 | 32.11 |
| 20 | | 9.958717 | (ASP) | 0.9469 | | | | |
| 21 | Lens 10 | −15.471361 | (ASP) | 0.7704 | Plastic | 1.566 | 37.4 | −7.89 |
| 22 | | 6.389913 | (ASP) | 0.5000 | | | | |
| 23 | Filter | Plano | | 0.2100 | Glass | 1.517 | 64.2 | — |
| 24 | | Plano | | 0.3746 | | | | |
| 25 | Image | Plano | | — | | | | |

Note:

Reference wavelength is 587.6 nm (d-line).

An effective radius of the stop S1 (Surface 10) is 1.870 mm.

TABLE 2

Aspheric Coefficients

| | Surface # 2 | 3 | 4 | 5 | 6 |
|---|---|---|---|---|---|
| k = | −1.324417E+00 | −2.193300E+00 | −1.798617E+00 | −9.900000E+01 | −7.402534E+01 |
| A4 = | 2.123677E−03 | −5.451777E−03 | −5.159817E−03 | −7.412586E−03 | −1.100296E−02 |
| A6 = | 9.533603E−04 | 1.382403E−02 | 1.434509E−02 | 2.110907E−02 | 2.554992E−02 |
| A8 = | −8.909202E−04 | −1.231155E−02 | −1.319559E−02 | −2.186848E−02 | −2.208182E−02 |
| A10 = | 3.260005E−04 | 5.562563E−03 | 6.166269E−03 | 1.066224E−02 | 1.040712E−02 |
| A12 = | −5.619764E−05 | −1.238637E−03 | −1.468452E−03 | −2.787105E−03 | −2.651322E−03 |
| A14 = | 2.910519E−06 | 1.257681E−04 | 1.693223E−04 | 3.790111E−04 | 3.513973E−04 |
| A16 = | 1.911600E−08 | −4.531204E−06 | −7.498732E−06 | −2.091148E−05 | −1.910003E−05 |

| | Surface # 7 | 8 | 9 | 11 | 12 |
|---|---|---|---|---|---|
| k = | −3.035416E+00 | 7.453347E+00 | 5.140991E+00 | 8.659830E+01 | 1.189594E+01 |
| A4 = | −1.231474E−02 | −1.344021E−02 | −2.070783E−03 | −7.279507E−03 | 5.199487E−03 |
| A6 = | 1.258981E−02 | 3.196982E−03 | −8.655884E−04 | 1.865925E−03 | −3.033007E−02 |
| A8 = | −7.724427E−03 | −2.525639E−03 | 4.731792E−04 | −1.451315E−03 | 4.344220E−02 |
| A10 = | 3.200120E−03 | 9.169309E−04 | −4.045585E−04 | 6.215160E−04 | −3.457801E−02 |
| A12 = | −6.758232E−04 | −8.115178E−05 | 2.228406E−04 | −2.406186E−04 | 1.662229E−02 |
| A14 = | 7.333921E−05 | −6.466008E−06 | −5.015298E−05 | 7.106924E−05 | −4.963361E−03 |
| A16 = | −3.448948E−06 | 1.165106E−06 | 3.951906E−06 | −1.312091E−05 | 9.021294E−04 |
| A18 = | — | — | — | 8.775616E−07 | −9.162950E−05 |
| A20 = | — | — | — | — | 3.998799E−06 |

| | Surface # 13 | 14 | 15 | 16 | 17 |
|---|---|---|---|---|---|
| k = | 1.921919E+00 | 8.172279E+01 | 7.098194E+00 | 4.010414E+00 | −1.856142E+01 |
| A4 = | 8.942364E−03 | 2.818995E−03 | −2.085657E−02 | −3.036517E−02 | −1.173629E−02 |
| A6 = | −3.504909E−02 | −1.366803E−02 | 1.220267E−02 | 1.471726E−02 | −1.453079E−03 |
| A8 = | 4.111695E−02 | 1.077967E−02 | −8.781870E−03 | −8.586877E−03 | 1.985966E−03 |
| A10 = | −2.950996E−02 | −5.914020E−03 | 3.672888E−03 | 3.383187E−03 | −1.586632E−03 |
| A12 = | 1.313177E−02 | 2.124037E−03 | −9.183846E−04 | −8.912507E−04 | 6.669013E−04 |
| A14 = | −3.650098E−03 | −4.881893E−04 | 1.170195E−04 | 1.539336E−04 | −1.700897E−04 |
| A16 = | 6.150486E−04 | 6.865450E−05 | −1.806029E−06 | −1.715084E−05 | 2.763053E−05 |
| A18 = | −5.714453E−05 | −5.316932E−06 | −1.475188E−06 | 1.192529E−06 | −2.856054E−06 |
| A20 = | 2.232669E−06 | 1.722091E−07 | 1.755565E−07 | −4.726072E−08 | 1.809531E−07 |
| A22 = | — | — | −6.452761E−09 | 8.169010E−10 | −6.382013E−09 |
| A24 = | — | — | — | — | 9.565793E−11 |

| | Surface # 18 | 19 | 20 | 21 | 22 |
|---|---|---|---|---|---|
| k = | −3.038765E+01 | −1.587371E+00 | −6.049788E−01 | 2.387568E+00 | −1.087728E+00 |
| A4 = | −2.167463E−02 | −4.234399E−02 | −1.833410E−02 | −3.072380E−02 | −3.048168E−02 |
| A6 = | 9.998236E−03 | 1.114594E−02 | −6.352804E−04 | 4.770642E−03 | 6.199514E−03 |
| A8 = | −4.760894E−03 | −2.682085E−03 | 1.730666E−03 | −2.072364E−04 | −1.000633E−03 |
| A10 = | 1.374503E−03 | 5.706806E−04 | −5.075066E−04 | −1.776184E−05 | 1.243113E−04 |
| A12 = | −2.557189E−04 | −9.670959E−05 | 8.174915E−05 | 2.671121E−06 | −1.172427E−05 |
| A14 = | 3.175893E−05 | 1.158133E−05 | −8.660303E−06 | −1.339899E−07 | 8.209597E−07 |
| A16 = | −2.655009E−06 | −9.365296E−07 | 6.408108E−07 | 2.020728E−09 | −4.198709E−08 |
| A18 = | 1.473808E−07 | 5.052198E−08 | −3.378467E−08 | 1.090339E−10 | 1.549904E−09 |
| A20 = | −5.207151E−09 | −1.789036E−09 | 1.265253E−09 | −7.206480E−12 | −4.065676E−11 |
| A22 = | 1.061024E−10 | 3.988632E−11 | −3.286152E−11 | 2.001589E−13 | 7.371447E−13 |
| A24 = | −9.512797E−13 | −5.071292E−13 | 5.614409E−13 | −3.129156E−15 | −8.766563E−15 |
| A26 = | — | 2.799198E−15 | −5.655389E−15 | 2.693503E−17 | 6.145455E−17 |
| A28 = | — | — | 2.533824E−17 | −1.000265E−19 | −1.923024E−19 |

In Table 1, the curvature radius, the thickness and the focal length are shown in millimeters (mm). Surface numbers 0-25 represent the surfaces sequentially arranged from the object side to the image side along the optical axis. In Table 2, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
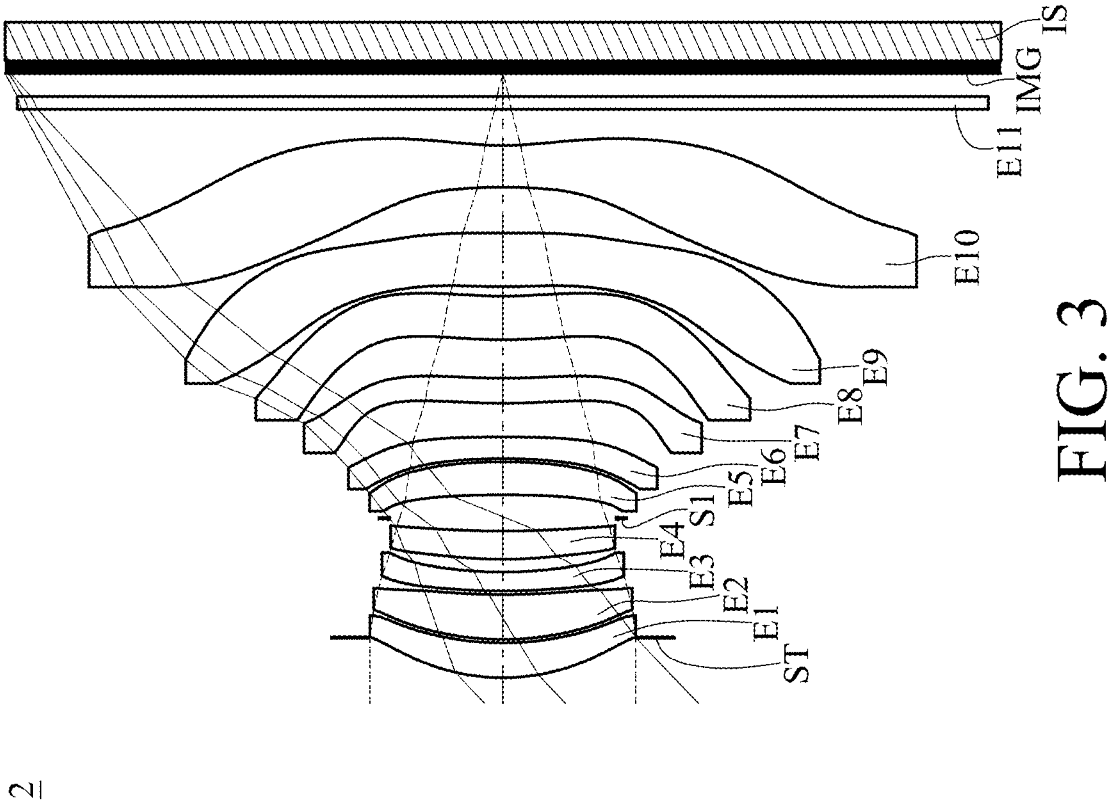
FIG. 3 is a schematic view of an image capturing unit according to the 2nd embodiment of the present disclosure.
Figure 4:
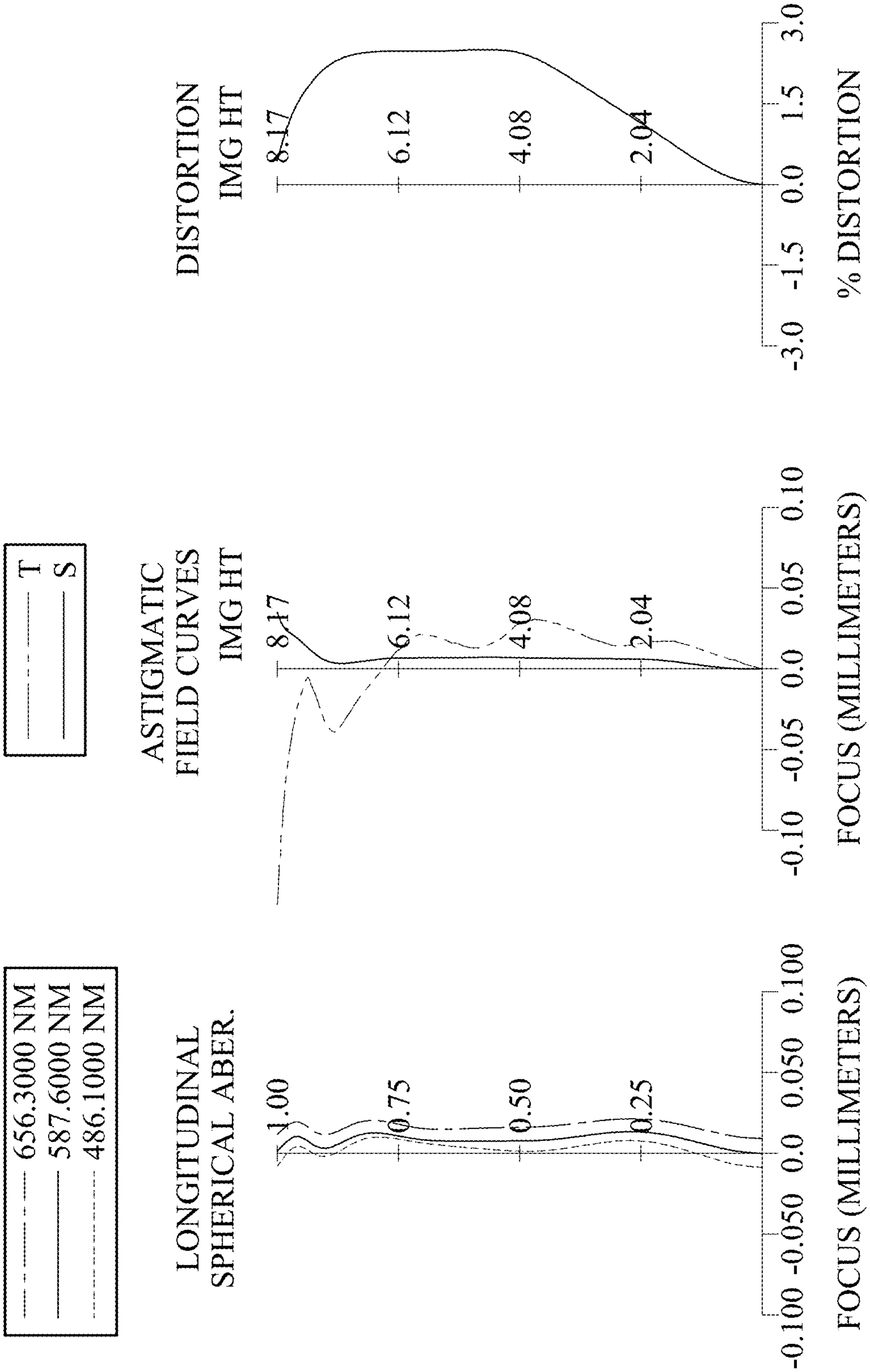
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has at least one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point. The image-side surface of the sixth lens element E6 has at least one inflection point.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof.

The ninth lens element E9 with positive refractive power has an object-side surface being convex in a paraxial region thereof and an image-side surface being convex in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 2nd embodiment are shown in Table 3 and the aspheric surface data are shown in Table 4 below.

TABLE 3

| 2nd Embodiment<br>f = 8.56 mm, Fno = 1.95, HFOV = 43.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.6658 | | | | |
| 2 | Lens 1 | 3.423522 | (ASP) | 0.5763 | Plastic | 1.545 | 56.1 | 18.58 |
| 3 | | 4.865251 | (ASP) | 0.0569 | | | | |
| 4 | Lens 2 | 4.839446 | (ASP) | 0.7415 | Plastic | 1.544 | 56.0 | 16.25 |
| 5 | | 10.115320 | (ASP) | 0.0600 | | | | |
| 6 | Lens 3 | 9.717992 | (ASP) | 0.3117 | Plastic | 1.686 | 18.4 | −28.18 |

TABLE 3-continued

| 2nd Embodiment f = 8.56 mm, Fno = 1.95, HFOV = 43.5 deg. | | | | | | | | |
|---|---|---|---|---|---|---|---|---|
| Surface # | | Curvature Radius | | Thickness | Material | Index | Abbe # | Focal Length |
| 7 | | 6.383190 | (ASP) | 0.2123 | | | | |
| 8 | Lens 4 | 7.202817 | (ASP) | 0.4665 | Plastic | 1.544 | 56.0 | 24.44 |
| 9 | | 15.354585 | (ASP) | 0.2103 | | | | |
| 10 | Stop | Plano | | 0.3879 | | | | |
| 11 | Lens 5 | −21.728275 | (ASP) | 0.5483 | Plastic | 1.544 | 56.0 | 26.14 |
| 12 | | −8.671299 | (ASP) | 0.0500 | | | | |
| 13 | Lens 6 | −9.888293 | (ASP) | 0.3600 | Plastic | 1.686 | 18.4 | −24.84 |
| 14 | | −23.909477 | (ASP) | 0.5577 | | | | |
| 15 | Lens 7 | 11.222605 | (ASP) | 0.4142 | Plastic | 1.660 | 20.4 | −183.62 |
| 16 | | 10.120628 | (ASP) | 0.6362 | | | | |
| 17 | Lens 8 | 8.221806 | (ASP) | 0.7206 | Plastic | 1.686 | 18.4 | −202.29 |
| 18 | | 7.485154 | (ASP) | 0.1573 | | | | |
| 19 | Lens 9 | 10.308304 | (ASP) | 0.8853 | Plastic | 1.564 | 35.7 | 18.08 |
| 20 | | −881.057269 | (ASP) | 0.7562 | | | | |
| 21 | Lens 10 | −14.715008 | (ASP) | 0.6933 | Plastic | 1.566 | 37.4 | −7.16 |
| 22 | | 5.688281 | (ASP) | 0.6000 | | | | |
| 23 | Filter | Plano | | 0.2100 | Glass | 1.517 | 64.2 | — |
| 24 | | Plano | | 0.7153 | | | | |
| 25 | Image | Plano | | — | | | | |

Note:
Reference wavelength is 587.6 nm (d-line).
An effective radius of the stop S1 (Surface 10) is 1.880 mm.

TABLE 4

| Aspheric Coefficients | | | | | |
|---|---|---|---|---|---|
| | Surface # | | | | |
| | 2 | 3 | 4 | 5 | 6 |
| k = | −1.322475E+00 | −2.270917E+00 | −1.775987E+00 | −9.811049E+01 | −7.523649E+01 |
| A4 = | 2.129938E−03 | −5.525974E−03 | −5.136355E−03 | −7.469637E−03 | −1.096496E−02 |
| A6 = | 9.538040E−04 | 1.379867E−02 | 1.435343E−02 | 2.109239E−02 | 2.557586E−02 |
| A8 = | −8.940143E−04 | −1.231439E−02 | −1.319796E−02 | −2.187124E−02 | −2.207761E−02 |
| A10 = | 3.252167E−04 | 5.561980E−03 | 6.165774E−03 | 1.066208E−02 | 1.040697E−02 |
| A12 = | −5.633606E−05 | −1.238806E−03 | −1.468501E−03 | −2.787362E−03 | −2.651657E−03 |
| A14 = | 2.898045E−06 | 1.257345E−04 | 1.692848E−04 | 3.789362E−04 | 3.516025E−04 |
| A16 = | 1.887489E−08 | −4.527935E−06 | −7.499698E−06 | −2.087708E−05 | −1.909139E−05 |
| | Surface # | | | | |
| | 7 | 8 | 9 | 11 | 12 |
| k = | −3.107942E+00 | 7.224937E+00 | 4.668831E+00 | 8.450085E+01 | 1.055436E+01 |
| A4 = | −1.234722E−02 | −1.346263E−02 | −2.101464E−03 | −7.231190E−03 | 5.083365E−03 |
| A6 = | 1.259214E−02 | 3.100207E−03 | −8.115299E−04 | 1.954292E−03 | −3.036753E−02 |
| A8 = | −7.728981E−03 | −2.553675E−03 | 4.828810E−04 | −1.430799E−03 | 4.343068E−02 |
| A10 = | 3.196294E−03 | 9.159032E−04 | −4.064997E−04 | 6.239089E−04 | −3.458029E−02 |
| A12 = | −6.766129E−04 | −8.026352E−05 | 2.234660E−04 | −2.411237E−04 | 1.662194E−02 |
| A14 = | 7.415369E−05 | −5.786192E−06 | −4.992293E−05 | 7.084816E−05 | −4.963382E−03 |
| A16 = | −3.448948E−06 | 1.165106E−06 | 3.951906E−06 | −1.312091E−05 | 9.021349E−04 |
| A18 = | — | — | — | 8.775616E−07 | −9.162950E−05 |
| A20 = | — | — | — | — | 3.998799E−06 |
| | Surface # | | | | |
| | 13 | 14 | 15 | 16 | 17 |
| k = | 2.155096E+00 | 7.102844E+01 | 5.628502E+00 | 3.647295E+00 | −1.903010E+01 |
| A4 = | 8.843008E−03 | 2.723803E−03 | −1.208736E−02 | −2.122879E−02 | −1.326767E−02 |
| A6 = | −3.507094E−02 | −1.364060E−02 | −1.878105E−03 | 2.146321E−03 | 7.746263E−04 |
| A8 = | 4.111011E−02 | 1.078544E−02 | 2.390720E−03 | 2.675846E−04 | −4.603528E−04 |
| A10 = | −2.951168E−02 | −5.913365E−03 | −1.549331E−03 | −3.606820E−04 | −1.542612E−04 |
| A12 = | 1.313149E−02 | 2.124006E−03 | 5.894332E−04 | 1.185348E−04 | 1.858398E−04 |
| A14 = | −3.650104E−03 | −4.882085E−04 | −1.530970E−04 | −2.422485E−05 | −6.855378E−05 |
| A16 = | 6.150604E−04 | 6.865091E−05 | 2.693274E−05 | 3.322150E−06 | 1.354561E−05 |
| A18 = | −5.714058E−05 | −5.317168E−06 | −3.047294E−06 | −2.817362E−07 | −1.564650E−06 |
| A20 = | 2.232669E−06 | 1.722126E−07 | 1.979010E−07 | 1.302711E−08 | 1.053628E−07 |
| A22 = | — | — | −5.513661E−09 | −2.493054E−10 | −3.822535E−09 |
| A24 = | — | — | — | — | 5.757680E−11 |

TABLE 4-continued

| Aspheric Coefficients | | | | | |
|---|---|---|---|---|---|
| | Surface # | | | | |
| | 18 | 19 | 20 | 21 | 22 |
| k = | −3.656456E+01 | −1.000000E+00 | −1.000000E+00 | 1.881513E+00 | −1.356257E+00 |
| A4 = | −2.389820E−02 | −4.522129E−02 | −1.658082E−02 | −2.900807E−02 | −2.701182E−02 |
| A6 = | 1.020546E−02 | 1.450131E−02 | 1.907560E−03 | 4.397484E−03 | 5.136932E−03 |
| A8 = | −4.601177E−03 | −3.691784E−03 | 3.622923E−04 | −1.974097E−04 | −7.891988E−04 |
| A10 = | 1.328875E−03 | 7.104035E−04 | −1.284505E−04 | −1.251359E−05 | 9.499306E−05 |
| A12 = | −2.533612E−04 | −1.005029E−04 | 1.679627E−05 | 1.831005E−06 | −8.695090E−06 |
| A14 = | 3.244324E−05 | 1.000341E−05 | −1.227850E−06 | −6.774125E−08 | 5.867326E−07 |
| A16 = | −2.786445E−06 | −6.823934E−07 | 4.945342E−08 | −1.264032E−09 | −2.870451E−08 |
| A18 = | 1.576586E−07 | 3.139346E−08 | −5.148481E−10 | 2.183675E−10 | 1.008252E−09 |
| A20 = | −5.623110E−09 | −9.508236E−10 | −5.552236E−11 | −9.672462E−12 | −2.508421E−11 |
| A22 = | 1.144785E−10 | 1.803564E−11 | 3.337886E−12 | 2.367302E−13 | 4.305181E−13 |
| A24 = | −1.014865E−12 | −1.922471E−13 | −8.997851E−14 | −3.457671E−15 | −4.841603E−15 |
| A26 = | — | 8.648859E−16 | 1.262853E−15 | 2.840164E−17 | 3.207957E−17 |
| A28 = | — | — | −7.474652E−18 | −1.016175E−19 | −9.487032E−20 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again. Moreover, these parameters can be calculated from Table 3 and Table 4 as the following values and satisfy the following conditions:

| 2nd Embodiment | | | |
|---|---|---|---|
| f [mm] | 8.56 | f/f2 | 0.53 |
| Fno | 1.95 | f/f9 | 0.47 |
| HFOV [deg.] | 43.5 | f/EPD | 1.95 |
| Nmax | 1.686 | EPD/BL | 3.69 |
| Vmin | 18.4 | BL/TD | 0.14 |
| V2 | 56.0 | ImgH/BL | 6.86 |
| V5 + V6 | 74.4 | SD/TD | 0.92 |
| V9 + V10 | 73.1 | TD/EPD | 2.00 |
| CT2/CT3 | 2.38 | ΣCT/TD | 0.65 |
| T34/T45 | 0.35 | TL/f | 1.17 |
| T89/T34 | 0.74 | TL/ImgH | 1.22 |
| T89/T78 | 0.25 | TL [mm] | 9.99 |
| (T78 + T910)/CT10 | 2.01 | Yc102/f | 0.22 |
| \|f2/f1\| | 0.87 | ImgH [mm] | 8.17 |

3rd Embodiment

Figure 5:
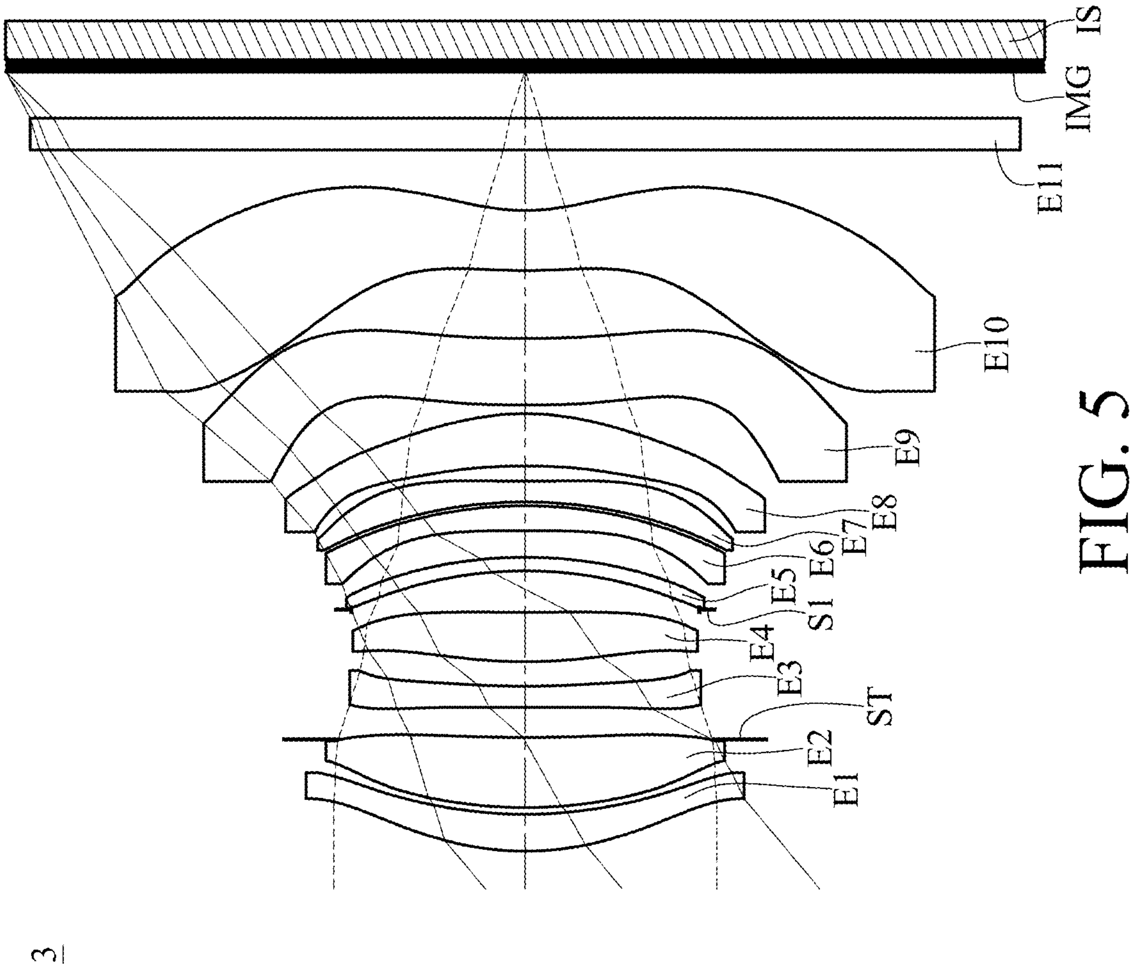
FIG. 5 is a schematic view of an image capturing unit according to the 3rd embodiment of the present disclosure.
Figure 6:
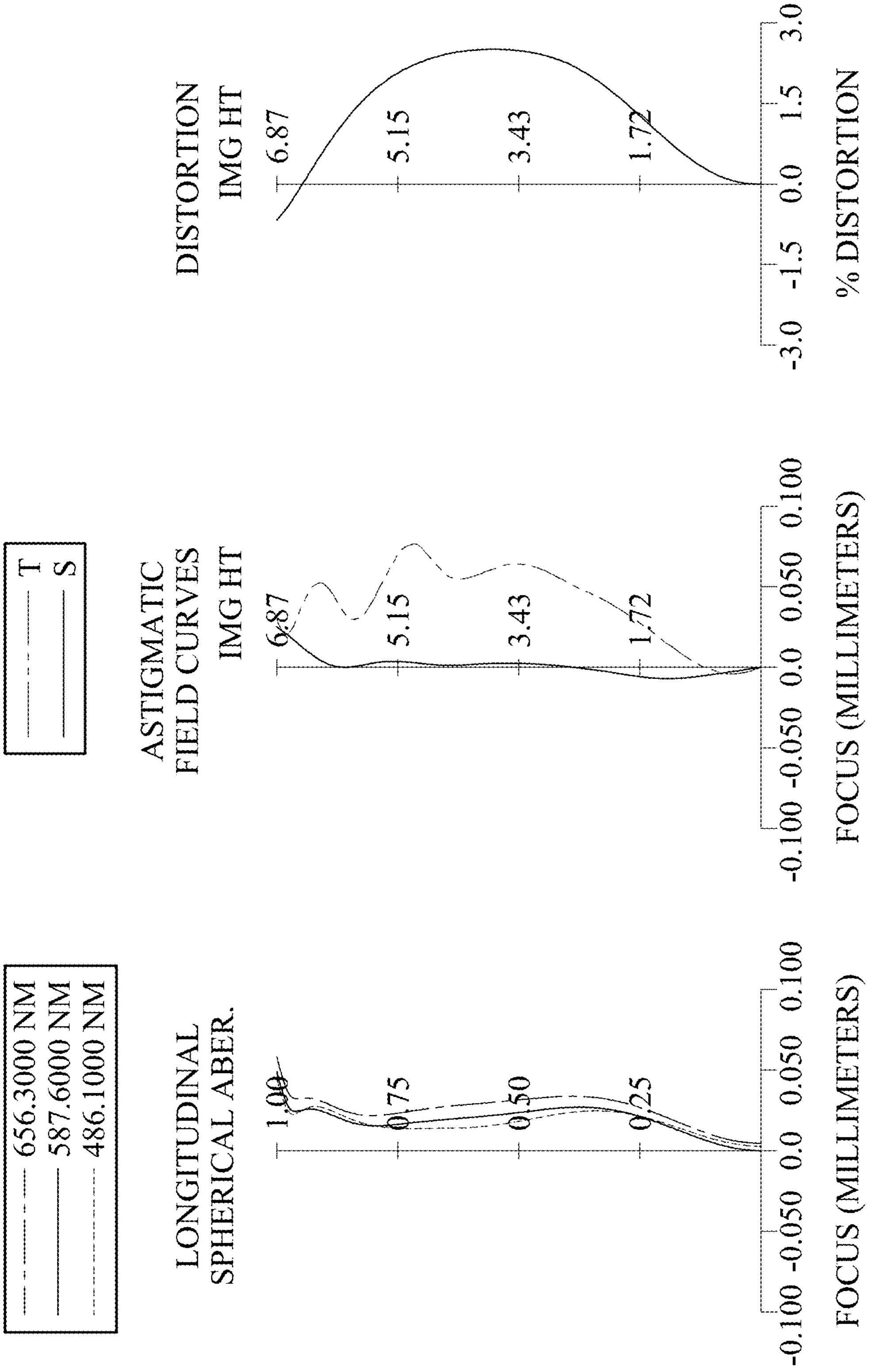
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens system (its reference numeral is omitted) of the present disclosure and an image sensor IS. The optical imaging lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one inflection point.

The eighth lens element E8 with positive refractive power has an object-side surface being concave in a paraxial region thereof and an image-side surface being convex in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point.

The ninth lens element E9 with negative refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being convex in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of plastic material and located between the tenth lens element E10 and the image surface IMG, and will not affect the focal length of the optical imaging lens system. The image sensor IS is disposed on or near the image surface IMG of the optical imaging lens system.

The detailed optical data of the 3rd embodiment are shown in Table 5 and the aspheric surface data are shown in Table 6 below.

TABLE 5

3rd Embodiment
f = 8.26 mm, Fno = 1.63, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.915216 | (ASP) | 0.4870 | Plastic | 1.545 | 56.0 | 22.62 |
| 2 | | 5.487495 | (ASP) | 0.0890 | | | | |
| 3 | Lens 2 | 5.888893 | (ASP) | 0.9280 | Plastic | 1.545 | 56.0 | 14.87 |
| 4 | | 20.389463 | (ASP) | −0.0240 | | | | |
| 5 | Ape. Stop | Plano | | 0.4210 | | | | |
| 6 | Lens 3 | 69.399360 | (ASP) | 0.2800 | Plastic | 1.669 | 19.5 | −19.45 |
| 7 | | 10.942615 | (ASP) | 0.3240 | | | | |
| 8 | Lens 4 | 6.513914 | (ASP) | 0.6550 | Plastic | 1.544 | 56.0 | 12.75 |
| 9 | | 103.549206 | (ASP) | 0.0350 | | | | |
| 10 | Stop | Plano | | 0.5120 | | | | |
| 11 | Lens 5 | −5.465100 | (ASP) | 0.1800 | Plastic | 1.566 | 37.4 | −112.07 |
| 12 | | −6.051500 | (ASP) | 0.3530 | | | | |
| 13 | Lens 6 | −41.161588 | (ASP) | 0.3290 | Plastic | 1.660 | 20.4 | 10.57 |
| 14 | | −5.984500 | (ASP) | 0.0500 | | | | |
| 15 | Lens 7 | −6.017000 | (ASP) | 0.2740 | Plastic | 1.660 | 20.4 | −7.03 |
| 16 | | 20.690559 | (ASP) | 0.2010 | | | | |
| 17 | Lens 8 | −8.922722 | (ASP) | 0.6930 | Plastic | 1.544 | 56.0 | 9.92 |
| 18 | | −3.455080 | (ASP) | 0.1140 | | | | |
| 19 | Lens 9 | 20.363621 | (ASP) | 0.8800 | Plastic | 1.669 | 19.5 | −114.09 |
| 20 | | 15.796547 | (ASP) | 0.9000 | | | | |
| 21 | Lens 10 | 7.705553 | (ASP) | 0.7930 | Plastic | 1.544 | 56.0 | −7.82 |
| 22 | | 2.640792 | (ASP) | 0.8000 | | | | |
| 23 | Filter | Plano | | 0.4200 | Plastic | 1.544 | 56.0 | — |
| 24 | | Plano | | 0.6085 | | | | |
| 25 | Image | Plano | | — | | | | |

Note:

Reference wavelength is 587.6 nm (d-line).

An effective radius of the stop S1 (Surface 10) is 2.300 mm.

TABLE 6

| Aspheric Coefficients | | | | | |
|---|---|---|---|---|---|
| | Surface # | | | | |
| | 1 | 2 | 3 | 4 | 6 |
| k = | −6.314559E−01 | −6.271914E−01 | 2.084682E+00 | 5.493979E+01 | 9.000000E+01 |
| A4 = | −2.741777E−03 | −1.008686E−02 | −9.119547E−03 | −4.672870E−03 | −8.845852E−03 |
| A6 = | 6.995220E−04 | 4.555621E−03 | 4.189294E−03 | 3.016947E−04 | 1.710170E−03 |
| A8 = | −3.411525E−04 | −1.363890E−03 | −1.174728E−03 | −3.223151E−04 | −2.108555E−04 |
| A10 = | 4.995106E−05 | 2.909490E−04 | 2.595855E−04 | 6.621464E−05 | 5.825233E−05 |
| A12 = | −4.772775E−06 | −3.573189E−05 | −3.252407E−05 | −4.907226E−06 | −3.909367E−06 |
| A14 = | 2.125485E−07 | 1.699479E−06 | 1.432005E−06 | 0.000000E+00 | −4.433636E−08 |
| | Surface # | | | | |
| | 7 | 8 | 9 | 11 | 12 |
| k = | −2.976859E+01 | −1.588839E+01 | 3.383414E+01 | −2.902372E−01 | 1.132726E+00 |
| A4 = | −8.438358E−03 | −1.158720E−03 | −4.087094E−03 | −3.106785E−06 | −2.711913E−04 |
| A6 = | 1.407088E−03 | −1.393023E−03 | −1.456882E−03 | −7.633077E−05 | 4.441682E−05 |
| A8 = | 1.227606E−04 | −1.258772E−07 | 1.355436E−04 | 1.658392E−06 | −2.458957E−06 |
| A10 = | −2.250843E−05 | 7.457765E−08 | −8.075493E−05 | 3.649048E−06 | −2.825677E−06 |
| A12 = | 5.639570E−06 | 3.927212E−06 | 2.086967E−05 | 1.809059E−16 | −2.307270E−16 |
| A14 = | −1.682513E−07 | −1.404032E−07 | −1.589591E−06 | 3.164451E−08 | −3.992677E−08 |
| | Surface # | | | | |
| | 13 | 14 | 15 | 16 | 17 |
| k = | −9.000000E+01 | 2.247460E−01 | 1.775548E−02 | 4.159403E+01 | 9.136284E+00 |
| A4 = | −1.768873E−02 | −2.676548E−04 | 4.708714E−05 | −2.225701E−02 | −1.524652E−02 |
| A6 = | −3.300040E−03 | −3.099053E−06 | −1.570132E−05 | −3.568965E−03 | 6.389601E−03 |
| A8 = | 2.664723E−03 | 9.201344E−07 | −3.120251E−06 | 4.472182E−03 | 1.079874E−03 |
| A10 = | −1.188430E−03 | 1.523524E−07 | −4.416529E−07 | −1.793133E−03 | −1.055883E−03 |
| A12 = | 2.912892E−04 | −4.339363E−09 | −9.456102E−09 | 3.514906E−04 | 2.401145E−04 |
| A14 = | −3.595735E−05 | — | — | −3.417306E−05 | −2.460835E−05 |
| A16 = | 1.751509E−06 | — | — | 1.319986E−06 | 9.809203E−07 |
| | Surface # | | | | |
| | 18 | 19 | 20 | 21 | 22 |
| k = | −1.037686E+00 | 1.229703E+01 | −7.642840E+00 | −4.559653E+00 | −5.632337E+00 |
| A4 = | 1.434782E−02 | 2.352303E−02 | 6.666439E−03 | −4.645464E−02 | −2.353274E−02 |
| A6 = | −3.843690E−03 | −1.259247E−02 | −2.779619E−03 | 7.403054E−03 | 4.130416E−03 |
| A8 = | 8.545744E−04 | 3.229943E−03 | 1.900991E−04 | −1.090436E−03 | −6.014629E−04 |
| A10 = | −3.906695E−05 | −6.217201E−04 | 2.562712E−05 | 1.276717E−04 | 6.513436E−05 |
| A12 = | −1.943747E−05 | 8.479526E−05 | −7.098738E−06 | −8.711592E−06 | −4.969515E−06 |
| A14 = | 2.964716E−06 | −7.632130E−06 | 7.354156E−07 | 2.402030E−07 | 2.617017E−07 |
| A16 = | −1.212972E−07 | 3.920922E−07 | −4.142181E−08 | 6.241164E−09 | −9.310803E−09 |
| A18 = | — | −8.484735E−09 | 1.254133E−09 | −6.527857E−10 | 2.140859E−10 |
| A20 = | — | — | −1.598061E−11 | 1.782577E−11 | −2.883344E−12 |
| A22 = | — | — | — | −1.726728E−13 | 1.737479E−14 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again. Moreover, these parameters can be calculated from Table 5 and Table 6 as the following values and satisfy the following conditions:

| 3rd Embodiment | | | |
|---|---|---|---|
| f [mm] | 8.26 | f/f2 | 0.56 |
| Fno | 1.63 | f/f9 | −0.07 |
| HFOV [deg.] | 39.9 | f/EPD | 1.63 |
| Nmax | 1.669 | EPD/BL | 2.77 |
| Vmin | 19.5 | BL/TD | 0.22 |
| V2 | 56.0 | ImgH/BL | 3.76 |

-continued

| 3rd Embodiment | | | |
|---|---|---|---|
| V5 + V6 | 57.8 | SD/TD | 0.83 |
| V9 + V10 | 75.5 | TD/EPD | 1.67 |
| CT2/CT3 | 3.31 | ΣCT/TD | 0.65 |
| T34/T45 | 0.59 | TL/f | 1.25 |
| T89/T34 | 0.35 | TL/ImgH | 1.50 |
| T89/T78 | 0.57 | TL [mm] | 10.30 |
| (T78 + T910)/CT10 | 1.39 | Yc102/f | 0.27 |
| \|f2/f1\| | 0.66 | ImgH [mm] | 6.87 |

4th Embodiment

Figure 7:
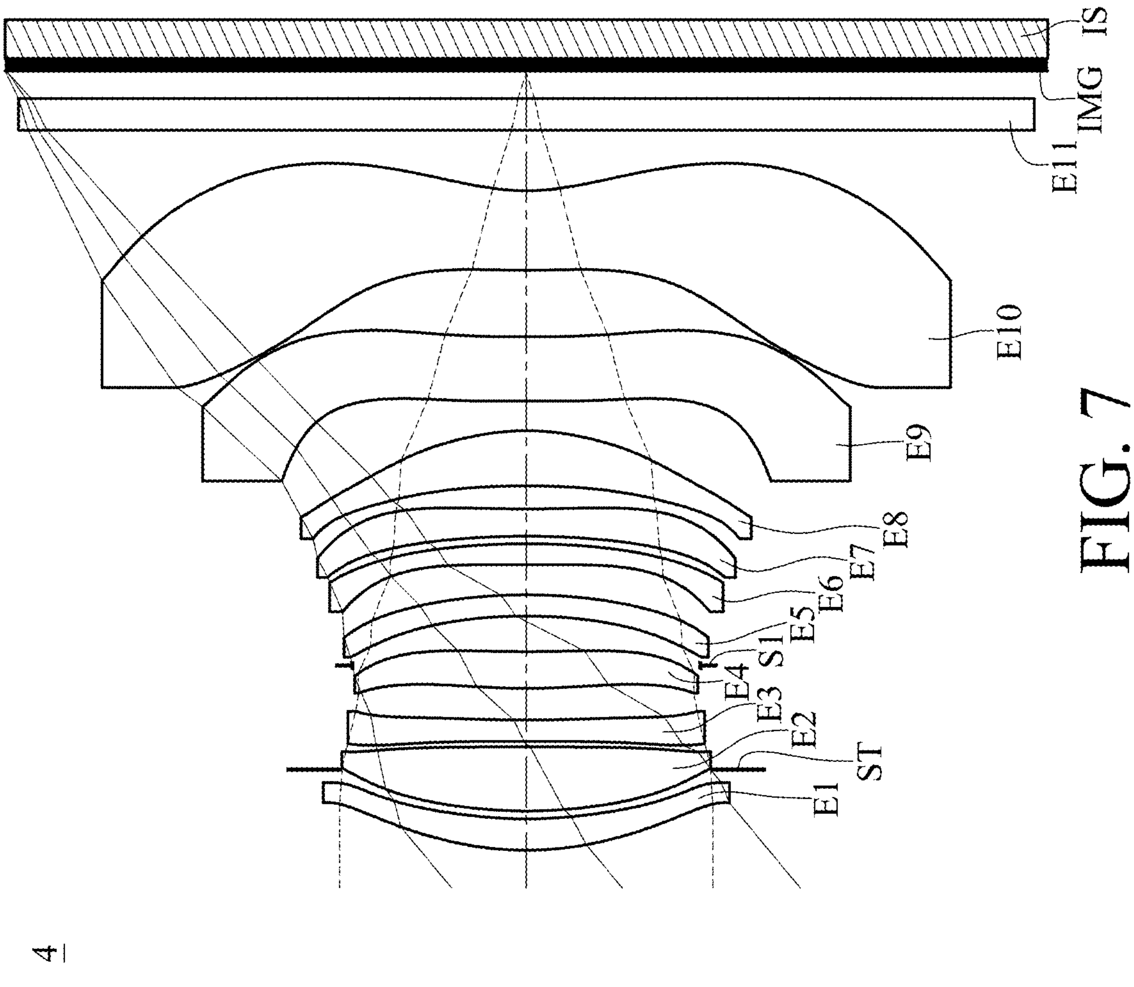
FIG. 7 is a schematic view of an image capturing unit according to the 4th embodiment of the present disclosure.
Figure 8:
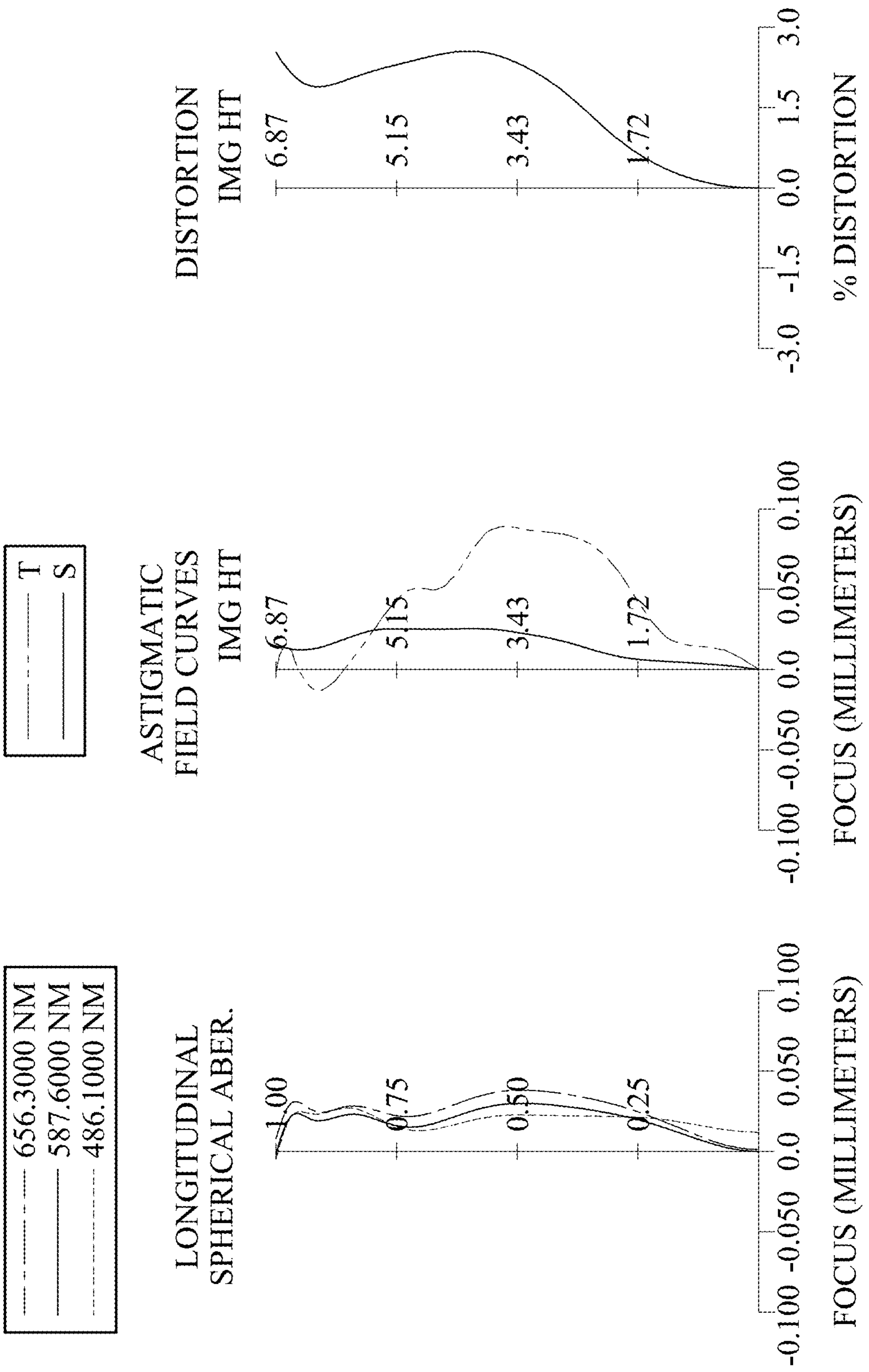
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has at least one inflection point.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point. The image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has at least one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one inflection point.

The eighth lens element E8 with positive refractive power has an object-side surface being concave in a paraxial region thereof and an image-side surface being convex in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point.

The ninth lens element E9 with negative refractive power has an object-side surface being concave in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being convex in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 4th embodiment are shown in Table 7 and the aspheric surface data are shown in Table 8 below.

TABLE 7

| 4th Embodiment<br>f = 8.05 mm, Fno = 1.63, HFOV = 39.7 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.182918 | (ASP) | 0.4150 | Plastic | 1.545 | 56.0 | 27.63 |
| 2 | | 5.590409 | (ASP) | 0.6540 | | | | |
| 3 | Ape. Stop | Plano | | −0.5500 | | | | |

TABLE 7-continued

| 4th Embodiment<br>f = 8.05 mm, Fno = 1.63, HFOV = 39.7 deg. | | | | | | | | |
|---|---|---|---|---|---|---|---|---|
| Surface # | | Curvature Radius | | Thickness | Material | Index | Abbe # | Focal Length |
| 4 | Lens 2 | 6.024501 | (ASP) | 0.8500 | Plastic | 1.545 | 56.0 | 9.85 |
| 5 | | −46.483522 | (ASP) | 0.0730 | | | | |
| 6 | Lens 3 | −47.565466 | (ASP) | 0.2800 | Plastic | 1.669 | 19.5 | −19.20 |
| 7 | | 17.642962 | (ASP) | 0.4200 | | | | |
| 8 | Lens 4 | 9.407680 | (ASP) | 0.4850 | Plastic | 1.544 | 56.0 | 30.21 |
| 9 | | 21.599204 | (ASP) | −0.1840 | | | | |
| 10 | Stop | Plano | | 0.6540 | | | | |
| 11 | Lens 5 | −6.667700 | (ASP) | 0.2800 | Plastic | 1.566 | 37.4 | −137.70 |
| 12 | | −7.402100 | (ASP) | 0.4000 | | | | |
| 13 | Lens 6 | 100.089067 | (ASP) | 0.2760 | Plastic | 1.660 | 20.4 | 14.20 |
| 14 | | −10.325100 | (ASP) | 0.1000 | | | | |
| 15 | Lens 7 | −11.256900 | (ASP) | 0.3610 | Plastic | 1.660 | 20.4 | −10.57 |
| 16 | | 18.587611 | (ASP) | 0.3050 | | | | |
| 17 | Lens 8 | −9.564991 | (ASP) | 0.7290 | Plastic | 1.544 | 56.0 | 7.82 |
| 18 | | −3.025011 | (ASP) | 0.3910 | | | | |
| 19 | Lens 9 | −39.525692 | (ASP) | 0.8500 | Plastic | 1.669 | 19.5 | −27.37 |
| 20 | | 34.423726 | (ASP) | 0.8800 | | | | |
| 21 | Lens 10 | 13.421855 | (ASP) | 1.0500 | Plastic | 1.544 | 56.0 | −6.78 |
| 22 | | 2.814694 | (ASP) | 0.8000 | | | | |
| 23 | Filter | Plano | | 0.4200 | Glass | 1.517 | 64.2 | — |
| 24 | | Plano | | 0.3635 | | | | |
| 25 | Image | Plano | | — | | | | |

Note:
Reference wavelength is 587.6 nm (d-line).
An effective radius of the stop S1 (Surface 10) is 2.300 mm.

TABLE 8

| Aspheric Coefficients | | | | | |
|---|---|---|---|---|---|
| | Surface # | | | | |
| | 1 | 2 | 4 | 5 | 6 |
| k = | −4.909841E−01 | −5.553988E−01 | 2.272662E+00 | −9.000000E+01 | −2.330475E+01 |
| A4 = | −6.453834E−03 | −1.885958E−02 | −1.500221E−02 | 1.040247E−02 | 1.021339E−02 |
| A6 = | 3.148127E−03 | 1.114241E−02 | 9.682356E−03 | −8.491658E−03 | −1.386002E−02 |
| A8 = | −1.499032E−03 | −4.260877E−03 | −3.710565E−03 | 2.715768E−03 | 6.332452E−03 |
| A10 = | 3.885068E−04 | 1.072213E−03 | 9.360889E−04 | −4.327312E−04 | −1.429332E−03 |
| A12 = | −4.932672E−05 | −1.392989E−04 | −1.274188E−04 | 2.818076E−05 | 1.665794E−04 |
| A14 = | 2.252770E−06 | 6.712457E−06 | 6.809639E−06 | — | −7.836771E−06 |
| | Surface # | | | | |
| | 7 | 8 | 9 | 11 | 12 |
| k = | −7.475164E+01 | −4.745185E+01 | −9.000000E+01 | 1.436488E+00 | 2.012110E+00 |
| A4 = | −2.422253E−03 | −4.599310E−03 | −9.303034E−03 | −1.403530E−03 | −1.488512E−03 |
| A6 = | −5.654965E−03 | −4.606895E−03 | −3.061220E−03 | −7.491454E−04 | 8.483159E−05 |
| A8 = | 3.537930E−03 | 1.928342E−03 | 8.970527E−04 | −5.145930E−06 | −3.238454E−05 |
| A10 = | −8.768725E−04 | −4.542311E−04 | −2.108903E−04 | 9.922056E−06 | −8.663146E−06 |
| A12 = | 1.081911E−04 | 5.814156E−05 | 2.968060E−05 | 7.038950E−14 | 1.903300E−07 |
| A14 = | −5.136353E−06 | −3.314966E−06 | −1.878779E−06 | 9.316036E−08 | −8.304096E−08 |
| | Surface # | | | | |
| | 13 | 14 | 15 | 16 | 17 |
| k = | 1.859425E+00 | 5.081663E+00 | 4.344802E+00 | 4.025485E+01 | 9.918947E+00 |
| A4 = | −1.686439E−02 | −1.981914E−03 | −1.023280E−03 | −1.415355E−02 | 7.310115E−03 |
| A6 = | 1.252812E−05 | −1.183395E−04 | −1.395301E−04 | −8.128491E−04 | −7.832244E−03 |
| A8 = | 7.536997E−04 | −2.737362E−06 | −2.092115E−05 | 7.298160E−04 | 2.871069E−03 |
| A10 = | −5.484827E−04 | −1.613707E−08 | −2.771201E−06 | −2.554428E−04 | −5.488602E−04 |

TABLE 8-continued

| Aspheric Coefficients | | | | | |
|---|---|---|---|---|---|
| A12 = | 1.520924E−04 | −1.426406E−07 | −2.595008E−07 | 4.364565E−05 | 6.811930E−05 |
| A14 = | −1.986347E−05 | −1.211804E−15 | 1.530390E−15 | −3.992242E−06 | −5.562289E−06 |
| A16 = | 9.996791E−07 | — | — | 1.521910E−07 | 2.120088E−07 |
| | Surface # | | | | |
| | 18 | 19 | 20 | 21 | 22 |
| k = | −1.099728E+00 | −9.000000E+01 | 3.047385E+01 | −3.515710E−01 | −8.361251E+00 |
| A4 = | 3.842552E−02 | 4.404511E−02 | 1.704753E−02 | −4.229862E−02 | −1.357648E−02 |
| A6 = | −2.667281E−02 | −2.775944E−02 | −7.074338E−03 | 1.098297E−02 | 2.574522E−03 |
| A8 = | 1.001771E−02 | 9.867781E−03 | 1.063338E−03 | −2.671536E−03 | −4.284599E−04 |
| A10 = | −2.459056E−03 | −2.536286E−03 | −5.990031E−05 | 4.304134E−04 | 4.999930E−05 |
| A12 = | 4.178645E−04 | 4.689995E−04 | −4.169698E−06 | −4.282345E−05 | −3.954730E−06 |
| A14 = | −4.571455E−05 | −5.974944E−05 | 9.190641E−07 | 2.689054E−06 | 2.092884E−07 |
| A16 = | 2.791168E−06 | 4.874057E−06 | −6.447850E−08 | −1.073959E−07 | −7.254996E−09 |
| A18 = | −7.089560E−08 | −2.270202E−07 | 2.232910E−09 | 2.651217E−09 | 1.573415E−10 |
| A20 = | — | 4.565949E−09 | −3.605315E−11 | −3.687451E−11 | −1.930083E−12 |
| A22 = | — | — | 1.806011E−13 | 2.202800E−13 | 1.019917E−14 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.05 | f/f2 | 0.82 |
| Fno | 1.63 | f/f9 | −0.29 |
| HFOV [deg.] | 39.7 | f/EPD | 1.63 |
| Nmax | 1.669 | EPD/BL | 3.12 |
| Vmin | 19.5 | BL/TD | 0.18 |
| V2 | 56.0 | ImgH/BL | 4.34 |
| V5 + V6 | 57.8 | SD/TD | 0.88 |
| V9 + V10 | 75.5 | TD/EPD | 1.77 |
| CT2/CT3 | 3.04 | ΣCT/TD | 0.64 |
| T34/T45 | 0.89 | TL/f | 1.28 |
| T89/T34 | 0.93 | TL/ImgH | 1.50 |
| T89/T78 | 1.28 | TL [mm] | 10.30 |
| (T78 + T910)/CT10 | 1.13 | Yc102/f | 0.33 |
| \|f2/f1\| | 0.36 | ImgH [mm] | 6.87 |

5th Embodiment

Figure 9:
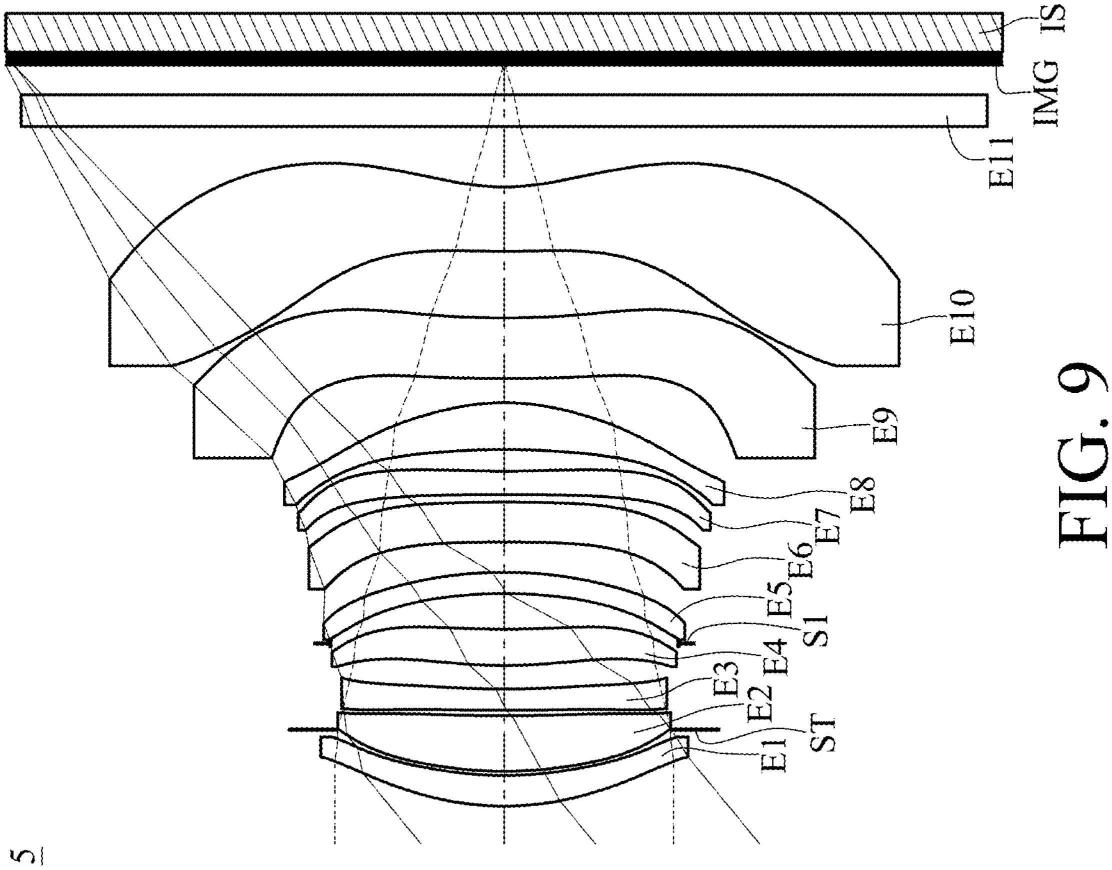
FIG. 9 is a schematic view of an image capturing unit according to the 5th embodiment of the present disclosure.
Figure 10:
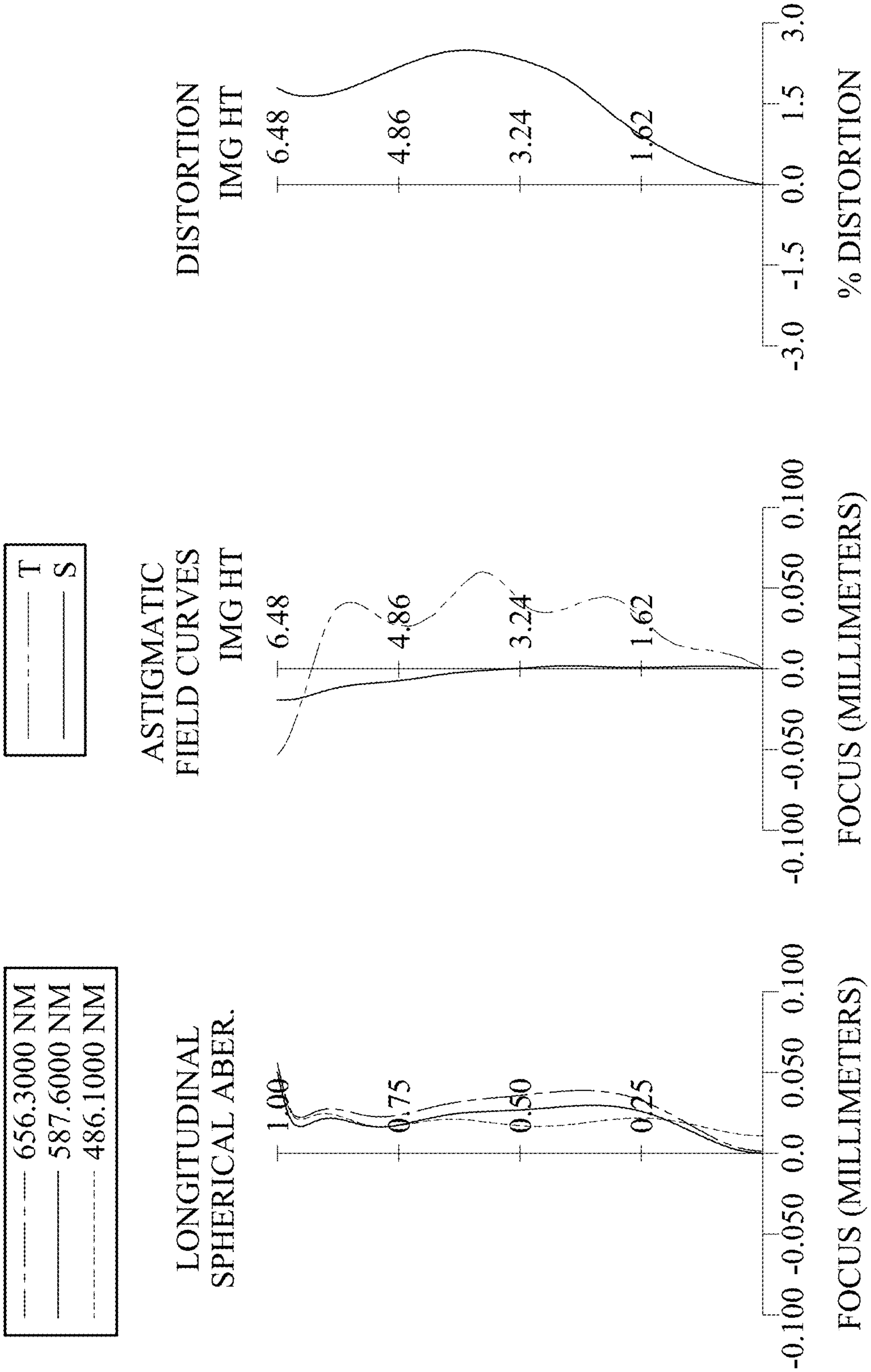
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point. The image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one inflection point.

The eighth lens element E8 with positive refractive power has an object-side surface being concave in a paraxial region thereof and an image-side surface being convex in a paraxial region thereof. The eighth lens element E8 is made of plastic material and has the object-side surface and the image-side surface being both aspheric. The image-side surface of the eighth lens element E8 has at least one inflection point.

The ninth lens element E9 with negative refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being convex in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 5th embodiment are shown in Table 9 and the aspheric surface data are shown in Table 10 below.

TABLE 9

5th Embodiment
f = 7.70 mm, Fno = 1.72, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.785968 | (ASP) | 0.4050 | Plastic | 1.545 | 56.0 | 31.22 |
| 2 | | 4.686665 | (ASP) | 0.6060 | | | | |
| 3 | Ape. Stop | Plano | | −0.5500 | | | | |
| 4 | Lens 2 | 5.217270 | (ASP) | 0.7370 | Plastic | 1.544 | 56.0 | 10.39 |
| 5 | | 64.207101 | (ASP) | 0.0700 | | | | |
| 6 | Lens 3 | 63.472768 | (ASP) | 0.2800 | Plastic | 1.700 | 17.0 | −19.45 |
| 7 | | 11.190089 | (ASP) | 0.3120 | | | | |
| 8 | Lens 4 | 6.426084 | (ASP) | 0.4810 | Plastic | 1.544 | 56.0 | 23.51 |
| 9 | | 12.571418 | (ASP) | −0.1920 | | | | |
| 10 | Stop | Plano | | 0.6620 | | | | |
| 11 | Lens 5 | −6.564815 | (ASP) | 0.2800 | Plastic | 1.566 | 37.4 | 88.26 |
| 12 | | −5.891820 | (ASP) | 0.4000 | | | | |
| 13 | Lens 6 | −35.687835 | (ASP) | 0.5290 | Plastic | 1.660 | 20.4 | 88.90 |
| 14 | | −22.320426 | (ASP) | 0.1000 | | | | |
| 15 | Lens 7 | −32.318453 | (ASP) | 0.3090 | Plastic | 1.566 | 37.4 | −20.14 |
| 16 | | 17.672079 | (ASP) | 0.2860 | | | | |
| 17 | Lens 8 | −9.760351 | (ASP) | 0.6210 | Plastic | 1.544 | 56.0 | 7.20 |
| 18 | | −2.857642 | (ASP) | 0.3200 | | | | |
| 19 | Lens 9 | 196.614990 | (ASP) | 0.8000 | Plastic | 1.680 | 18.2 | −22.56 |
| 20 | | 14.207020 | (ASP) | 0.8800 | | | | |
| 21 | Lens 10 | 13.733809 | (ASP) | 0.8500 | Plastic | 1.535 | 56.3 | −6.93 |
| 22 | | 2.855777 | (ASP) | 0.8000 | | | | |
| 23 | Filter | Plano | | 0.4200 | Glass | 1.517 | 64.2 | — |
| 24 | | Plano | | 0.3953 | | | | |
| 25 | Image | Plano | | — | | | | |

Note:

Reference wavelength is 587.6 nm (d-line).

An effective radius of the stop S1 (Surface 10) is 2.300 mm.

TABLE 10

Aspheric Coefficients

| | Surface # | | | | |
|---|---|---|---|---|---|
| | 1 | 2 | 4 | 5 | 6 |
| k = | −5.921430E−01 | −6.892437E−01 | 2.420242E+00 | −5.799877E+00 | 8.249136E+01 |
| A4 = | −3.627667E−03 | −1.220703E−02 | −8.926584E−03 | 2.497540E−02 | 2.015699E−02 |
| A6 = | 7.078149E−04 | 1.284510E−03 | 2.962396E−04 | −2.563169E−02 | −2.900243E−02 |
| A8 = | −3.082606E−04 | 8.890238E−04 | 8.774004E−04 | 1.094321E−02 | 1.492674E−02 |
| A10 = | 9.126700E−05 | −9.800013E−05 | −3.729816E−05 | −2.443711E−03 | −3.866838E−03 |
| A12 = | −1.708061E−05 | −2.119425E−05 | −3.612934E−05 | 2.763995E−04 | 5.121164E−04 |
| A14 = | 1.048698E−06 | 2.198858E−06 | 4.022689E−06 | −1.190381E−05 | −2.728727E−05 |
| A16 = | — | 1.997664E−08 | — | — | — |

| | Surface # | | | | |
|---|---|---|---|---|---|
| | 7 | 8 | 9 | 11 | 12 |
| k = | −5.495077E+01 | −4.594177E+01 | −8.499176E+01 | 2.522757E+00 | 1.440036E+00 |
| A4 = | 8.988537E−04 | 5.285122E−03 | −5.052828E−03 | −3.321248E−03 | −2.172312E−03 |
| A6 = | −1.139061E−02 | −1.153064E−02 | −5.153991E−03 | −1.353340E−03 | −1.122126E−03 |
| A8 = | 7.849162E−03 | 4.745631E−03 | 1.233826E−03 | −2.244890E−04 | 8.127220E−04 |
| A10 = | −2.413752E−03 | −1.281975E−03 | −3.041223E−04 | 6.763216E−04 | 1.861435E−04 |
| A12 = | 3.702358E−04 | 1.983856E−04 | 5.158576E−05 | −3.059503E−04 | −1.815500E−04 |
| A14 = | −2.209110E−05 | −1.275548E−05 | −3.430603E−06 | 5.449682E−05 | 3.504723E−05 |
| A16 = | — | — | — | −3.407601E−06 | −2.198007E−06 |

| | Surface # | | | | |
|---|---|---|---|---|---|
| | 13 | 14 | 15 | 16 | 17 |
| k = | 5.523191E+01 | 3.981942E+01 | 3.676339E+01 | 3.936373E+01 | 1.057795E+01 |
| A4 = | −1.380578E−02 | 7.532198E−03 | 1.579028E−02 | −3.660869E−03 | 1.345984E−02 |
| A6 = | −5.778171E−04 | −1.238503E−02 | −2.018217E−02 | −1.231920E−02 | −9.728839E−03 |
| A8 = | −2.115958E−05 | 5.074429E−03 | 1.058872E−02 | 6.969031E−03 | 3.462963E−03 |
| A10 = | 2.160641E−04 | −1.323569E−03 | −3.206762E−03 | −2.032723E−03 | −7.633833E−04 |
| A12 = | −8.298909E−05 | 2.106208E−04 | 5.538779E−04 | 3.253459E−04 | 9.031053E−05 |
| A14 = | 1.014173E−05 | −1.888979E−05 | −5.105978E−05 | −2.794971E−05 | −4.833516E−06 |
| A16 = | −3.651152E−07 | 7.397747E−07 | 1.930927E−06 | 1.005258E−06 | 7.621313E−08 |

| | Surface # | | | | |
|---|---|---|---|---|---|
| | 18 | 19 | 20 | 21 | 22 |
| k = | −1.340872E+00 | −4.843634E+01 | −9.000000E+01 | −9.997663E−02 | −6.619517E+00 |
| A4 = | 3.624345E−02 | 3.458124E−02 | 1.680782E−02 | −4.325222E−02 | −2.221039E−02 |
| A6 = | −2.194595E−02 | −2.506930E−02 | −8.659431E−03 | 1.172891E−02 | 5.645431E−03 |
| A8 = | 7.816569E−03 | 9.381907E−03 | 1.841459E−03 | −3.276202E−03 | −1.218254E−03 |
| A10 = | −1.664163E−03 | −2.556397E−03 | −2.610537E−04 | 6.321314E−04 | 1.839178E−04 |
| A12 = | 1.803040E−04 | 4.994223E−04 | 2.795728E−05 | −7.870869E−05 | −1.903350E−05 |
| A14 = | −2.208087E−06 | −6.694720E−05 | −2.401984E−06 | 6.576060E−06 | 1.355974E−06 |
| A16 = | −1.517224E−06 | 5.714640E−06 | 1.596083E−07 | −3.776245E−07 | −6.636712E−08 |
| A18 = | 1.396520E−07 | −2.725491E−07 | −7.350217E−09 | 1.479845E−08 | 2.189298E−09 |
| A20 = | −3.916003E−09 | 4.843231E−09 | 2.005518E−10 | −3.786164E−10 | −4.641442E−11 |
| A22 = | — | 4.784684E−11 | −2.390396E−12 | 5.692927E−12 | 5.694929E−13 |
| A24 = | — | — | — | −3.807110E−14 | −3.062417E−15 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 7.70 | f/f2 | 0.74 |
| Fno | 1.72 | f/f9 | −0.34 |
| HFOV [deg.] | 39.5 | f/EPD | 1.72 |

-continued

| 5th Embodiment | | | |
|---|---|---|---|
| Nmax | 1.700 | EPD/BL | 2.77 |
| Vmin | 17.0 | BL/TD | 0.20 |
| V2 | 56.0 | ImgH/BL | 4.01 |
| V5 + V6 | 57.8 | SD/TD | 0.88 |
| V9 + V10 | 74.5 | TD/EPD | 1.83 |
| CT2/CT3 | 2.63 | ΣCT/TD | 0.65 |
| T34/T45 | 0.66 | TL/f | 1.27 |
| T89/T34 | 1.03 | TL/ImgH | 1.51 |
| T89/T78 | 1.12 | TL [mm] | 9.80 |
| (T78 + T910)/CT10 | 1.37 | Yc102/f | 0.31 |
| \|f2/f1\| | 0.33 | ImgH [mm] | 6.48 |

6th Embodiment

Figure 11:
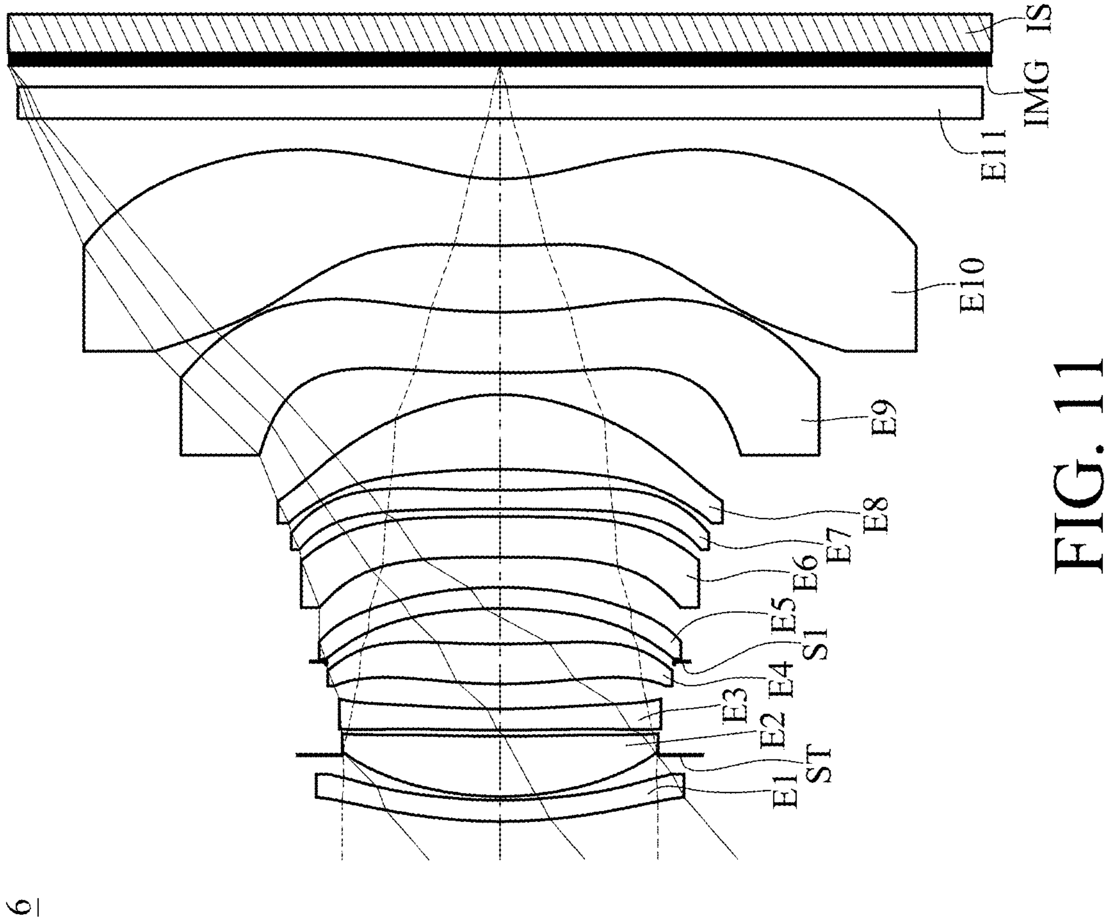
FIG. 11 is a schematic view of an image capturing unit according to the 6th embodiment of the present disclosure.
Figure 12:
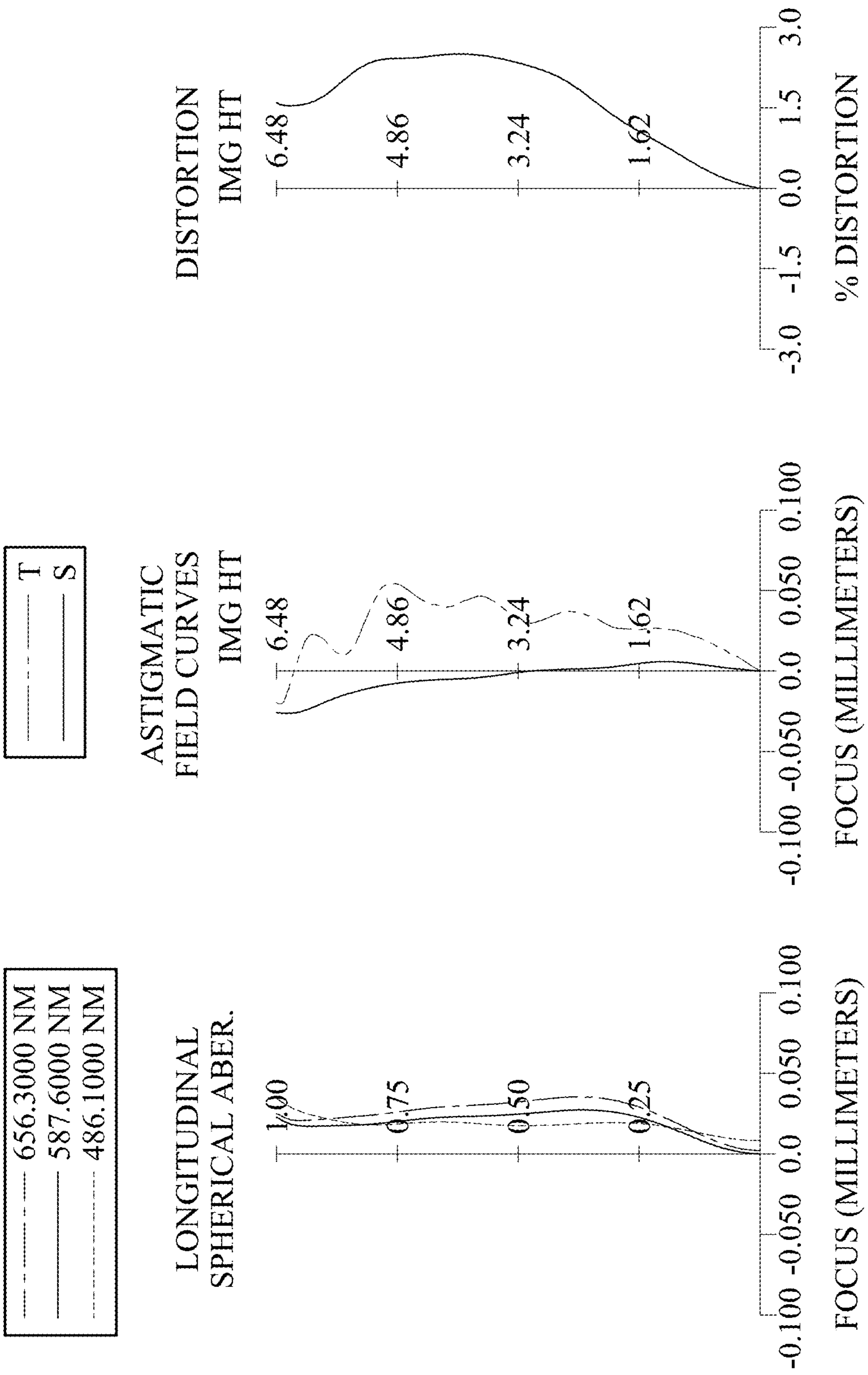
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point. The image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one inflection point.

The eighth lens element E8 with positive refractive power has an object-side surface being concave in a paraxial region thereof and an image-side surface being convex in a paraxial region thereof. The eighth lens element E8 is made of plastic material and has the object-side surface and the image-side surface being both aspheric. The image-side surface of the eighth lens element E8 has at least one inflection point.

The ninth lens element E9 with negative refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being convex in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 6th embodiment are shown in Table 11 and the aspheric surface data are shown in Table 12 below.

TABLE 11

| 6th Embodiment<br>f = 7.31 mm, Fno = 1.75, HFOV = 41.0 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 6.767950 | (ASP) | 0.2800 | Plastic | 1.545 | 56.0 | −227.54 |
| 2 | | 6.323841 | (ASP) | 0.6000 | | | | |

TABLE 11-continued

| 6th Embodiment<br>f = 7.31 mm, Fno = 1.75, HFOV = 41.0 deg. | | | | | | | | |
|---|---|---|---|---|---|---|---|---|
| Surface # | | Curvature Radius | | Thickness | Material | Index | Abbe # | Focal Length |
| 3 | Ape. Stop | Plano | | −0.5500 | | | | |
| 4 | Lens 2 | 4.121187 | (ASP) | 0.7990 | Plastic | 1.545 | 56.0 | 8.04 |
| 5 | | 64.890469 | (ASP) | 0.0800 | | | | |
| 6 | Lens 3 | 60.506688 | (ASP) | 0.2800 | Plastic | 1.680 | 18.2 | −21.68 |
| 7 | | 11.831995 | (ASP) | 0.3310 | | | | |
| 8 | Lens 4 | 6.778348 | (ASP) | 0.5280 | Plastic | 1.544 | 56.0 | 23.90 |
| 9 | | 13.770213 | (ASP) | −0.2350 | | | | |
| 10 | Stop | Plano | | 0.7050 | | | | |
| 11 | Lens 5 | −6.317631 | (ASP) | 0.2800 | Plastic | 1.566 | 37.4 | 66.85 |
| 12 | | −5.500523 | (ASP) | 0.3990 | | | | |
| 13 | Lens 6 | −37.711639 | (ASP) | 0.5360 | Plastic | 1.660 | 20.4 | 3511.08 |
| 14 | | −37.317401 | (ASP) | 0.1000 | | | | |
| 15 | Lens 7 | −64.005040 | (ASP) | 0.2490 | Plastic | 1.566 | 37.4 | −24.44 |
| 16 | | 17.670324 | (ASP) | 0.2780 | | | | |
| 17 | Lens 8 | −9.947466 | (ASP) | 0.9860 | Plastic | 1.544 | 56.0 | 6.12 |
| 18 | | −2.580451 | (ASP) | 0.2910 | | | | |
| 19 | Lens 9 | 37.441000 | (ASP) | 0.8020 | Plastic | 1.680 | 18.2 | −16.56 |
| 20 | | 8.581523 | (ASP) | 0.8800 | | | | |
| 21 | Lens 10 | 11.182842 | (ASP) | 0.8800 | Plastic | 1.535 | 56.3 | −6.97 |
| 22 | | 2.719358 | (ASP) | 0.8000 | | | | |
| 23 | Filter | Plano | | 0.4200 | Glass | 1.517 | 64.2 | — |
| 24 | | Plano | | 0.2825 | | | | |
| 25 | Image | Plano | | — | | | | |

Note:
Reference wavelength is 587.6 nm (d-line).
An effective radius of the stop S1 (Surface 10) is 2.300 mm.

TABLE 12

| Aspheric Coefficients | | | | | |
|---|---|---|---|---|---|
| | Surface # | | | | |
| | 1 | 2 | 4 | 5 | 6 |
| k = | −2.517664E−01 | −1.060441E+00 | 1.671374E+00 | 4.771147E+01 | −5.019401E+01 |
| A4 = | −7.010205E−03 | −1.820251E−02 | −1.369569E−02 | 2.707437E−02 | 2.783034E−02 |
| A6 = | 1.604882E−03 | 9.759619E−03 | 6.509833E−03 | −3.655199E−02 | −4.354294E−02 |
| A8 = | 2.716907E−05 | −2.228366E−03 | −1.874901E−03 | 2.152652E−02 | 2.779496E−02 |
| A10 = | −9.284328E−05 | 2.792969E−04 | 2.965394E−04 | −7.281867E−03 | −9.900492E−03 |
| A12 = | 1.376468E−05 | −2.816893E−05 | −2.283211E−05 | 1.480178E−03 | 2.057666E−03 |
| A14 = | −6.579872E−07 | 2.239665E−06 | −6.303287E−07 | −1.694519E−04 | −2.341595E−04 |
| A16 = | — | −9.616101E−08 | 1.707452E−07 | 8.553991E−06 | 1.141250E−05 |
| | Surface # | | | | |
| | 7 | 8 | 9 | 11 | 12 |
| k = | −5.366241E+01 | −4.379441E+01 | −8.769689E+01 | 2.878145E+00 | 1.290574E+00 |
| A4 = | 6.766004E−03 | 4.100946E−03 | −4.784157E−03 | 4.682197E−04 | 1.763525E−03 |
| A6 = | −1.937250E−02 | −9.906663E−03 | −4.815519E−03 | −4.599876E−03 | −4.360653E−03 |
| A8 = | 1.416734E−02 | 3.915136E−03 | 1.051153E−03 | 1.609094E−03 | 2.191052E−03 |
| A10 = | −5.493263E−03 | −1.030401E−03 | −2.691329E−04 | −3.119914E−04 | −4.202247E−04 |
| A12 = | 1.225804E−03 | 1.620641E−04 | 4.095641E−05 | 2.263162E−05 | 2.562866E−05 |
| A14 = | −1.469650E−04 | −1.287746E−05 | −2.314618E−06 | 2.993168E−07 | −1.871730E−07 |
| A16 = | 7.489476E−06 | 2.994813E−07 | — | — | — |
| | Surface # | | | | |
| | 13 | 14 | 15 | 16 | 17 |
| k = | 9.000000E+01 | 9.000000E+01 | 9.000000E+01 | 3.887985E+01 | 1.065470E+01 |
| A4 = | −1.271542E−02 | 8.740802E−04 | 5.149135E−03 | −6.471106E−03 | 5.271729E−03 |
| A6 = | −3.315008E−03 | −6.362868E−03 | −7.974674E−03 | −2.679032E−03 | 1.241537E−03 |
| A8 = | 1.548762E−03 | 1.905174E−03 | 2.774885E−03 | 5.744834E−04 | −1.597713E−03 |
| A10 = | −4.081181E−04 | −3.182404E−04 | −5.322931E−04 | −8.106137E−05 | 3.611137E−04 |

TABLE 12-continued

| Aspheric Coefficients | | | | | |
|---|---|---|---|---|---|
| A12 = | 7.548849E−05 | 2.545367E−05 | 4.979348E−05 | 5.379203E−06 | −3.922637E−05 |
| A14 = | −1.156512E−05 | −6.831278E−07 | −1.896882E−06 | −1.740998E−07 | 2.537692E−06 |
| A16 = | 8.397927E−07 | — | — | −2.036109E−09 | −8.340226E−08 |

| | Surface # | | | | |
|---|---|---|---|---|---|
| | 18 | 19 | 20 | 21 | 22 |
| k = | −1.130232E+00 | 8.575521E+01 | −6.463571E+01 | −1.760138E+00 | −4.481060E+00 |
| A4 = | 2.888106E−02 | 2.525582E−02 | 1.513213E−02 | −4.123215E−02 | −2.523269E−02 |
| A6 = | −1.695002E−02 | −1.808870E−02 | −6.720477E−03 | 9.185213E−03 | 5.775759E−03 |
| A8 = | 7.378338E−03 | 7.844299E−03 | 1.312209E−03 | −1.963153E−03 | −9.624244E−04 |
| A10 = | −2.515450E−03 | −3.113924E−03 | −1.996040E−04 | 2.779036E−04 | 9.748498E−05 |
| A12 = | 6.206500E−04 | 1.008795E−03 | 2.653681E−05 | −2.121190E−05 | −4.504762E−06 |
| A14 = | −1.074635E−04 | −2.436463E−04 | −2.842159E−06 | 5.775909E−07 | −1.522538E−07 |
| A16 = | 1.264063E−05 | 4.171017E−05 | 2.135794E−07 | 3.508959E−08 | 3.666695E−08 |
| A18 = | −9.470398E−07 | −4.861819E−06 | −1.011215E−08 | −3.838345E−09 | −2.521769E−09 |
| A20 = | 4.020389E−08 | 3.642551E−07 | 2.672688E−10 | 1.526231E−10 | 9.611950E−11 |
| A22 = | −7.297441E−10 | −1.573469E−08 | −2.990971E−12 | −2.970366E−12 | −2.164222E−12 |
| A24 = | — | 2.967202E−10 | — | 2.349642E−14 | 2.699928E−14 |
| A26 = | — | — | — | — | −1.443049E−16 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.31 | f/f2 | 0.91 |
| Fno | 1.75 | f/f9 | −0.44 |
| HFOV [deg.] | 41.0 | f/EPD | 1.75 |
| Nmax | 1.680 | EPD/BL | 2.78 |
| Vmin | 18.2 | BL/TD | 0.18 |
| V2 | 56.0 | ImgH/BL | 4.31 |
| V5 + V6 | 57.8 | SD/TD | 0.90 |
| V9 + V10 | 74.5 | TD/EPD | 2.04 |
| CT2/CT3 | 2.85 | ΣCT/TD | 0.66 |
| T34/T45 | 0.70 | TL/f | 1.37 |
| T89/T34 | 0.88 | TL/ImgH | 1.54 |
| T89/T78 | 1.05 | TL [mm] | 10.00 |
| (T78 + T910)/CT10 | 1.32 | Yc102/f | 0.36 |
| \|f2/f1\| | 0.04 | ImgH [mm] | 6.48 |

7th Embodiment

Figure 13:
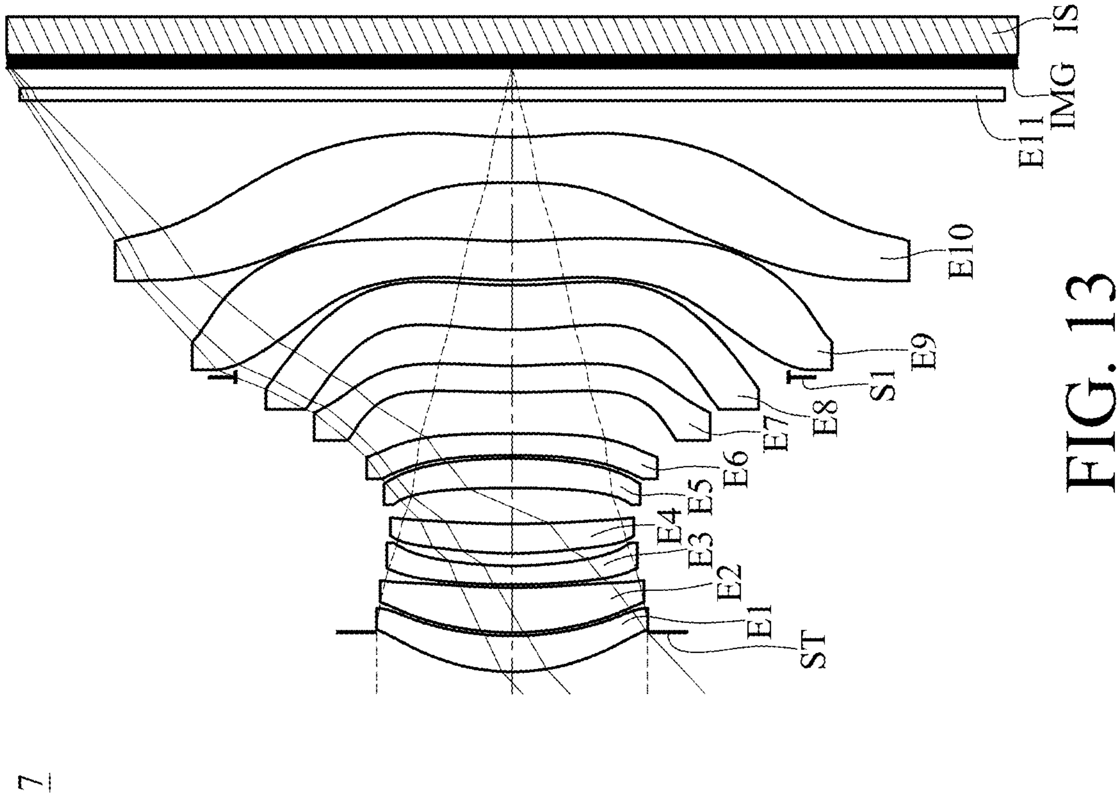
FIG. 13 is a schematic view of an image capturing unit according to the 7th embodiment of the present disclosure.
Figure 14:
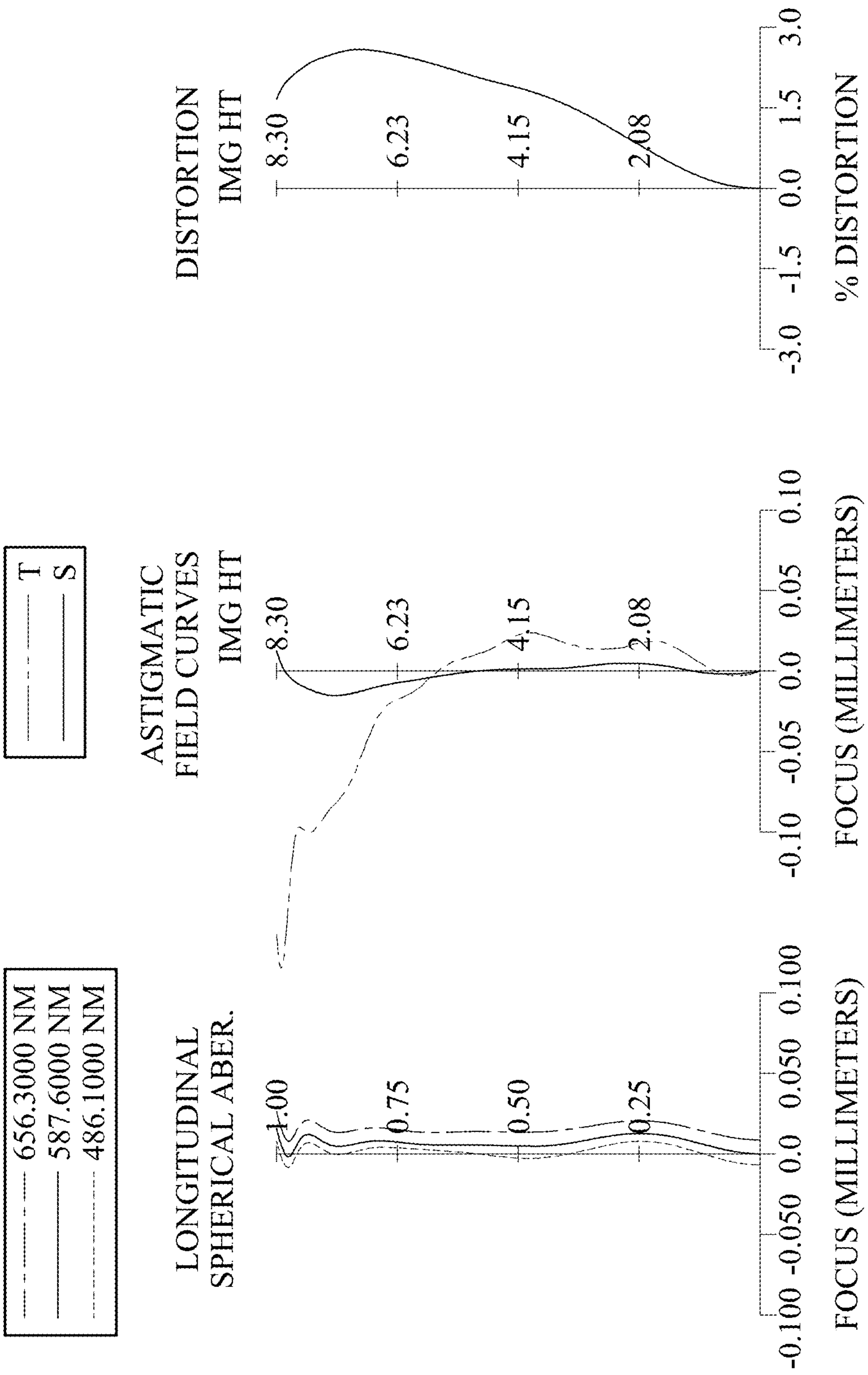
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a fifth lens element E5, a sixth lens element E6, a seventh lens element E7, an eighth lens element E8, a stop S1, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point. The image-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof The ninth lens element E9 with positive refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 7th embodiment are shown in Table 13 and the aspheric surface data are shown in Table 14 below.

TABLE 13

| 7th Embodiment<br>f = 8.73 mm, Fno = 1.95, HFOV = 43.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.6570 | | | | |
| 2 | Lens 1 | 3.439400 | (ASP) | 0.5950 | Plastic | 1.545 | 56.1 | 17.69 |
| 3 | | 5.020900 | (ASP) | 0.0550 | | | | |
| 4 | Lens 2 | 5.001500 | (ASP) | 0.7420 | Plastic | 1.544 | 56.0 | 16.52 |
| 5 | | 10.686000 | (ASP) | 0.0500 | | | | |
| 6 | Lens 3 | 10.218200 | (ASP) | 0.3100 | Plastic | 1.686 | 18.4 | −24.91 |
| 7 | | 6.316300 | (ASP) | 0.2060 | | | | |
| 8 | Lens 4 | 7.036500 | (ASP) | 0.4860 | Plastic | 1.544 | 56.0 | 23.67 |
| 9 | | 15.137600 | (ASP) | 0.5940 | | | | |
| 10 | Lens 5 | −22.592300 | (ASP) | 0.4900 | Plastic | 1.544 | 56.0 | 28.59 |
| 11 | | −9.281800 | (ASP) | 0.0500 | | | | |
| 12 | Lens 6 | −11.555200 | (ASP) | 0.3600 | Plastic | 1.686 | 18.4 | −31.60 |
| 13 | | −25.052900 | (ASP) | 0.6800 | | | | |
| 14 | Lens 7 | 13.940300 | (ASP) | 0.4400 | Plastic | 1.660 | 20.4 | −38.61 |
| 15 | | 8.897600 | (ASP) | 0.5960 | | | | |
| 16 | Lens 8 | 6.664100 | (ASP) | 0.7350 | Plastic | 1.686 | 18.4 | 62.54 |
| 17 | | 7.535400 | (ASP) | −1.5200 | | | | |
| 18 | Stop | Plano | | 1.6000 | | | | |
| 19 | Lens 9 | 6.335400 | (ASP) | 0.6480 | Plastic | 1.566 | 37.4 | 33.37 |
| 20 | | 9.180800 | (ASP) | 0.9700 | | | | |
| 21 | Lens 10 | −15.304300 | (ASP) | 0.7510 | Plastic | 1.566 | 37.4 | −8.05 |
| 22 | | 6.602000 | (ASP) | 0.6000 | | | | |
| 23 | Filter | Plano | | 0.2100 | Glass | 1.517 | 64.2 | — |
| 24 | | Plano | | 0.3330 | | | | |
| 25 | Image | Plano | | — | | | | |

Note:

Reference wavelength is 587.6 nm (d-line).

An effective radius of the stop S1 (Surface 18) is 4.571 mm.

TABLE 14

| Aspheric Coefficients | | | | | |
|---|---|---|---|---|---|
| | Surface # | | | | |
| | 2 | 3 | 4 | 5 | 6 |
| k = | −1.322470E+00 | −2.201140E+00 | −1.769220E+00 | −9.889140E+01 | −7.458160E+01 |
| A4 = | 2.131142E−03 | −5.457443E−03 | −5.131432E−03 | −7.409284E−03 | −1.099455E−02 |
| A6 = | 9.586750E−04 | 1.382269E−02 | 1.435621E−02 | 2.111515E−02 | 2.554586E−02 |
| A8 = | −8.907957E−04 | −1.230915E−02 | −1.319485E−02 | −2.186584E−02 | −2.208361E−02 |
| A10 = | 3.258332E−04 | 5.563312E−03 | 6.166086E−03 | 1.066278E−02 | 1.040695E−02 |
| A12 = | −5.622250E−05 | −1.238552E−03 | −1.468503E−03 | −2.787053E−03 | −2.651452E−03 |
| A14 = | 2.919193E−06 | 1.257367E−04 | 1.693468E−04 | 3.790111E−04 | 3.513974E−04 |
| A16 = | 1.911847E−08 | −4.531187E−06 | −7.498732E−06 | −2.091148E−05 | −1.910003E−05 |
| | Surface # | | | | |
| | 7 | 8 | 9 | 10 | 11 |
| k = | −3.074130E+00 | 7.424700E+00 | 5.390410E+00 | 8.938810E+01 | 1.176040E+01 |
| A4 = | −1.232973E−02 | −1.342757E−02 | −2.057245E−03 | −7.395165E−03 | 5.474520E−03 |
| A6 = | 1.258849E−02 | 3.223563E−03 | −8.766859E−04 | 1.802069E−03 | −3.035062E−02 |
| A8 = | −7.723156E−03 | −2.525218E−03 | 4.735419E−04 | −1.465390E−03 | 4.343481E−02 |
| A10 = | 3.199133E−03 | 9.165037E−04 | −4.074349E−04 | 6.226547E−04 | −3.457959E−02 |
| A12 = | −6.764990E−04 | −8.148573E−05 | 2.228426E−04 | −2.406186E−04 | 1.662179E−02 |
| A14 = | 7.333921E−05 | −6.466006E−06 | −5.015298E−05 | 7.106924E−05 | −4.963361E−03 |
| A16 = | −3.448948E−06 | 1.165106E−06 | 3.951906E−06 | −1.312091E−05 | 9.021294E−04 |
| A18 = | — | — | — | 8.775616E−07 | −9.162950E−05 |
| A20 = | — | — | — | — | 3.998799E−06 |
| | Surface # | | | | |
| | 12 | 13 | 14 | 15 | 16 |
| k = | 2.686030E+00 | 8.683650E+01 | 9.065480E+00 | 1.027120E+00 | −1.719350E+01 |
| A4 = | 8.827925E−03 | 3.162373E−03 | −1.405573E−02 | −2.969511E−02 | −1.311496E−02 |
| A6 = | −3.500701E−02 | −1.367350E−02 | −1.201882E−03 | 7.072629E−03 | 2.020988E−03 |
| A8 = | 4.112341E−02 | 1.078051E−02 | 3.567081E−03 | −1.618125E−03 | −1.187076E−03 |
| A10 = | −2.950987E−02 | −5.913167E−03 | −2.790454E−03 | 1.806612E−04 | 8.402726E−05 |
| A12 = | 1.313166E−02 | 2.124234E−03 | 1.189035E−03 | −3.127730E−06 | 1.390610E−04 |
| A14 = | −3.650130E−03 | −4.881565E−04 | −3.258829E−04 | −2.810407E−06 | −6.601404E−05 |
| A16 = | 6.150486E−04 | 6.865918E−05 | 5.808066E−05 | 5.568178E−07 | 1.449077E−05 |
| A18 = | −5.714453E−05 | −5.316580E−06 | −6.494911E−06 | −4.716688E−08 | −1.794092E−06 |
| A20 = | 2.232669E−06 | 1.722084E−07 | 4.122067E−07 | 1.729835E−09 | 1.279075E−07 |
| A22 = | — | — | −1.123291E−08 | −1.892390E−11 | −4.895185E−09 |
| A24 = | — | — | — | — | 7.785383E−11 |
| | Surface # | | | | |
| | 17 | 19 | 20 | 21 | 22 |
| k = | −3.060780E+01 | −1.552060E+00 | −4.559300E−01 | 2.746920E+00 | −1.025610E+00 |
| A4 = | −2.246572E−02 | −4.348581E−02 | −1.817492E−02 | −3.169393E−02 | −3.206020E−02 |
| A6 = | 1.211077E−02 | 1.294548E−02 | −8.276637E−04 | 4.960856E−03 | 6.456382E−03 |
| A8 = | −6.266142E−03 | −3.732047E−03 | 1.801337E−03 | −2.030431E−04 | −1.026475E−03 |
| A10 = | 1.945224E−03 | 8.877374E−04 | −5.222836E−04 | −2.298156E−05 | 1.275253E−04 |
| A12 = | −3.885467E−04 | −1.538232E−04 | 8.394072E−05 | 3.453817E−06 | −1.223796E−05 |
| A14 = | 5.162573E−05 | 1.820612E−05 | −8.916987E−06 | −1.991184E−07 | 8.823822E−07 |
| A16 = | −4.597011E−06 | −1.451948E−06 | 6.642306E−07 | 5.633228E−09 | −4.678566E−08 |
| A18 = | 2.707771E−07 | 7.780685E−08 | −3.536285E−08 | −3.311190E−11 | 1.797250E−09 |
| A20 = | −1.012179E−08 | −2.761380E−09 | 1.340124E−09 | −3.192728E−12 | −4.916972E−11 |
| A22 = | 2.176186E−10 | 6.224116E−11 | −3.525008E−11 | 1.207365E−13 | 9.310332E−13 |
| A24 = | −2.051703E−12 | −8.067764E−13 | 6.095323E−13 | −2.090248E−15 | −1.157374E−14 |
| A26 = | — | 4.578248E−15 | −6.198988E−15 | 1.892923E−17 | 8.485985E−17 |
| A28 = | — | — | 2.791381E−17 | −7.271184E−20 | −2.778722E−19 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 8.73 | f/f2 | 0.53 |
| Fno | 1.95 | f/f9 | 0.26 |
| HFOV [deg.] | 43.1 | f/EPD | 1.95 |
| Nmax | 1.686 | EPD/BL | 3.92 |
| Vmin | 18.4 | BL/TD | 0.13 |
| V2 | 56.0 | ImgH/BL | 7.26 |
| V5 + V6 | 74.4 | SD/TD | 0.93 |
| V9 + V10 | 74.8 | TD/EPD | 1.97 |

-continued

| 7th Embodiment | | | |
|---|---|---|---|
| CT2/CT3 | 2.39 | ΣCT/TD | 0.63 |
| T34/T45 | 0.35 | TL/f | 1.14 |
| T89/T34 | 0.39 | TL/ImgH | 1.20 |
| T89/T78 | 0.13 | TL [mm] | 9.98 |
| (T78 + T910)/CT10 | 2.09 | Yc102/f | 0.16 |
| \|f2/f1\| | 0.93 | ImgH [mm] | 8.30 |

8th Embodiment

Figure 15:
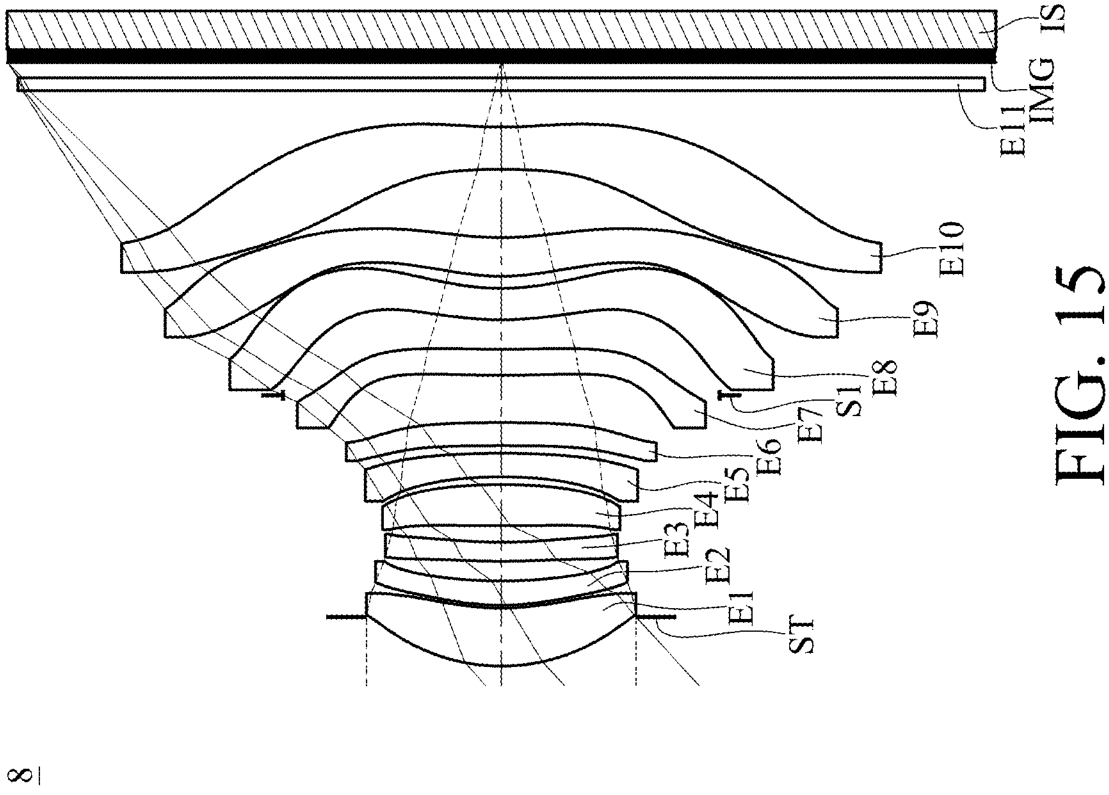
FIG. 15 is a schematic view of an image capturing unit according to the 8th embodiment of the present disclosure.
Figure 16:
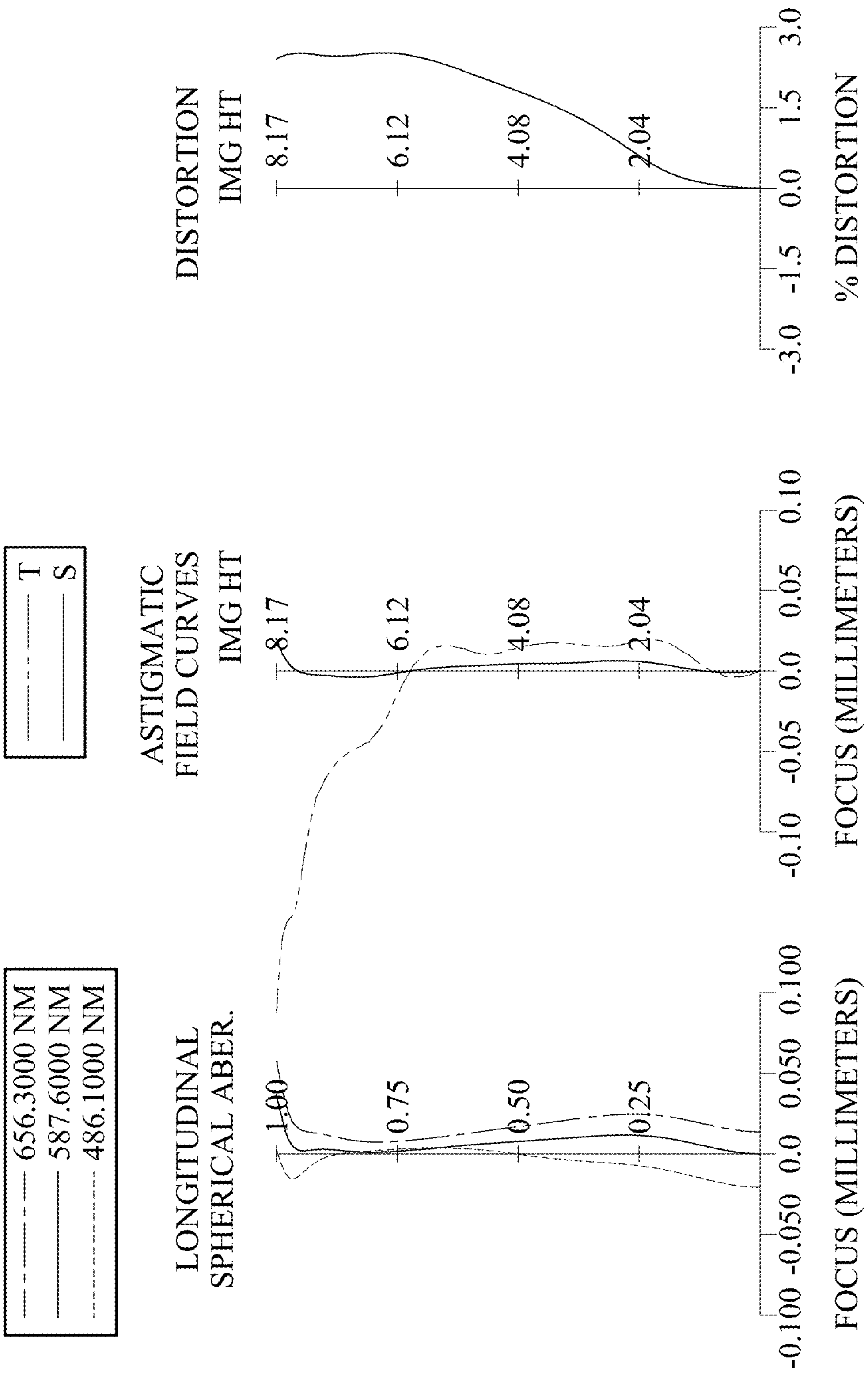
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a fifth lens element E5, a sixth lens element E6, a seventh lens element E7, a stop S1, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has at least one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point. The image-side surface of the sixth lens element E6 has at least one inflection point.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof.

The ninth lens element E9 with positive refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 8th embodiment are shown in Table 15 and 5 the aspheric surface data are shown in Table 16 below.

TABLE 15

| 8th Embodiment f = 8.69 mm, Fno = 1.95, HFOV = 42.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.8135 | | | | |
| 2 | Lens 1 | 3.193944 | (ASP) | 0.9593 | Plastic | 1.545 | 56.1 | 18.22 |
| 3 | | 4.210212 | (ASP) | 0.0473 | | | | |
| 4 | Lens 2 | 4.096694 | (ASP) | 0.4013 | Plastic | 1.544 | 56.0 | 15.88 |
| 5 | | 7.521546 | (ASP) | 0.3263 | | | | |
| 6 | Lens 3 | 11.977749 | (ASP) | 0.3150 | Plastic | 1.686 | 18.4 | −40.64 |
| 7 | | 8.289083 | (ASP) | 0.2736 | | | | |
| 8 | Lens 4 | 49.747445 | (ASP) | 0.6788 | Plastic | 1.544 | 56.0 | 13.99 |
| 9 | | −8.944735 | (ASP) | 0.1286 | | | | |
| 10 | Lens 5 | −6.820608 | (ASP) | 0.3900 | Plastic | 1.686 | 18.4 | −21.85 |
| 11 | | −12.803633 | (ASP) | 0.1249 | | | | |
| 12 | Lens 6 | −45.235323 | (ASP) | 0.3813 | Plastic | 1.686 | 18.4 | −1459.03 |
| 13 | | −47.538728 | (ASP) | 0.7830 | | | | |
| 14 | Lens 7 | 15.654243 | (ASP) | 0.4301 | Plastic | 1.686 | 18.4 | 638.78 |
| 15 | | 16.052597 | (ASP) | −0.7620 | | | | |
| 16 | Stop | Plano | | 1.2500 | | | | |
| 17 | Lens 8 | 5.234347 | (ASP) | 0.5200 | Plastic | 1.534 | 56.0 | −37.91 |
| 18 | | 4.015545 | (ASP) | 0.1996 | | | | |
| 19 | Lens 9 | 3.712318 | (ASP) | 0.6400 | Plastic | 1.587 | 28.3 | 18.99 |
| 20 | | 5.209726 | (ASP) | 1.1285 | | | | |
| 21 | Lens 10 | −14.593679 | (ASP) | 0.7000 | Plastic | 1.587 | 28.3 | −8.18 |
| 22 | | 7.286818 | (ASP) | 0.6000 | | | | |
| 23 | Filter | Plano | | 0.2100 | Glass | 1.517 | 64.2 | — |
| 24 | | Plano | | 0.2581 | | | | |
| 25 | Image | Plano | | — | | | | |

Note:
Reference wavelength is 587.6 nm (d-line).
An effective radius of the stop S1 (Surface 16) is 3.608 mm.

TABLE 16

| Aspheric Coefficients | | | | | |
|---|---|---|---|---|---|
| | Surface # | | | | |
| | 2 | 3 | 4 | 5 | 6 |
| k = | −7.520444E−01 | −2.488124E+01 | −2.472548E+01 | 1.721271E+00 | 1.453728E+01 |
| A4 = | 2.803148E−03 | 1.747589E−02 | 1.909402E−02 | −6.728071E−03 | −1.899253E−02 |
| A6 = | 2.736732E−04 | −1.033922E−02 | −1.080944E−02 | 4.571436E−03 | 3.413583E−03 |
| A8 = | 9.295191E−06 | 1.564700E−03 | 2.099994E−03 | −2.356244E−03 | 7.425339E−05 |
| A10 = | −2.682257E−05 | 1.156665E−04 | 9.523547E−05 | 1.356965E−03 | −1.451294E−04 |
| A12 = | 8.857666E−06 | −5.429871E−05 | −8.326364E−05 | −4.498144E−04 | −1.617012E−05 |
| A14 = | −1.286322E−06 | 3.571128E−06 | 1.385193E−05 | 7.906984E−05 | 2.059212E−05 |
| A16 = | −3.392850E−08 | 2.194789E−08 | −9.448838E−07 | −5.054072E−06 | −2.245988E−06 |
| | Surface # | | | | |
| | 7 | 8 | 9 | 10 | 11 |
| k = | 1.453728E+01 | −9.900000E+01 | 1.150071E+01 | 5.967275E+00 | 1.440466E+01 |
| A4 = | −1.899253E−02 | −8.797193E−04 | 1.560561E−02 | 2.553663E−02 | 2.791505E−02 |
| A6 = | 3.413583E−03 | −4.820030E−03 | −3.922726E−02 | −5.762076E−02 | −4.932389E−02 |
| A8 = | 7.425339E−05 | 2.890751E−03 | 3.741920E−02 | 5.492132E−02 | 4.173784E−02 |
| A10 = | −1.451294E−04 | −1.404785E−03 | −2.042627E−02 | −3.010918E−02 | −2.051721E−02 |
| A12 = | −1.617012E−05 | 2.877600E−04 | 6.403222E−03 | 1.153614E−02 | 6.398176E−03 |
| A14 = | 2.059212E−05 | −4.197095E−06 | −1.025342E−03 | −5.098886E−03 | −1.679933E−03 |
| A16 = | −2.245988E−06 | −7.325398E−06 | 2.476947E−05 | 3.088081E−03 | 5.863032E−04 |
| A18 = | — | 1.063867E−06 | 1.576672E−05 | −1.578269E−03 | −2.193980E−04 |
| A20 = | — | — | −1.623665E−06 | 5.509632E−04 | 5.929282E−05 |
| A22 = | — | — | — | −1.270490E−04 | −1.032076E−05 |
| A24 = | — | — | — | 1.874336E−05 | 1.103897E−06 |
| A26 = | — | — | — | −1.613748E−06 | −6.619037E−08 |
| A28 = | — | — | — | 6.185887E−08 | 1.707153E−09 |
| | Surface # | | | | |
| | 12 | 13 | 14 | 15 | 17 |
| k = | 8.371214E+01 | −6.802227E+01 | 4.100591E+00 | 1.130310E+01 | −4.014918E+00 |
| A4 = | 3.807573E−03 | −1.451965E−02 | −2.056008E−02 | −2.834646E−02 | −1.272200E−02 |

TABLE 16-continued

| Aspheric Coefficients | | | | | |
|---|---|---|---|---|---|
| A6 = | −1.626650E−02 | 6.531751E−03 | 9.273966E−03 | 1.410531E−02 | 3.852908E−03 |
| A8 = | 9.511368E−03 | −5.975586E−03 | −3.014498E−03 | −5.856493E−03 | −2.408065E−03 |
| A10 = | −1.852514E−03 | 3.473838E−03 | −1.532304E−04 | 1.420506E−03 | 7.083326E−04 |
| A12 = | −6.862673E−04 | −1.279482E−03 | 4.208818E−04 | −1.953252E−04 | −1.269552E−04 |
| A14 = | 4.554538E−04 | 2.906703E−04 | −1.506888E−04 | 9.760972E−06 | 1.522351E−05 |
| A16 = | −1.004164E−04 | −3.854645E−05 | 2.759966E−05 | 1.055092E−06 | −1.253883E−06 |
| A18 = | 1.022536E−05 | 2.724667E−06 | −2.851957E−06 | −1.890720E−07 | 6.952542E−08 |
| A20 = | −4.072901E−07 | −7.941951E−08 | 1.577149E−07 | 1.073730E−08 | −2.440705E−09 |
| A22 = | — | — | −3.618690E−09 | −2.195644E−10 | 4.835760E−11 |
| A24 = | — | — | — | — | −4.121165E−13 |

| | Surface # | | | | |
|---|---|---|---|---|---|
| | 18 | 19 | 20 | 21 | 22 |
| k = | −5.068345E+00 | −1.737680E+00 | −1.079474E+00 | −1.000000E+00 | −1.040517E+00 |
| A4 = | −6.983259E−03 | −2.802889E−02 | −2.082922E−02 | −3.038391E−02 | −3.226706E−02 |
| A6 = | 2.850315E−03 | 3.731147E−03 | 1.141742E−03 | 6.312196E−03 | 6.870832E−03 |
| A8 = | −1.935223E−03 | −4.260714E−04 | 3.015014E−04 | −9.140485E−04 | −1.145879E−03 |
| A10 = | 6.178729E−04 | 6.840914E−05 | −7.899654E−05 | 1.125509E−04 | 1.428613E−04 |
| A12 = | −1.215194E−04 | −1.499547E−05 | 9.534433E−06 | −1.110973E−05 | −1.325415E−05 |
| A14 = | 1.586614E−05 | 2.205420E−06 | −8.226903E−07 | 8.184301E−07 | 9.035470E−07 |
| A16 = | −1.394072E−06 | −1.953433E−07 | 6.117869E−08 | −4.336565E−08 | −4.458256E−08 |
| A18 = | 8.110032E−08 | 1.078627E−08 | −3.874660E−09 | 1.618191E−09 | 1.568889E−09 |
| A20 = | −2.983484E−09 | −3.771176E−10 | 1.860613E−10 | −4.158583E−11 | −3.864359E−11 |
| A22 = | 6.267495E−11 | 8.150660E−12 | −6.160739E−12 | 7.099682E−13 | 6.462508E−13 |
| A24 = | −5.716935E−13 | −9.966804E−14 | 1.304893E−13 | −7.534358E−15 | −6.945067E−15 |
| A26 = | — | 5.285222E−16 | −1.584249E−15 | 4.339490E−17 | 4.295342E−17 |
| A28 = | — | — | 8.374583E−18 | −9.553818E−20 | −1.151666E−19 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.69 | f/f2 | 0.55 |
| Fno | 1.95 | f/f9 | 0.46 |
| HFOV [deg.] | 42.5 | f/EPD | 1.95 |
| Nmax | 1.686 | EPD/BL | 4.17 |
| Vmin | 18.4 | BL/TD | 0.12 |
| V2 | 56.0 | ImgH/BL | 7.65 |
| V5 + V6 | 36.8 | SD/TD | 0.91 |
| V9 + V10 | 56.6 | TD/EPD | 2.00 |
| CT2/CT3 | 1.27 | ΣCT/TD | 0.61 |
| T34/T45 | 2.13 | TL/f | 1.15 |
| T89/T34 | 0.73 | TL/ImgH | 1.22 |
| T89/T78 | 0.41 | TL [mm] | 9.98 |
| (T78 + T910)/CT10 | 2.31 | Yc102/f | 0.15 |
| \|f2/f1\| | 0.87 | ImgH [mm] | 8.17 |

9th Embodiment

Figure 17:
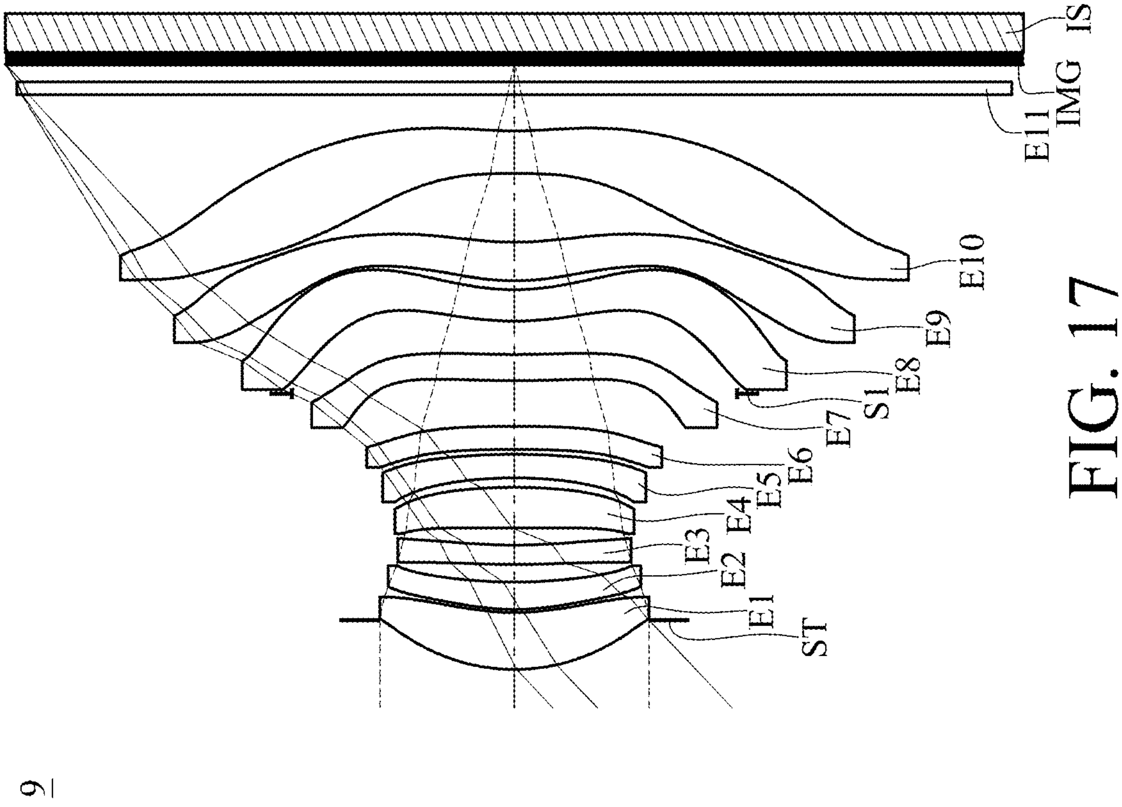
FIG. 17 is a schematic view of an image capturing unit according to the 9th embodiment of the present disclosure.
Figure 18:
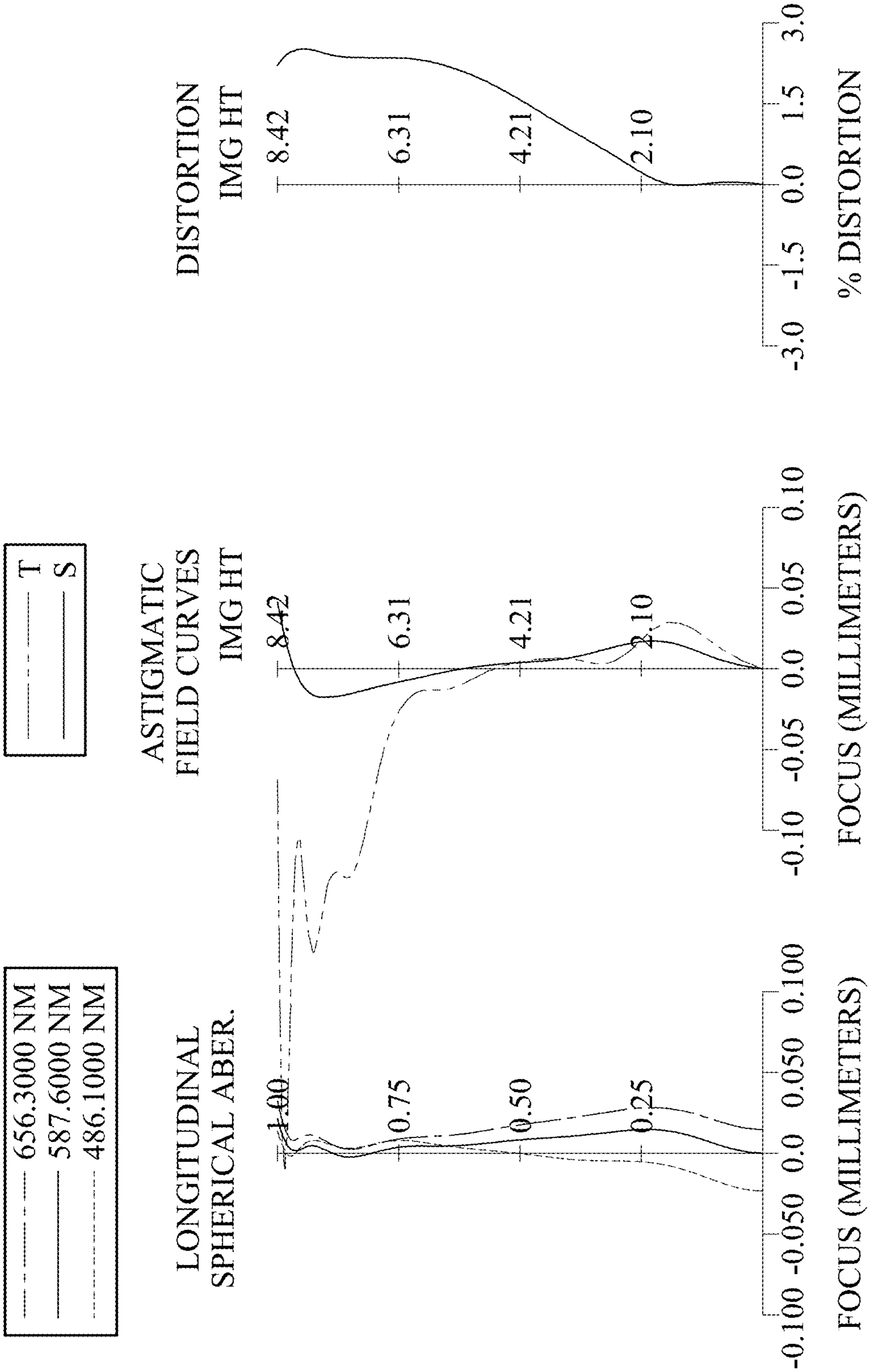
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a fifth lens element E5, a sixth lens element E6, a seventh lens element E7, a stop S1, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof The ninth lens element E9 with positive refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 9th embodiment are shown in Table 17 and the aspheric surface data are shown in Table 18 below.

TABLE 17

9th Embodiment
f = 8.68 mm, Fno = 1.95, HFOV = 43.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8140 | | | | |
| 2 | Lens 1 | 3.207200 | (ASP) | 0.9410 | Plastic | 1.545 | 56.1 | 18.86 |
| 3 | | 4.179100 | (ASP) | 0.0510 | | | | |
| 4 | Lens 2 | 4.103600 | (ASP) | 0.4510 | Plastic | 1.544 | 56.0 | 14.98 |
| 5 | | 7.945700 | (ASP) | 0.2910 | | | | |
| 6 | Lens 3 | 12.738900 | (ASP) | 0.3200 | Plastic | 1.686 | 18.4 | −41.28 |
| 7 | | 8.696900 | (ASP) | 0.2840 | | | | |
| 8 | Lens 4 | 105.407500 | (ASP) | 0.6710 | Plastic | 1.544 | 56.0 | 15.42 |
| 9 | | −9.094900 | (ASP) | 0.1560 | | | | |
| 10 | Lens 5 | −7.059400 | (ASP) | 0.3900 | Plastic | 1.686 | 18.4 | −32.65 |
| 11 | | −10.539100 | (ASP) | 0.0810 | | | | |
| 12 | Lens 6 | −23.401900 | (ASP) | 0.3800 | Plastic | 1.686 | 18.4 | −83.48 |
| 13 | | −39.831400 | (ASP) | 0.7550 | | | | |
| 14 | Lens 7 | 14.554300 | (ASP) | 0.4330 | Plastic | 1.686 | 18.4 | −232.14 |
| 15 | | 13.174200 | (ASP) | −0.6470 | | | | |
| 16 | Stop | Plano | | 1.2000 | | | | |
| 17 | Lens 8 | 4.965400 | (ASP) | 0.5200 | Plastic | 1.534 | 56.0 | −41.42 |
| 18 | | 3.907500 | (ASP) | 0.1450 | | | | |
| 19 | Lens 9 | 3.579000 | (ASP) | 0.6400 | Plastic | 1.587 | 28.3 | 15.82 |
| 20 | | 5.436200 | (ASP) | 1.1370 | | | | |
| 21 | Lens 10 | −13.708900 | (ASP) | 0.7000 | Plastic | 1.587 | 28.3 | −7.52 |
| 22 | | 6.634600 | (ASP) | 0.6000 | | | | |
| 23 | Filter | Plano | | 0.2100 | Glass | 1.517 | 64.2 | — |
| 24 | | Plano | | 0.2791 | | | | |
| 25 | Image | Plano | | — | | | | |

Note:
Reference wavelength is 587.6 nm (d-line).
An effective radius of the stop S1 (Surface 16) is 3.680 mm.

TABLE 18

Aspheric Coefficients

| | Surface # | | | | |
|---|---|---|---|---|---|
| | 2 | 3 | 4 | 5 | 6 |
| k = | −7.354080E−01 | −2.408400E+01 | −2.629850E+01 | −1.959970E+00 | 9.680000E+00 |
| A4 = | 2.371355E−03 | 1.772572E−02 | 2.210491E−02 | −6.511080E−03 | −1.699197E−02 |
| A6 = | 6.887361E−04 | −1.306175E−02 | −1.726245E−02 | 4.012493E−03 | 3.604856E−04 |
| A8 = | −4.005963E−04 | 4.830899E−03 | 8.294917E−03 | −1.786732E−03 | 3.636494E−03 |
| A10 = | 1.819312E−04 | −1.640490E−03 | −3.094346E−03 | 1.175988E−03 | −2.528503E−03 |
| A12 = | −4.863737E−05 | 4.379250E−04 | 8.031804E−04 | −5.327500E−04 | 8.000675E−04 |
| A14 = | 6.621663E−06 | −6.523882E−05 | −1.102514E−04 | 1.296460E−04 | −1.156603E−04 |
| A16 = | −4.419730E−07 | 3.804841E−06 | 5.850413E−06 | −1.213956E−05 | 6.173889E−06 |

| | Surface # | | | | |
|---|---|---|---|---|---|
| | 7 | 8 | 9 | 10 | 11 |
| k = | −8.272510E+00 | −9.900000E+01 | 1.120600E+01 | 5.870610E+00 | 1.518390E+01 |
| A4 = | −1.086383E−02 | −1.047786E−03 | 7.229242E−03 | 1.277392E−02 | 1.604554E−02 |
| A6 = | −1.427625E−04 | −4.753338E−03 | −1.790472E−02 | −1.581959E−02 | −1.043488E−02 |
| A8 = | 2.432157E−03 | 3.380200E−03 | 1.240139E−02 | −5.946230E−03 | −3.956712E−03 |
| A10 = | −1.534680E−03 | −2.187479E−03 | −4.271740E−03 | 2.432498E−02 | 5.811266E−03 |
| A12 = | 3.784436E−04 | 8.913116E−04 | 5.270355E−04 | −2.338511E−02 | 8.342872E−04 |
| A14 = | −2.183637E−05 | −2.687114E−04 | 5.675255E−05 | 1.270652E−02 | −3.872489E−03 |
| A16 = | −2.236091E−06 | 5.523173E−05 | −1.673319E−05 | −4.331139E−03 | 2.612718E−03 |
| A18 = | — | −5.177363E−06 | −1.759901E−07 | 8.393761E−04 | −9.538771E−04 |
| A20 = | — | — | 1.632983E−07 | −2.571049E−05 | 2.198464E−04 |
| A22 = | — | — | — | −3.228380E−05 | −3.304004E−05 |
| A24 = | — | — | — | 8.695305E−06 | 3.154911E−06 |
| A26 = | — | — | — | −9.963160E−07 | −1.741795E−07 |
| A28 = | — | — | — | 4.508214E−08 | 4.238860E−09 |

| | Surface # | | | | |
|---|---|---|---|---|---|
| | 12 | 13 | 14 | 15 | 17 |
| k = | 8.283400E+01 | 7.961790E+01 | 9.086500E+00 | 7.475190E+00 | −4.010530E+00 |
| A4 = | −8.806011E−03 | −1.737601E−02 | −1.748857E−02 | −2.567863E−02 | −1.011876E−02 |
| A6 = | 1.539587E−02 | 1.165114E−02 | 5.845884E−03 | 9.049762E−03 | −1.087837E−04 |
| A8 = | −2.662932E−02 | −1.047277E−02 | −1.241165E−03 | −2.611505E−03 | −1.807668E−04 |
| A10 = | 2.140855E−02 | 5.774712E−03 | −6.054779E−04 | 2.410210E−04 | −1.451401E−05 |
| A12 = | −9.704777E−03 | −2.011820E−03 | 4.531537E−04 | 7.672980E−05 | 2.575215E−05 |
| A14 = | 2.603245E−03 | 4.412155E−04 | −1.379529E−04 | −3.115099E−05 | −6.831088E−06 |
| A16 = | −4.082078E−04 | −5.826384E−05 | 2.376987E−05 | 5.045200E−06 | 9.291987E−07 |
| A18 = | 3.461340E−05 | 4.215189E−06 | −2.404256E−06 | −4.326679E−07 | −7.369120E−08 |
| A20 = | −1.229914E−06 | −1.282036E−07 | 1.334876E−07 | 1.921804E−08 | 3.391974E−09 |
| A22 = | — | — | −3.136913E−09 | −3.484711E−10 | −8.228421E−11 |
| A24 = | — | — | — | — | 7.831246E−13 |

| | Surface # | | | | |
|---|---|---|---|---|---|
| | 18 | 19 | 20 | 21 | 22 |
| k = | −5.373280E+00 | −1.771450E+00 | −1.013550E+00 | 5.498320E−01 | −1.185890E+00 |
| A4 = | −1.001032E−02 | −3.363416E−02 | −2.278383E−02 | −3.897883E−02 | −4.064053E−02 |
| A6 = | 5.165630E−03 | 8.200254E−03 | 2.702131E−03 | 1.108623E−02 | 1.018475E−02 |
| A8 = | −2.855055E−03 | −2.072926E−03 | −2.229600E−04 | −2.314549E−03 | −1.870089E−03 |
| A10 = | 8.486843E−04 | 4.300541E−04 | 1.959555E−05 | 3.740882E−04 | 2.463026E−04 |
| A12 = | −1.599776E−04 | −6.596225E−05 | −1.813954E−06 | −4.361776E−05 | −2.342338E−05 |
| A14 = | 2.014709E−05 | 7.009224E−06 | 1.075492E−08 | 3.586254E−06 | 1.618973E−06 |
| A16 = | −1.712414E−06 | −5.052812E−07 | 2.156525E−08 | −2.082537E−07 | −8.152285E−08 |
| A18 = | 9.676293E−08 | 2.454896E−08 | −2.674884E−09 | 8.564442E−09 | 2.979722E−09 |
| A20 = | −3.475908E−09 | −7.914062E−10 | 1.644062E−10 | −2.479204E−10 | −7.807828E−11 |
| A22 = | 7.169605E−11 | 1.623584E−11 | −5.975152E−12 | 4.943371E−12 | 1.428552E−12 |
| A24 = | −6.453813E−13 | −1.920370E−13 | 1.306743E−13 | −6.469146E−14 | −1.733471E−14 |
| A26 = | — | 9.977034E−16 | −1.597342E−15 | 5.006864E−16 | 1.254463E−16 |
| A28 = | — | — | 8.415110E−18 | −1.738812E−18 | −4.101522E−19 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.68 | f/f2 | 0.58 |
| Fno | 1.95 | f/f9 | 0.55 |
| HFOV [deg.] | 43.5 | f/EPD | 1.95 |
| Nmax | 1.686 | EPD/BL | 4.09 |
| Vmin | 18.4 | BL/TD | 0.12 |
| V2 | 56.0 | ImgH/BL | 7.73 |
| V5 + V6 | 36.8 | SD/TD | 0.91 |
| V9 + V10 | 56.6 | TD/EPD | 2.00 |
| CT2/CT3 | 1.41 | ΣCT/TD | 0.61 |
| T34/T45 | 1.82 | TL/f | 1.15 |
| T89/T34 | 0.51 | TL/ImgH | 1.19 |
| T89/T78 | 0.26 | TL [mm] | 9.99 |
| (T78 + T910)/CT10 | 2.41 | Yc102/f | 0.14 |
| \|f2/f1\| | 0.79 | ImgH [mm] | 8.42 |

10th Embodiment

Figure 19:
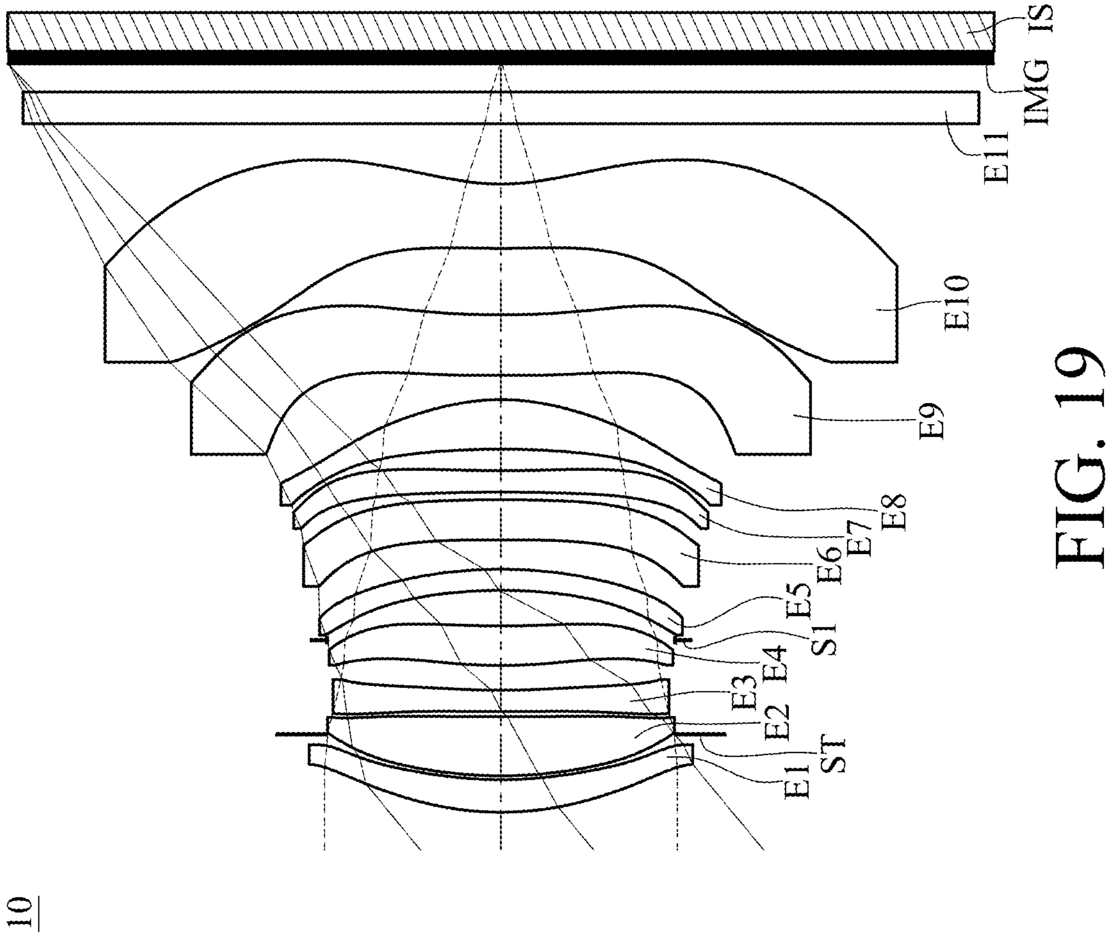
FIG. 19 is a schematic view of an image capturing unit according to the 10th embodiment of the present disclosure.
Figure 20:
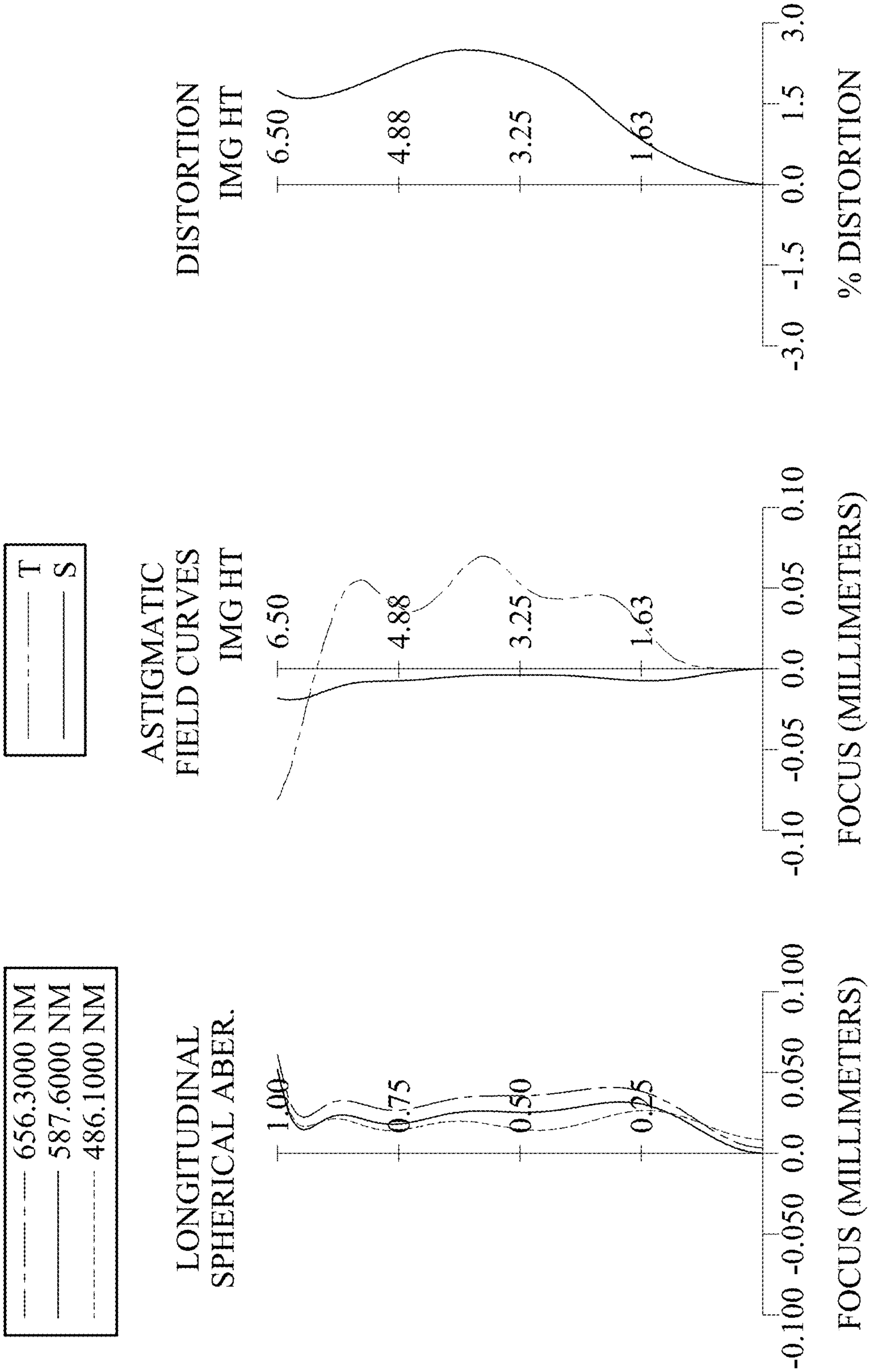
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a stop S1, a fifth lens element E5, a sixth lens element E6, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being convex in a paraxial region thereof. The second lens element E2 is made of glass material and has the object-side surface and the image-side surface being both aspheric. The image-side surface of the second lens element E2 has at least one inflection point.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point. The image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point. The image-side surface of the fourth lens element E4 has at least one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point. The image-side surface of the sixth lens element E6 has at least one inflection point.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one inflection point.

The eighth lens element E8 with positive refractive power has an object-side surface being concave in a paraxial region thereof and an image-side surface being convex in a paraxial region thereof. The eighth lens element E8 is made of plastic material and has the object-side surface and the image-side surface being both aspheric. The image-side surface of the eighth lens element E8 has at least one inflection point.

The ninth lens element E9 with negative refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being convex in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 10th embodiment are shown in Table 19 and the aspheric surface data are shown in Table 20 below.

TABLE 19

| 10th Embodiment<br>f = 7.69 mm, Fno = 1.65, HFOV = 39.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.020711 | (ASP) | 0.4310 | Plastic | 1.545 | 56.0 | 28.17 |
| 2 | | 5.242861 | (ASP) | 0.6000 | | | | |
| 3 | Ape. Stop | Plano | | −0.5500 | | | | |
| 4 | Lens 2 | 5.512351 | (ASP) | 0.7830 | Glass | 1.548 | 45.8 | 9.76 |
| 5 | | −169.548001 | (ASP) | 0.0700 | | | | |
| 6 | Lens 3 | −142.524991 | (ASP) | 0.2800 | Plastic | 1.680 | 18.2 | −14.74 |
| 7 | | 10.793702 | (ASP) | 0.3270 | | | | |
| 8 | Lens 4 | 6.373413 | (ASP) | 0.5240 | Plastic | 1.544 | 56.0 | 21.52 |
| 9 | | 13.583072 | (ASP) | −0.1910 | | | | |
| 10 | Stop | Plano | | 0.6610 | | | | |
| 11 | Lens 5 | −6.820555 | (ASP) | 0.2800 | Plastic | 1.566 | 37.4 | 95.76 |
| 12 | | −6.148161 | (ASP) | 0.3880 | | | | |
| 13 | Lens 6 | −48.500768 | (ASP) | 0.5320 | Plastic | 1.660 | 20.4 | 60.02 |
| 14 | | −21.899106 | (ASP) | 0.1000 | | | | |
| 15 | Lens 7 | −26.713687 | (ASP) | 0.2840 | Plastic | 1.566 | 37.4 | −18.77 |
| 16 | | 17.704257 | (ASP) | 0.2850 | | | | |
| 17 | Lens 8 | −9.750542 | (ASP) | 0.6550 | Plastic | 1.544 | 56.0 | 6.98 |
| 18 | | −2.797319 | (ASP) | 0.3200 | | | | |
| 19 | Lens 9 | 101.759292 | (ASP) | 0.8000 | Plastic | 1.680 | 18.2 | −20.38 |
| 20 | | 12.159588 | (ASP) | 0.8800 | | | | |
| 21 | Lens 10 | 13.797442 | (ASP) | 0.8500 | Plastic | 1.535 | 56.3 | −7.03 |
| 22 | | 2.888719 | (ASP) | 0.8000 | | | | |
| 23 | Filter | Plano | | 0.4200 | Glass | 1.517 | 64.2 | — |
| 24 | | Plano | | 0.3714 | | | | |
| 25 | Image | Plano | | — | | | | |

Note:
Reference wavelength is 587.6 nm (d-line).
An effective radius of the stop S1 (Surface 10) is 2.300 mm.

TABLE 20

| Aspheric Coefficients | | | | | |
|---|---|---|---|---|---|
| | Surface # | | | | |
| | 1 | 2 | 4 | 5 | 6 |
| k = | −5.239146E−01 | −8.095183E−01 | 2.340445E+00 | −9.000000E+01 | 9.000000E+01 |
| A4 = | −4.147671E−03 | −1.377695E−02 | −1.087122E−02 | 2.235296E−02 | 1.825247E−02 |
| A6 = | 1.708032E−03 | 5.147607E−03 | 4.628153E−03 | −1.963667E−02 | −2.449447E−02 |
| A8 = | −1.033427E−03 | −1.614143E−03 | −1.780741E−03 | 6.778408E−03 | 1.129574E−02 |
| A10 = | 3.163395E−04 | 4.776928E−04 | 6.337877E−04 | −1.116207E−03 | −2.536240E−03 |
| A12 = | −4.583839E−05 | −4.764326E−05 | −1.091374E−04 | 7.419853E−05 | 2.839307E−04 |
| A14 = | 2.282703E−06 | −4.344209E−06 | 6.640548E−06 | −7.584409E−08 | −1.243484E−05 |
| A16 = | — | 6.448724E−07 | — | — | — |
| | Surface # | | | | |
| | 7 | 8 | 9 | 11 | 12 |
| k = | −5.699679E+01 | −4.367171E+01 | −9.000000E+01 | 2.454636E+00 | 1.350263E+00 |
| A4 = | 1.097462E−04 | 4.741315E−03 | −6.019407E−03 | −4.030530E−03 | −3.442562E−03 |
| A6 = | −1.019900E−02 | −9.877742E−03 | −3.502623E−03 | 8.299873E−04 | 2.015275E−03 |
| A8 = | 6.548041E−03 | 3.227314E−03 | −4.507257E−06 | −1.028378E−03 | −6.146261E−04 |
| A10 = | −1.800358E−03 | −6.406542E−04 | 1.218827E−04 | 3.943520E−04 | 2.398352E−04 |
| A12 = | 2.466128E−04 | 7.731718E−05 | −1.478919E−05 | −9.977763E−05 | −8.883382E−05 |
| A14 = | −1.307424E−05 | −4.395099E−06 | 3.070356E−07 | 1.578264E−05 | 1.479166E−05 |
| A16 = | — | — | — | −1.019239E−06 | −9.166364E−07 |

TABLE 20-continued

| Aspheric Coefficients | | | | | |
|---|---|---|---|---|---|
| | Surface # | | | | |
| | 13 | 14 | 15 | 16 | 17 |
| k = | −7.150353E+00 | 3.495361E+01 | 8.126834E+00 | 3.894879E+01 | 1.047001E+01 |
| A4 = | −1.573515E−02 | −4.299021E−03 | −3.352213E−04 | −4.201347E−01 | 1.328535E−02 |
| A6 = | 1.529063E−03 | 3.996917E−03 | 2.323745E−03 | −3.510636E+00 | −9.727177E−03 |
| A8 = | −6.749149E−04 | −4.428819E−03 | −2.105262E−03 | 1.730394E+01 | 3.502664E−03 |
| A10 = | 1.589526E−04 | 1.563837E−03 | 4.728269E−04 | −4.461039E+01 | −8.408044E−04 |
| A12 = | −9.374577E−06 | −2.656568E−04 | −2.480334E−05 | 6.230191E+01 | 1.197228E−04 |
| A14 = | −4.468949E−06 | 2.154750E−05 | −3.893659E−06 | −4.568782E+01 | −8.910333E−06 |
| A16 = | 5.779238E−07 | −6.492701E−07 | 3.644105E−07 | 1.365628E+01 | 2.684782E−07 |
| | Surface # | | | | |
| | 18 | 19 | 20 | 21 | 22 |
| k = | −1.271908E+00 | −1.834717E+00 | −9.000000E+01 | −8.129198E−02 | −6.626012E+00 |
| A4 = | 3.180715E−02 | 2.834500E−02 | 1.376157E−02 | −4.309712E−02 | −2.170931E−02 |
| A6 = | −1.690499E−02 | −1.934747E−02 | −5.672679E−03 | 1.192588E−02 | 5.660632E−03 |
| A8 = | 5.133017E−03 | 6.816840E−03 | 6.858598E−04 | −3.134609E−03 | −1.228660E−03 |
| A10 = | −9.116578E−04 | −1.849126E−03 | −7.755992E−06 | 5.323210E−04 | 1.834478E−04 |
| A12 = | 6.096912E−05 | 3.693633E−04 | −7.122950E−06 | −5.515966E−05 | −1.870861E−05 |
| A14 = | 8.748003E−06 | −5.030400E−05 | 7.851681E−07 | 3.601568E−06 | 1.318261E−06 |
| A16 = | −2.085534E−06 | 4.243649E−06 | −2.976360E−08 | −1.504251E−07 | −6.424062E−08 |
| A18 = | 1.548097E−07 | −1.891166E−07 | −2.914583E−10 | 3.932774E−09 | 2.126305E−09 |
| A20 = | −4.074201E−09 | 2.312057E−09 | 5.149794E−11 | −5.909962E−11 | −4.559538E−11 |
| A22 = | — | 7.295773E−11 | −1.036255E−12 | 3.924012E−13 | 5.704440E−13 |
| A24 = | — | — | — | — | −3.154115E−15 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 7.69 | f/f2 | 0.79 |
| Fno | 1.65 | f/f9 | −0.38 |
| HFOV [deg.] | 39.6 | f/EPD | 1.65 |
| Nmax | 1.680 | EPD/BL | 2.93 |
| Vmin | 18.2 | BL/TD | 0.19 |
| V2 | 45.8 | ImgH/BL | 4.08 |
| V5 + V6 | 57.8 | SD/TD | 0.88 |
| V9 + V10 | 74.5 | TD/EPD | 1.78 |
| CT2/CT3 | 2.80 | ΣCT/TD | 0.65 |
| T34/T45 | 0.70 | TL/f | 1.29 |
| T89/T34 | 0.98 | TL/ImgH | 1.52 |
| T89/T78 | 1.12 | TL [mm] | 9.90 |
| (T78 + T910)/CT10 | 1.37 | Yc102/f | 0.31 |
| \|f2/f1\| | 0.35 | ImgH [mm] | 6.50 |

11th Embodiment

Figure 21:
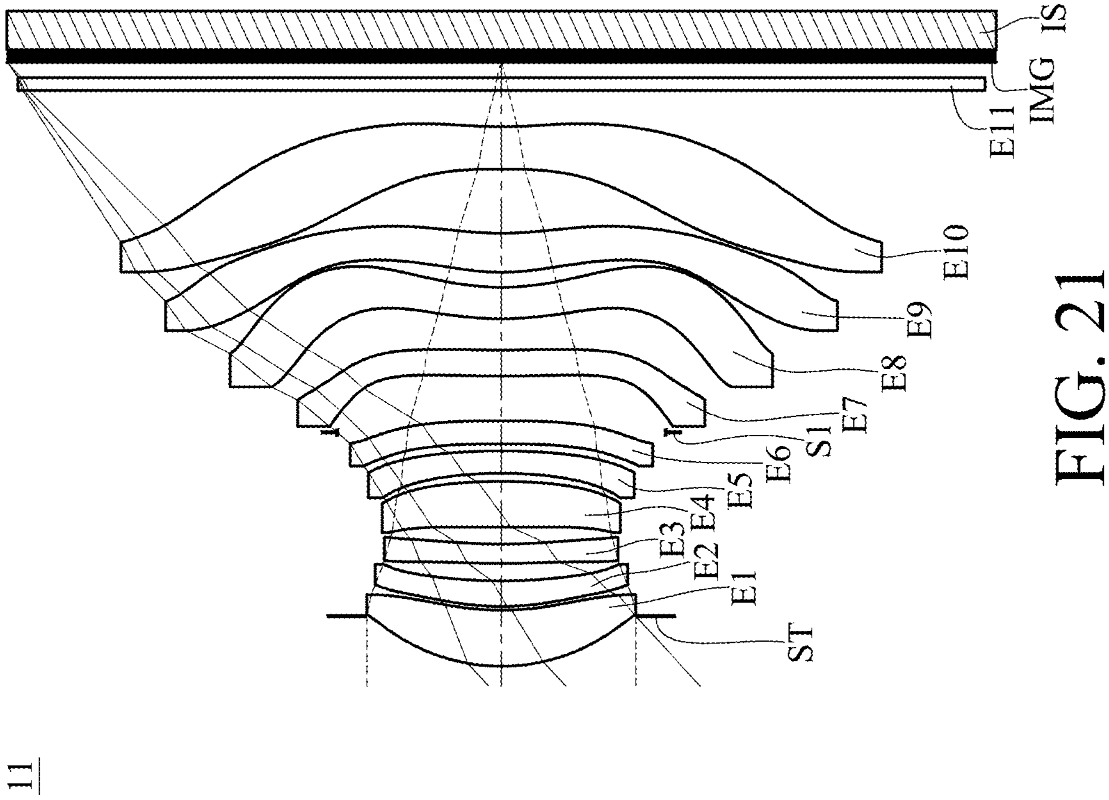
FIG. 21 is a schematic view of an image capturing unit according to the 11th embodiment of the present disclosure.
Figure 22:
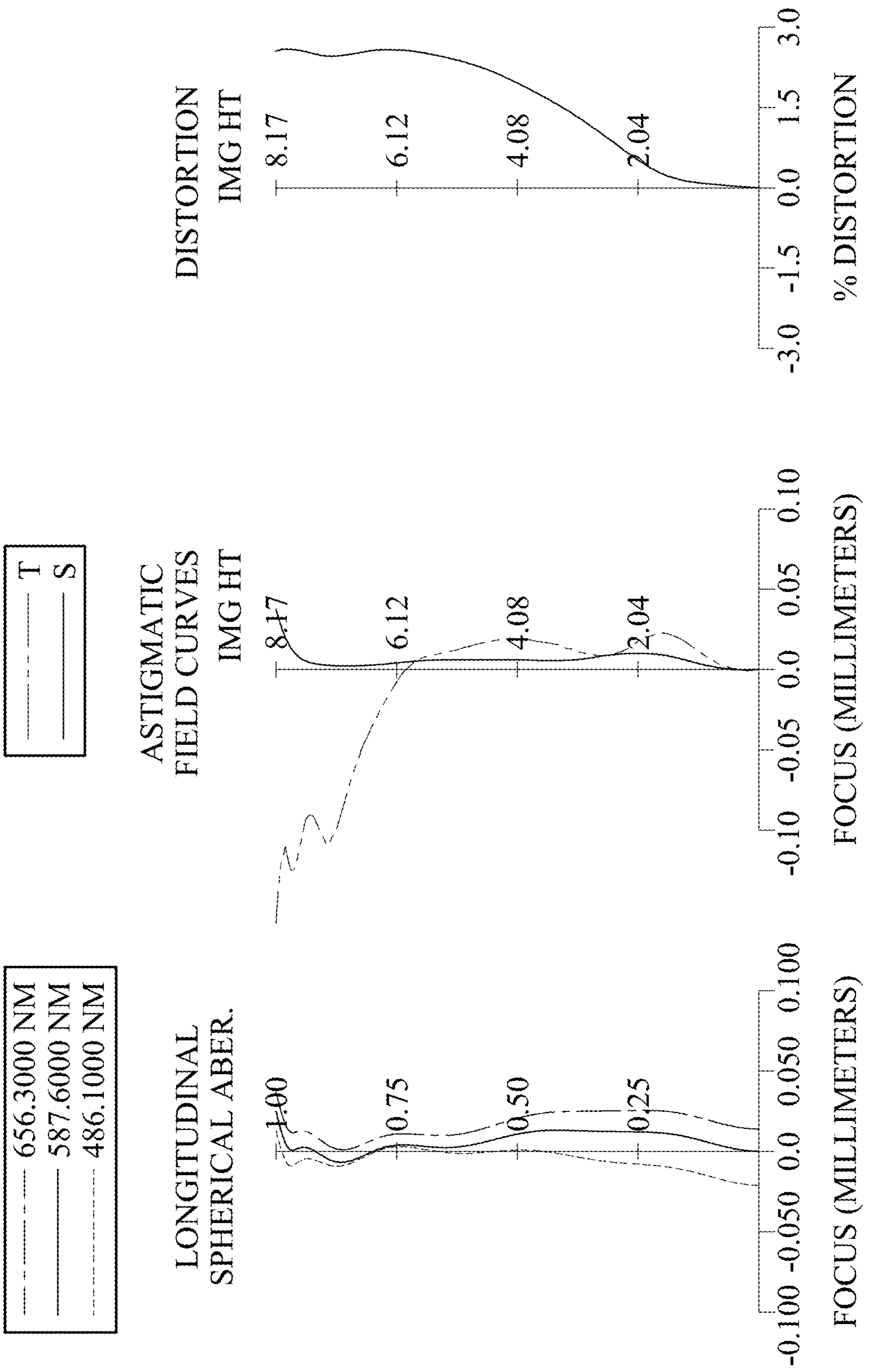
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a third lens element E3, a fourth lens element E4, a fifth lens element E5, a sixth lens element E6, a stop S1, a seventh lens element E7, an eighth lens element E8, a ninth lens element E9, a tenth lens element E10, a filter E11 and an image surface IMG. The optical imaging lens system includes ten lens elements (E1, E2, E3, E4, E5, E6, E7, E8, E9 and E10) with no additional lens element disposed between each of the adjacent ten lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point. The image-side surface of the first lens element E1 has at least one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point. The image-side surface of the third lens element E3 has at least one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has at least one inflection point.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one inflection point. The image-side surface of the seventh lens element E7 has at least one inflection point.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has at least one inflection point. The image-side surface of the eighth lens element E8 has at least one inflection point. The image-side surface of the eighth lens element E8 has at least one critical point in an off-axis region thereof.

The ninth lens element E9 with positive refractive power has an object-side surface being convex in a paraxial region thereof and an image-side surface being concave in a paraxial region thereof. The ninth lens element E9 is made of plastic material and has the object-side surface and the image-side surface being both aspheric. The object-side surface of the ninth lens element E9 has at least one inflection point. The image-side surface of the ninth lens element E9 has at least one inflection point. The image-side surface of the ninth lens element E9 has at least one critical point in an off-axis region thereof.

The tenth lens element E10 with negative refractive power has an object-side surface being concave in a paraxial region thereof and an image-side surface being concave in a paraxial region thereof. The tenth lens element E10 is made of plastic material and has the object-side surface and the image-side surface being both aspheric. The object-side surface of the tenth lens element E10 has at least one inflection point. The image-side surface of the tenth lens element E10 has at least one inflection point. The image-side surface of the tenth lens element E10 has at least one critical point in an off-axis region thereof.

The filter E11 is made of glass material and located between the tenth lens element E10 and the image surface IMG, and will not affect the focal length of the optical imaging lens system. The image sensor IS is disposed on or near the image surface IMG of the optical imaging lens system.

The detailed optical data of the 11th embodiment are shown in Table 21 and the aspheric surface data are shown in Table 22 below.

TABLE 21

| 11th Embodiment<br>f = 8.67 mm, Fno = 1.95, HFOV = 42.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.8290 | | | | |
| 2 | Lens 1 | 3.184600 | (ASP) | 0.9260 | Plastic | 1.545 | 56.1 | 17.56 |
| 3 | | 4.283800 | (ASP) | 0.0610 | | | | |
| 4 | Lens 2 | 4.192700 | (ASP) | 0.4230 | Plastic | 1.544 | 56.0 | 15.51 |
| 5 | | 8.035700 | (ASP) | 0.2890 | | | | |
| 6 | Lens 3 | 13.283900 | (ASP) | 0.3200 | Plastic | 1.686 | 18.4 | −37.27 |
| 7 | | 8.656200 | (ASP) | 0.2800 | | | | |
| 8 | Lens 4 | 82.786400 | (ASP) | 0.7560 | Plastic | 1.544 | 56.0 | 14.78 |
| 9 | | −8.874200 | (ASP) | 0.1340 | | | | |
| 10 | Lens 5 | −6.846600 | (ASP) | 0.3700 | Plastic | 1.686 | 18.4 | −37.18 |
| 11 | | −9.564100 | (ASP) | 0.1180 | | | | |
| 12 | Lens 6 | −17.578800 | (ASP) | 0.3800 | Plastic | 1.686 | 18.4 | −64.86 |
| 13 | | −29.312700 | (ASP) | −0.1930 | | | | |
| 14 | Stop | Plano | | 0.9300 | | | | |
| 15 | Lens 7 | 15.394100 | (ASP) | 0.4320 | Plastic | 1.686 | 18.4 | 352.17 |
| 16 | | 16.253900 | (ASP) | 0.5170 | | | | |
| 17 | Lens 8 | 5.303200 | (ASP) | 0.5200 | Plastic | 1.534 | 56.0 | −43.32 |
| 18 | | 4.167200 | (ASP) | 0.2500 | | | | |
| 19 | Lens 9 | 3.965600 | (ASP) | 0.6420 | Plastic | 1.587 | 28.3 | 22.00 |
| 20 | | 5.379600 | (ASP) | 1.0620 | | | | |
| 21 | Lens 10 | −14.307800 | (ASP) | 0.7000 | Plastic | 1.587 | 28.3 | −8.16 |
| 22 | | 7.329600 | (ASP) | 0.6000 | | | | |
| 23 | Filter | Plano | | 0.2100 | Glass | 1.517 | 64.2 | — |
| 24 | | Plano | | 0.2535 | | | | |
| 25 | Image | Plano | | — | | | | |

Note:
Reference wavelength is 587.6 nm (d-line).
An effective radius of the stop S1 (Surface 14) is 2.716 mm.

TABLE 22

Aspheric Coefficients

| | Surface # | | | | |
|---|---|---|---|---|---|
| | 2 | 3 | 4 | 5 | 6 |
| k = | −6.825970E−01 | −2.315810E+01 | −2.759520E+01 | −2.171620E+00 | 1.482530E+01 |
| A4 = | 2.035108E−03 | 1.344161E−02 | 1.940684E−02 | −1.032233E−02 | −2.101531E−02 |
| A6 = | 1.161278E−03 | −4.958853E−03 | −1.119129E−02 | 8.796202E−03 | 6.092744E−03 |
| A8 = | −6.821669E−04 | −1.105542E−04 | 4.888725E−03 | −5.187272E−03 | −3.334195E−04 |
| A10 = | 2.849877E−04 | −1.776127E−04 | −2.470882E−03 | 2.659251E−03 | −7.035175E−04 |
| A12 = | −7.031533E−05 | 2.018908E−04 | 8.261662E−04 | −9.368838E−04 | 2.593609E−04 |
| A14 = | 9.426352E−06 | −4.486849E−05 | −1.299100E−04 | 1.946845E−04 | −2.441415E−05 |
| A16 = | −6.311850E−07 | 3.043972E−06 | 7.547220E−06 | −1.663539E−05 | −3.152199E−07 |

| | Surface # | | | | |
|---|---|---|---|---|---|
| | 7 | 8 | 9 | 10 | 11 |
| k = | −9.172420E+00 | −9.900000E+01 | 1.010790E+01 | 5.463660E+00 | 0.000000E+00 |
| A4 = | −1.446275E−02 | −2.648526E−03 | 2.045991E−02 | 3.746322E−02 | 4.188060E−02 |
| A6 = | 4.054376E−03 | −6.335425E−03 | −5.192459E−02 | −8.251297E−02 | −8.818966E−02 |
| A8 = | 1.249643E−04 | 6.970709E−03 | 5.315717E−02 | 7.856931E−02 | 8.808752E−02 |
| A10 = | −8.360434E−04 | −5.364833E−03 | −3.245859E−02 | −3.852235E−02 | −5.286796E−02 |
| A12 = | 2.656010E−04 | 2.365130E−03 | 1.252032E−02 | 6.682927E−03 | 2.069012E−02 |
| A14 = | −1.515087E−05 | −6.371890E−04 | −3.143139E−03 | 2.995508E−03 | −5.605045E−03 |
| A16 = | −1.782370E−06 | 1.017406E−04 | 5.078230E−04 | −2.265913E−03 | 1.102922E−03 |
| A18 = | — | −7.342312E−06 | −4.873829E−05 | 6.617586E−04 | −1.645752E−04 |
| A20 = | — | — | 2.116963E−06 | −9.387847E−05 | 1.875652E−05 |
| A22 = | — | — | — | 1.854252E−06 | −1.470222E−06 |
| A24 = | — | — | — | 1.504226E−06 | 5.675544E−08 |
| A26 = | — | — | — | −2.235006E−07 | — |
| A28 = | — | — | — | 1.090519E−08 | — |

| | Surface # | | | | |
|---|---|---|---|---|---|
| | 12 | 13 | 15 | 16 | 17 |
| k = | 4.297780E+01 | 0.000000E+00 | 4.272410E+00 | 1.330370E+01 | −3.661080E+00 |
| A4 = | 9.536198E−03 | −1.722996E−02 | −2.549747E−02 | −3.073863E−02 | −1.014198E−02 |
| A6 = | −3.539476E−02 | 8.560569E−03 | 1.302099E−02 | 1.547966E−02 | 2.048797E−03 |
| A8 = | 3.479961E−02 | −5.385857E−03 | −4.413782E−03 | −5.675880E−03 | −1.342388E−03 |
| A10 = | −1.935631E−02 | 2.381922E−03 | 2.828587E−04 | 1.126047E−03 | 2.815837E−04 |
| A12 = | 6.593519E−03 | −7.798733E−04 | 2.772114E−04 | −9.625027E−05 | −1.871265E−05 |
| A14 = | −1.437522E−03 | 1.748443E−04 | −1.126487E−04 | −8.186592E−06 | −2.775334E−06 |
| A16 = | 2.001642E−04 | −2.397537E−05 | 2.103873E−05 | 3.054551E−06 | 7.531424E−07 |
| A18 = | −1.632124E−05 | 1.790758E−06 | −2.174591E−06 | −3.268746E−07 | −7.936514E−08 |
| A20 = | 5.870299E−07 | −5.579744E−08 | 1.200576E−07 | 1.613364E−08 | 4.592460E−09 |
| A22 = | — | — | −2.765676E−09 | −3.111540E−10 | −1.424677E−10 |
| A24 = | — | — | — | — | 1.845722E−12 |

| | Surface # | | | | |
|---|---|---|---|---|---|
| | 18 | 19 | 20 | 21 | 22 |
| k = | −4.520990E+00 | −1.563820E+00 | −1.048860E+00 | 6.514590E−01 | −8.235310E−01 |
| A4 = | −5.091688E−03 | −2.756413E−02 | −2.212417E−02 | −2.950374E−02 | −3.110127E−02 |
| A6 = | 2.232707E−03 | 2.729461E−03 | 6.706214E−04 | 5.561737E−03 | 5.830824E−03 |
| A8 = | −1.717594E−03 | 5.412330E−05 | 4.465652E−04 | −6.170202E−04 | −7.080242E−04 |
| A10 = | 5.379376E−04 | −4.719459E−05 | −7.917989E−05 | 4.627985E−05 | 4.702206E−05 |
| A12 = | −1.011931E−04 | 3.160312E−06 | 4.393398E−06 | −1.848719E−06 | −4.861413E−07 |
| A14 = | 1.256943E−05 | 2.418275E−07 | 2.156994E−07 | −4.036205E−08 | −2.118815E−07 |
| A16 = | −1.052042E−06 | −4.961604E−08 | −4.989447E−08 | 1.119916E−08 | 2.173423E−08 |
| A18 = | 5.852913E−08 | 3.460086E−09 | 3.663997E−09 | −7.913711E−10 | −1.159003E−09 |
| A20 = | −2.069220E−09 | −1.329259E−10 | −1.539733E−10 | 3.227992E−11 | 3.898600E−11 |
| A22 = | 4.199128E−11 | 2.989290E−12 | 4.026869E−12 | −8.319805E−13 | −8.539080E−13 |
| A24 = | −3.718565E−13 | −3.703541E−14 | −6.466185E−14 | 1.338022E−14 | 1.184549E−14 |
| A26 = | — | 1.959926E−16 | 5.814480E−16 | −1.228622E−16 | −9.468081E−17 |
| A28 = | — | — | −2.224143E−18 | 4.925675E−19 | 3.325012E−19 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 8.67 | f/f2 | 0.56 |
| Fno | 1.95 | f/f9 | 0.39 |
| HFOV[deg.] | 42.6 | f/EPD | 1.95 |
| Nmax | 1.686 | EPD/BL | 4.18 |
| Vmin | 18.4 | BL/TD | 0.12 |
| V2 | 56.0 | ImgH/BL | 7.68 |
| V5 + V6 | 36.8 | SD/TD | 0.91 |
| V9 + V10 | 56.6 | TD/EPD | 2.01 |
| CT2/CT3 | 1.32 | ΣCT/TD | 0.61 |
| T34/T45 | 2.09 | TL/f | 1.15 |
| T89/T34 | 0.89 | TL/ImgH | 1.22 |
| T89/T78 | 0.48 | TL [mm] | 9.98 |
| (T78 + T910)/CT10 | 2.26 | Yc102/f | 0.15 |
| \|f2/f1\| | 0.88 | ImgH [mm] | 8.17 |

12th Embodiment

Figure 23:
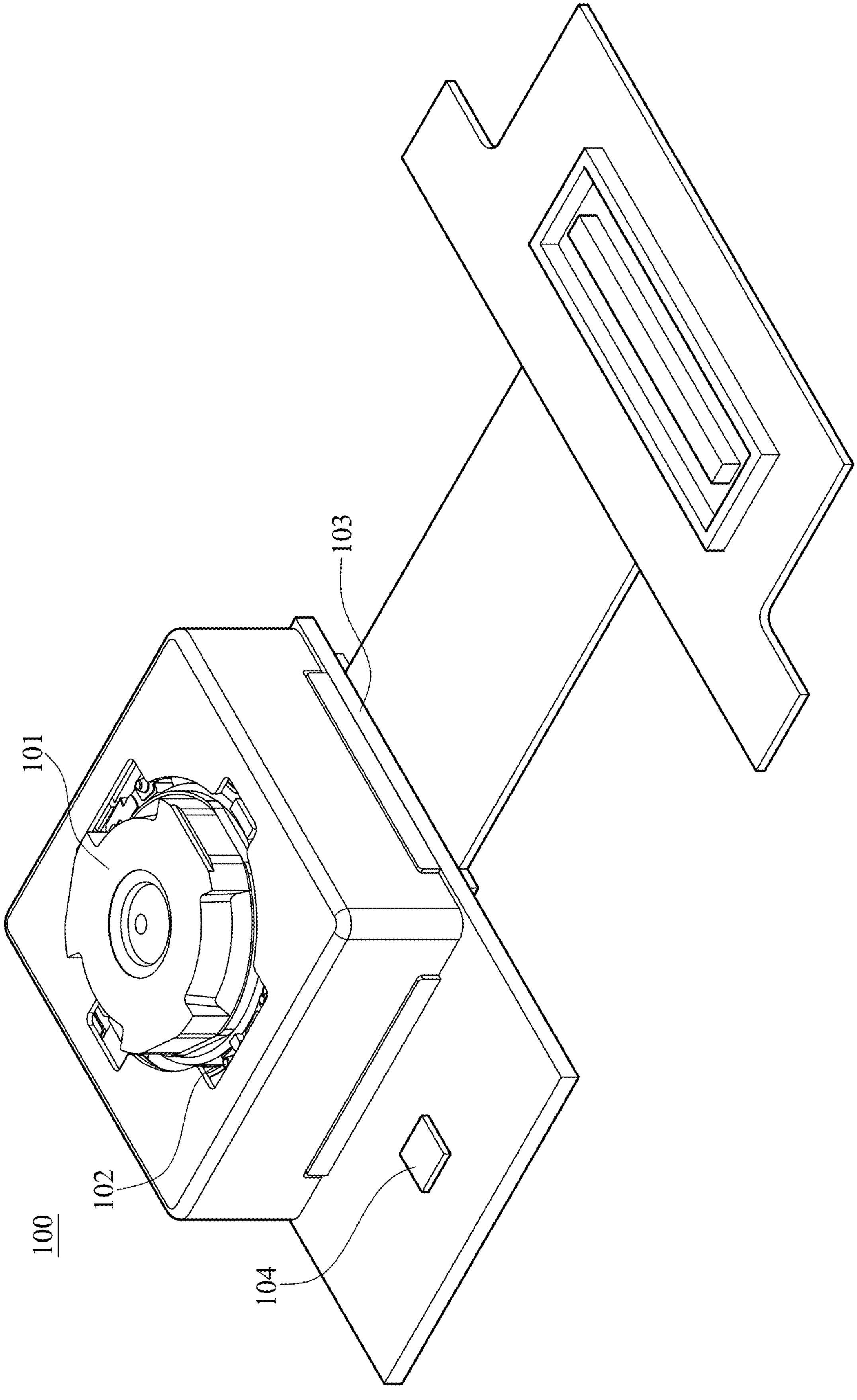
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the optical imaging lens system disclosed in the 1st embodiment, a barrel and a holder member (their reference numerals are omitted) for holding the optical imaging lens system. However, the lens unit 101 may alternatively be provided with the optical imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical imaging lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

13th Embodiment

Figure 24:
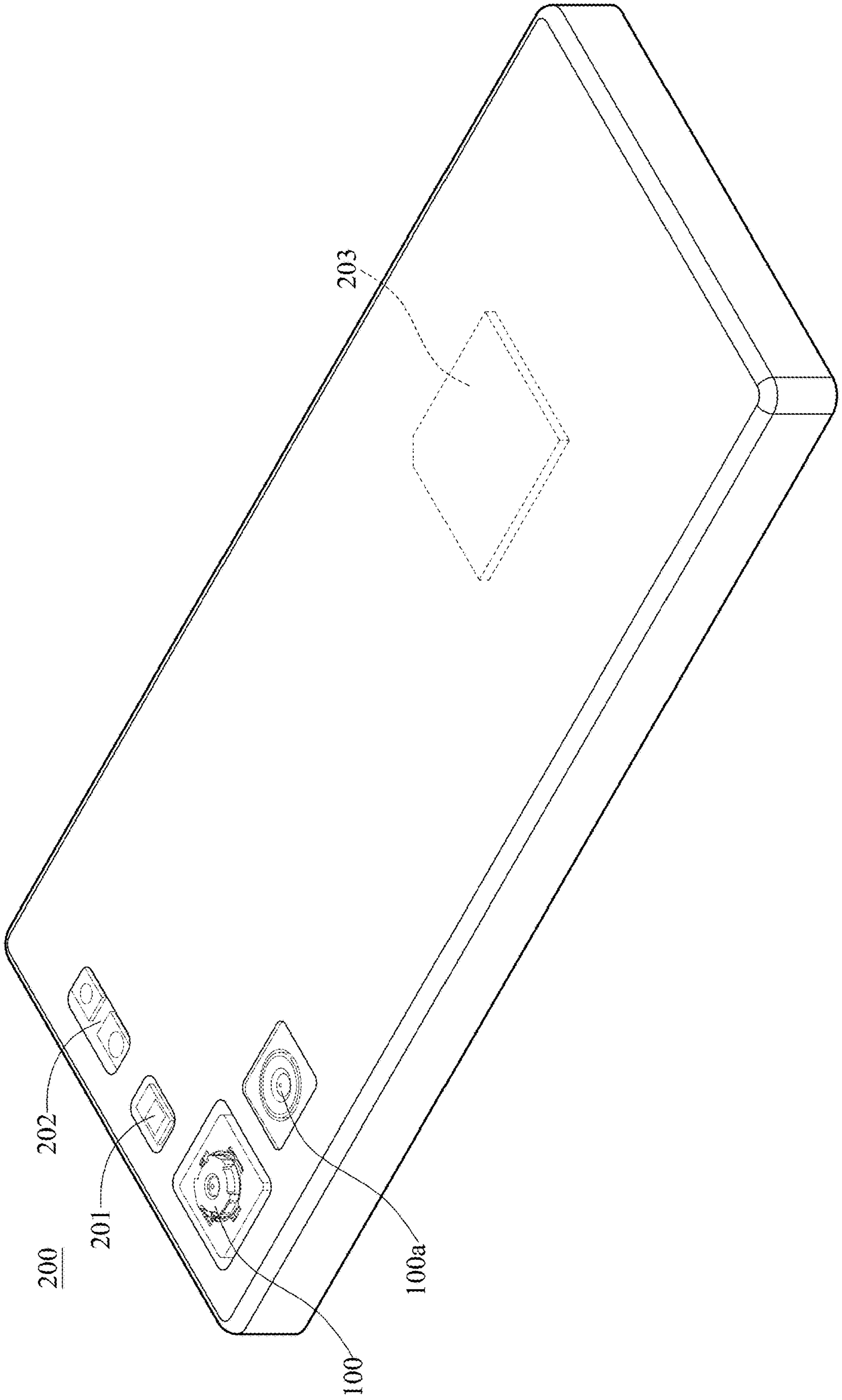
FIG. 24 is one perspective view of an electronic device according to the 13th embodiment of the present disclosure.
Figure 25:
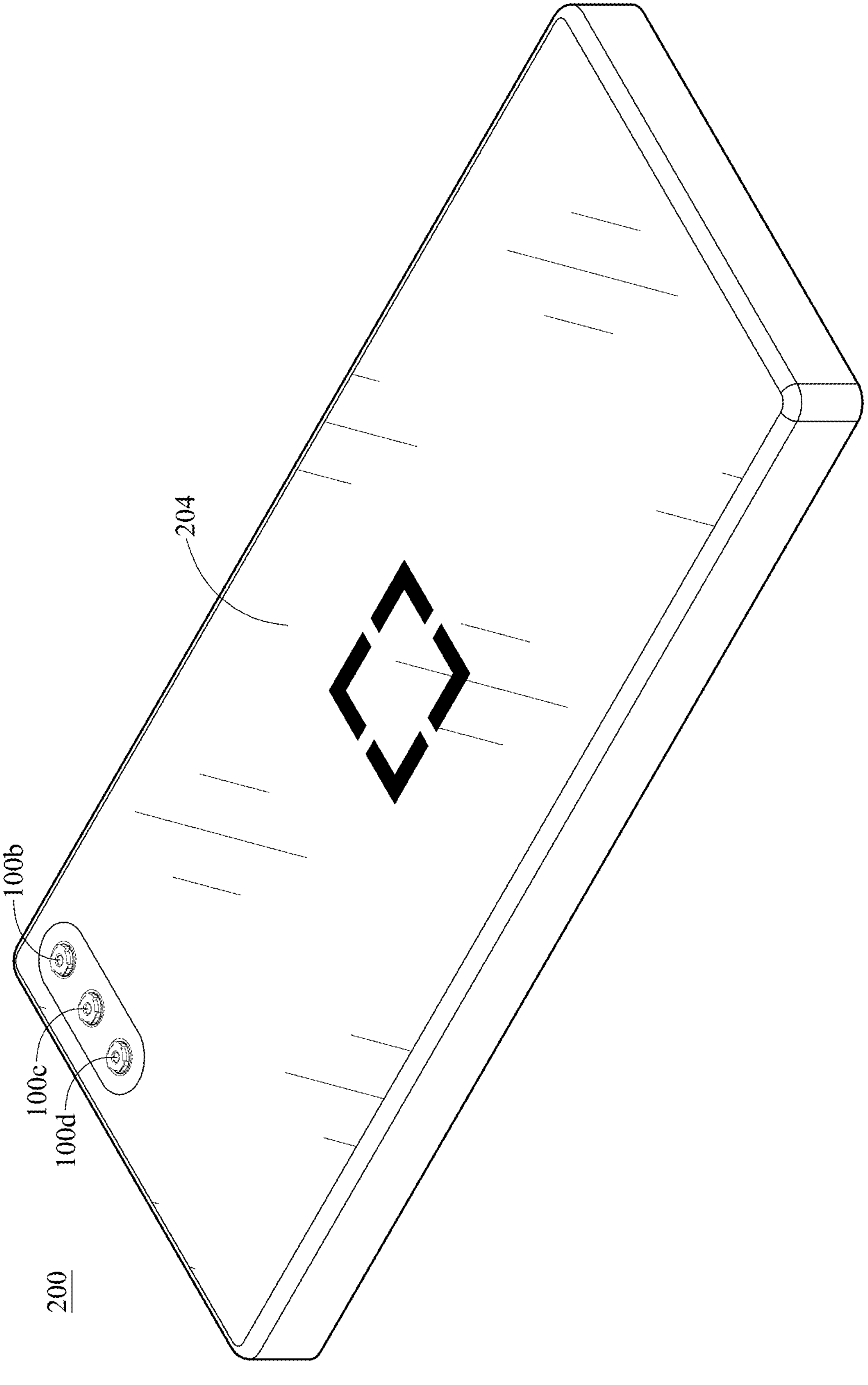
FIG. 25 is another perspective view of the electronic device in FIG. 24.
Figure 26:
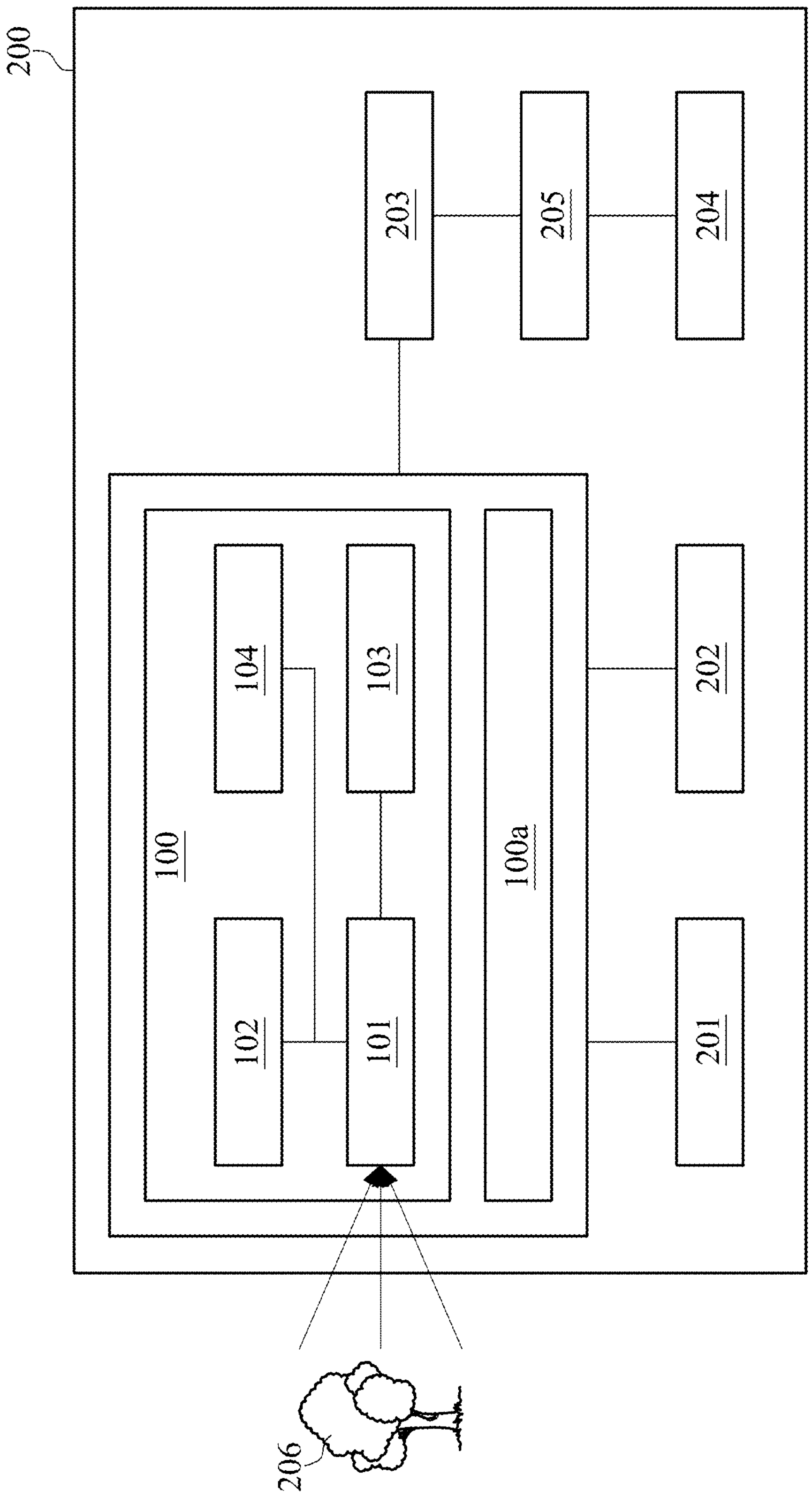
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 200 is a smartphone including the image capturing unit 100 disclosed in the 12th embodiment, an image capturing unit 100*a*, an image capturing unit 100*b*, an image capturing unit 100*c*, an image capturing unit 100*d*, a flash module 201, a focus assist module 202, an image signal processor 203, a display module 204 and an image software processor 205. The image capturing unit 100 and the image capturing unit 100*a* are disposed on the same side of the electronic device 200 and each of the image capturing units 100 and 100*a* has a single focal point. The focus assist module 202 can be a laser rangefinder or a ToF (time of flight) module, but the present disclosure is not limited thereto. The image capturing unit 100*b*, the image capturing unit 100*c*, the image capturing unit 100*d* and the display module 204 are disposed on the opposite side of the electronic device 200, and the display module 204 can be a user interface, such that the image capturing units 100*b*, 100*c*, 100*d* can be front-facing cameras of the electronic device 200 for taking selfies, but the present disclosure is not limited thereto. Furthermore, each of the image capturing units 100*a*, 100*b*, 100*c* and 100*d* can include the optical imaging lens system of the present disclosure and can have a configuration similar to that of the image capturing unit 100. In detail, each of the image capturing units 100*a*, 100*b*, 100*c* and 100*d* can include a lens unit, a driving device, an image sensor and an image stabilizer, and each of the lens unit can include an optical lens assembly such as the optical imaging lens system of the present disclosure, a barrel and a holder member for holding the optical lens assembly.

The image capturing unit 100 is a wide-angle image capturing unit, the image capturing unit 100*a* is an ultra-wide-angle image capturing unit, the image capturing unit 100*b* is a wide-angle image capturing unit, the image capturing unit 100*c* is an ultra-wide-angle image capturing unit, and the image capturing unit 100*d* is a ToF image capturing unit. In this embodiment, the image capturing units 100, 100*a*, 100*b* and 100*c* have different fields of view, such that the electronic device 200 can have various magnification ratios so as to meet the requirement of optical zoom functionality. Moreover, a maximum field of view of the image capturing unit 100 and a maximum field of view of one of the image capturing units 100*a*, 100*b*, 100*c*, 100*d* can differ by at least 30 degrees. Therefore, it is favorable for the electronic device 200 to capture images of different fields of view for various applications. In addition, the image capturing unit 100*d* can determine depth information of the imaged object. In this embodiment, the electronic device 200 includes multiple image capturing units 100, 100*a*, 100*b*, 100*c* and 100*d*, but the present disclosure is not limited to the number and arrangement of image capturing units.

When a user captures images of an object 206, the light rays converge in the image capturing unit 100 or the image capturing unit 100*a* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*b*, 100*c* or 100*d* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

14th Embodiment

Figure 27:
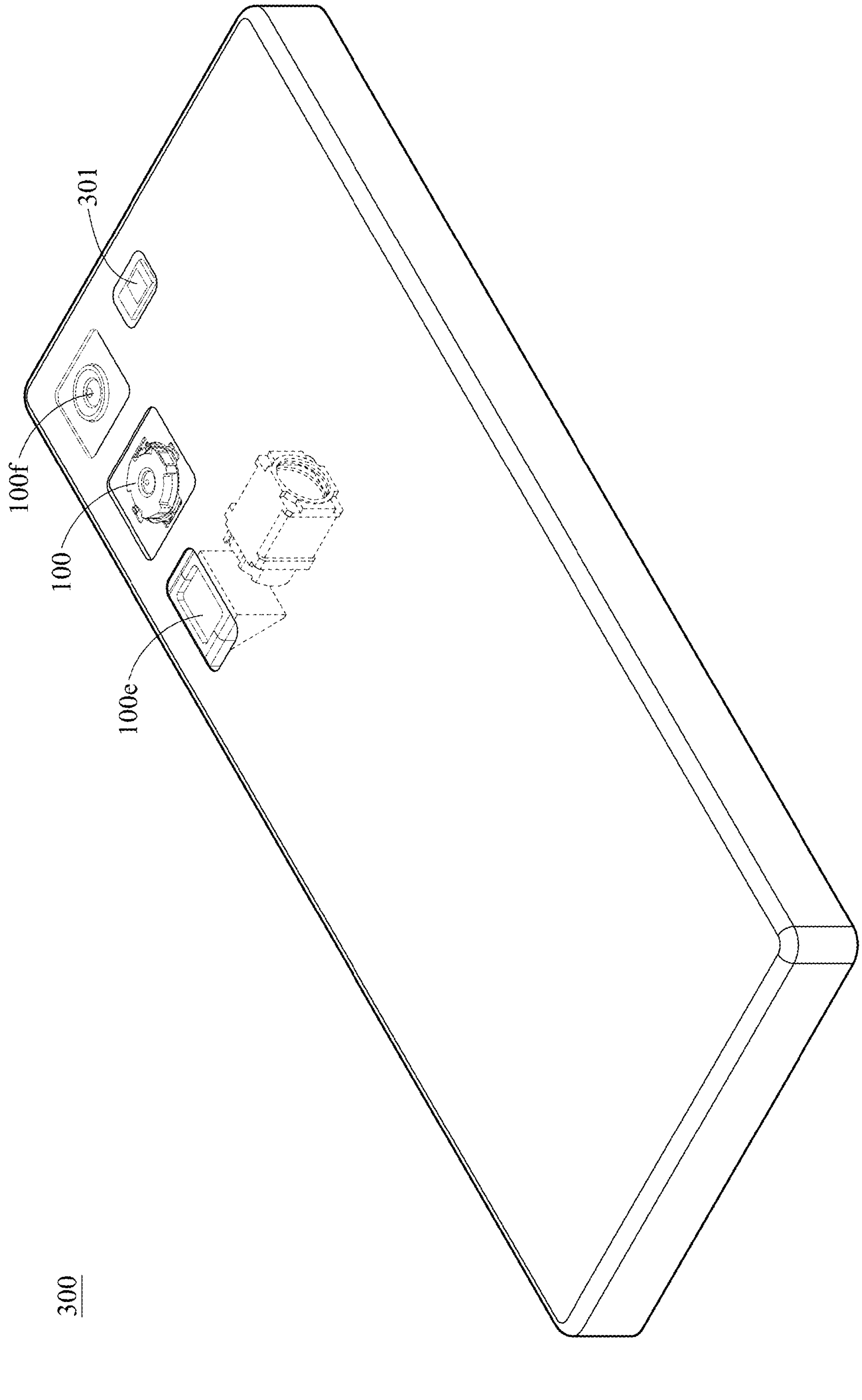
FIG. 27 is one perspective view of an electronic device according to the 14th embodiment of the present disclosure.

FIG. 27 is one perspective view of an electronic device according to the 14th embodiment of the present disclosure.

In this embodiment, an electronic device 300 is a smartphone including the image capturing unit 100 disclosed in the 12th embodiment, an image capturing unit 100*e*, an image capturing unit 100*f*, a flash module 301, a focus assist module, an image signal processor, a display module and an image software processor (not shown). The image capturing unit 100, the image capturing unit 100*e* and the image capturing unit 100*f* are disposed on the same side of the electronic device 300, while the display module is disposed on the opposite side of the electronic device 300. Furthermore, each of the image capturing units 100*e* and 100*f* can include the optical imaging lens system of the present disclosure and can have a configuration similar to that of the image capturing unit 100, and the details in this regard will not be provided again.

The image capturing unit 100 is a wide-angle image capturing unit, the image capturing unit 100*e* is a telephoto image capturing unit, and the image capturing unit 100*f* is an ultra-wide-angle image capturing unit. In this embodiment, the image capturing units 100, 100*e* and 100*f* have different fields of view, such that the electronic device 300 can have various magnification ratios so as to meet the requirement of optical zoom functionality. Moreover, the image capturing unit 100*e* can be a telephoto image capturing unit having a light-folding element configuration, such that the total track length of the image capturing unit 100*e* is not limited by the thickness of the electronic device 300. Moreover, the light-folding element configuration of the image capturing unit 100*e* can be similar to, for example, one of the structures shown in FIG. 30 to FIG. 32, which can be referred to foregoing descriptions corresponding to FIG. 30 to FIG. 32, and the details in this regard will not be provided again. In this embodiment, the electronic device 30 includes multiple image capturing units 100, 100*e* and 100*f*, but the present disclosure is not limited to the number and arrangement of image capturing units. When a user captures images of an object, light rays converge in the image capturing unit 100, 100*e* or 100*f* to generate images, and the flash module 301 is activated for light supplement. Further, the subsequent processes are performed in a manner similar to the abovementioned embodiment, so the details in this regard will not be provided again.

15th Embodiment

Figure 28:
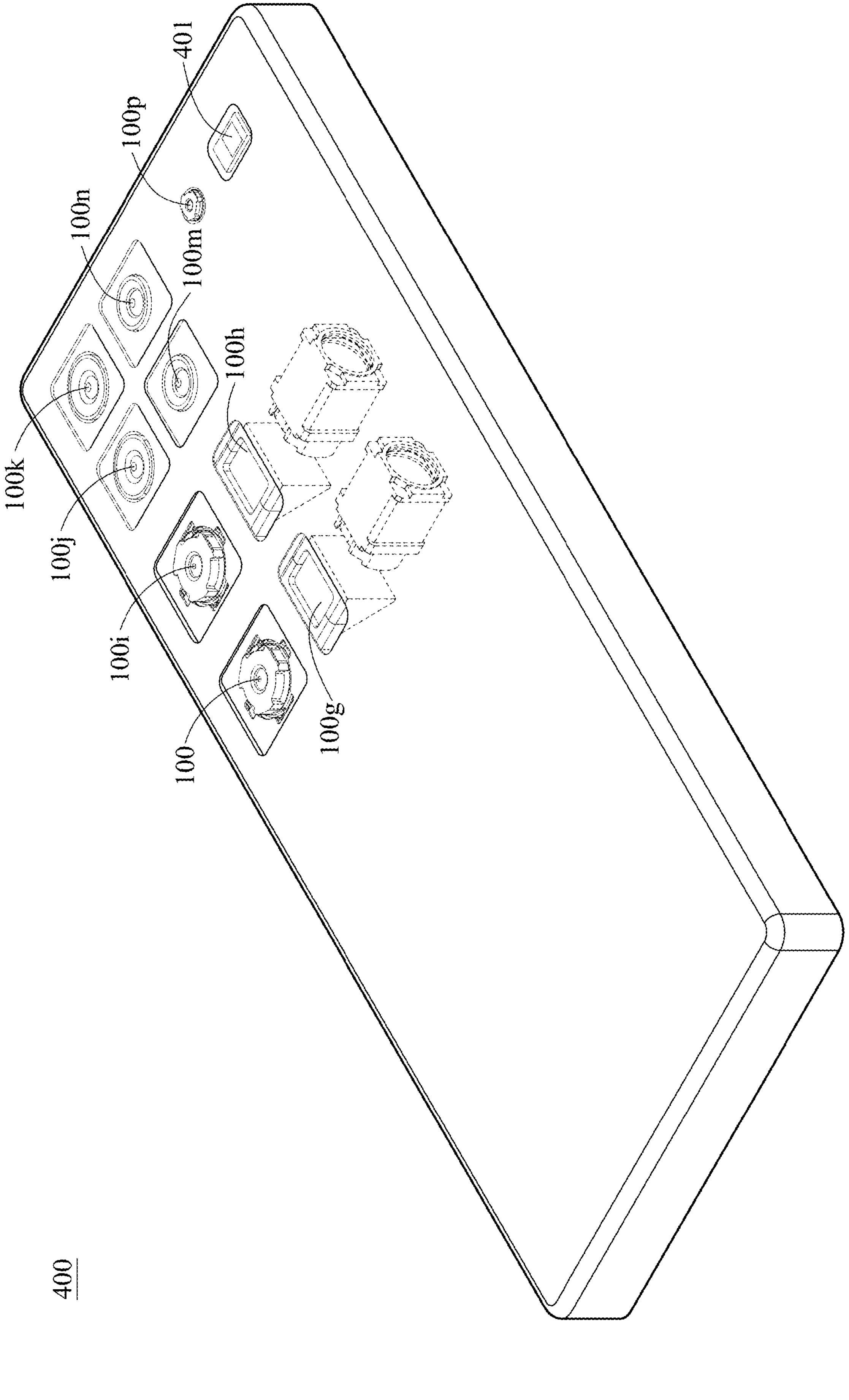
FIG. 28 is one perspective view of an electronic device according to the 15th embodiment of the present disclosure.

FIG. 28 is one perspective view of an electronic device according to the 15th embodiment of the present disclosure.

In this embodiment, an electronic device 400 is a smartphone including the image capturing unit 100 disclosed in the 12th embodiment, an image capturing unit 100*g*, an image capturing unit 100*h*, an image capturing unit 100*i*, an image capturing unit 100*j*, an image capturing unit 100*k*, an image capturing unit 100*m*, an image capturing unit 100*n*, an image capturing unit 100*p*, a flash module 401, a focus assist module, an image signal processor, a display module and an image software processor (not shown). The image capturing units 100, 100*g*, 100*h*, 100*i*, 100*j*, 100*k*, 100*m*, 100*n* and 100*p* are disposed on the same side of the electronic device 400, while the display module is disposed on the opposite side of the electronic device 400. Furthermore, each of the image capturing units 100*g*, 100*h*, 100*i*, 100*j*, 100*k*, 100*m*, 100*n* and 100*p* can include the optical imaging lens system of the present disclosure and can have a configuration similar to that of the image capturing unit 100, and the details in this regard will not be provided again.

The image capturing unit 100 is a wide-angle image capturing unit, the image capturing unit 100*g* is a telephoto image capturing unit, the image capturing unit 100*h* is a telephoto image capturing unit, the image capturing unit 100*i* is a wide-angle image capturing unit, the image capturing unit 100*j* is an ultra-wide-angle image capturing unit, the image capturing unit 100*k* is an ultra-wide-angle image capturing unit, the image capturing unit 100*m* is a telephoto image capturing unit, the image capturing unit 100*n* is a telephoto image capturing unit, and the image capturing unit 100*p* is a ToF image capturing unit. In this embodiment, the image capturing units 100, 100*g*, 100*h*, 100*i*, 100*j*, 100*k*, 100*m* and 100*n* have different fields of view, such that the electronic device 400 can have various magnification ratios so as to meet the requirement of optical zoom functionality. Moreover, each of the image capturing units 100*g* and 100*h* can be a telephoto image capturing unit having a light-folding element configuration. Moreover, the light-folding element configuration of each of the image capturing unit 100*g* and 100*h* can be similar to, for example, one of the structures shown in FIG. 30 to FIG. 32, which can be referred to foregoing descriptions corresponding to FIG. 30 to FIG. 32, and the details in this regard will not be provided again. In addition, the image capturing unit 100*p* can determine depth information of the imaged object. In this embodiment, the electronic device 400 includes multiple image capturing units 100, 100*g*, 100*h*, 100*i*, 100*j*, 100*k*, 100*m*, 100*n* and 100*p*, but the present disclosure is not limited to the number and arrangement of image capturing units. When a user captures images of an object, the light rays converge in the image capturing unit 100, 100*g*, 100*h*, 100*i*, 100*j*, 100*k*, 100*m*, 100*n* or 100*p* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising ten lens elements, the ten lens elements being, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element, and each of the ten lens elements having an object-side surface facing toward the object side and an image-side surface facing toward the image side;

wherein the first lens element has positive refractive power, the image-side surface of the third lens element is concave in a paraxial region thereof, the image-side surface of the seventh lens element is concave in a paraxial region thereof, and the image-side surface of the ninth lens element is concave in a paraxial region thereof;

wherein a central thickness of the tenth lens element is larger than a central thickness of the first lens element;

wherein a maximum value among refractive indices of all lens elements of the optical imaging lens system is Nmax, and the following condition is satisfied:

$$1.50 < N\text{max} < 1.75.$$

2. The optical imaging lens system of claim 1, wherein at least one of the object-side surface and the image-side surface of each of at least three lens elements of the optical imaging lens system has at least one inflection point.

3. The optical imaging lens system of claim 1, further comprising an aperture stop, wherein an axial distance between the aperture stop and the image-side surface of the tenth lens element is SD, an axial distance between the object-side surface of the first lens element and the image-side surface of the tenth lens element is TD, and the following condition is satisfied:

$$0.60 < SD/TD < 1.20.$$

4. The optical imaging lens system of claim 1, wherein an axial distance between the seventh lens element and the eighth lens element is T78, an axial distance between the eighth lens element and the ninth lens element is T89, and the following condition is satisfied:

$$0 < T89/T78 < 1.30.$$

5. The optical imaging lens system of claim 1, wherein an axial distance between the third lens element and the fourth lens element is T34, an axial distance between the eighth lens element and the ninth lens element is T89, and the following condition is satisfied:

$$0.20 < T89/T34 < 1.10.$$

6. The optical imaging lens system of claim 1, wherein a curvature radius of the object-side surface of the eighth lens element and a curvature radius of the image-side surface of the eighth lens element have a same sign, and a curvature radius of the object-side surface of the sixth lens element and a curvature radius of the image-side surface of the tenth lens element have different signs.

7. The optical imaging lens system of claim 1, wherein the central thickness of the tenth lens element is larger than a central thickness of the eighth lens element.

8. The optical imaging lens system of claim 1, wherein a central thickness of the ninth lens element is larger than a central thickness of the fourth lens element, and an absolute value of a curvature radius of the object-side surface of the fourth lens element is larger than an absolute value of a curvature radius of the image-side surface of the tenth lens element.

9. The optical imaging lens system of claim 1, wherein the third lens element has negative refractive power.

10. The optical imaging lens system of claim 1, wherein the image-side surface of the fourth lens element is concave in a paraxial region thereof.

11. The optical imaging lens system of claim 1, wherein the image-side surface of the eighth lens element is convex in a paraxial region thereof.

12. The optical imaging lens system of claim 1, wherein a central thickness of the second lens element is CT2, a central thickness of the third lens element is CT3, and the following condition is satisfied:

$$1.20 < CT2/CT3 < 5.0.$$

13. The optical imaging lens system of claim 1, wherein an Abbe number of the ninth lens element is V9, an Abbe number of the tenth lens element is V10, and the following condition is satisfied:

$$10.0 < V9 + V10 < 105.0.$$

14. An image capturing unit, comprising:

the optical imaging lens system of claim 13; and an image sensor disposed on an image surface of the optical imaging lens system.

15. An electronic device, comprising at least two image capturing units disposed on same side of the electronic device, and the at least two image capturing units comprising:

a first image capturing unit, comprising the optical imaging lens system of claim 1 and an image sensor disposed on an image surface of the optical imaging lens system; and a second image capturing unit, comprising an optical lens assembly and an image sensor disposed on an image surface of the optical lens assembly;

wherein a maximum field of view of the first image capturing unit and a maximum field of view of the second image capturing unit differ by at least 30 degrees.

* * * * *